United States Patent
Takeuchi et al.

(10) Patent No.: US 6,483,492 B1
(45) Date of Patent: Nov. 19, 2002

(54) DISPLAY-DRIVING DEVICE AND DISPLAY-DRIVING METHOD PERFORMING GRADATION CONTROL BASED ON A TEMPORAL MODULATION SYSTEM

(75) Inventors: Yukihisa Takeuchi, Nishikamo-gun (JP); Tsutomu Nanataki, Toyoake (JP); Iwao Ohwada, Nagoya (JP); Takayoshi Akao, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/373,797

(22) Filed: Aug. 13, 1999

(30) Foreign Application Priority Data

Aug. 18, 1998 (JP) .............................. 10-232116
May 14, 1999 (JP) .............................. 11-134930

(51) Int. Cl.$^7$ ................................................ G09G 3/28
(52) U.S. Cl. ........................ 345/63; 345/690; 345/691
(58) Field of Search ............................ 345/87, 60–72, 345/84, 85, 102, 108, 147, 204–213, 596, 690, 691; 385/1–10, 25, 30, 40–42, 901, 129–133; 315/169.1, 169.2, 169.3, 169.4

(56) References Cited

U.S. PATENT DOCUMENTS

| | | |
|---|---|---|
| 2,565,514 A | 8/1951 | Pajes |
| 2,997,922 A | 8/1961 | Kaprelian |
| 3,376,092 A | 4/1968 | Kushner et al. |
| 3,698,793 A | 10/1972 | Tellerman |
| 4,113,360 A | 9/1978 | Bauer et al. |
| 5,106,181 A | 4/1992 | Rockwell, III |
| 5,210,455 A | 5/1993 | Takeuchi et al. |
| 5,319,491 A | 6/1994 | Selbrede |
| 5,321,418 A | 6/1994 | Leroux |
| 5,424,752 A | 6/1995 | Yamazaki et al. |
| 5,600,197 A | 2/1997 | Takeuchi et al. |
| 5,636,072 A | 6/1997 | Shibata et al. |
| 5,771,321 A * | 6/1998 | Stern .............................. 385/31 |
| 5,774,101 A * | 6/1998 | Hirai et al. ..................... 345/89 |
| 5,861,863 A * | 1/1999 | Kudo et al. ................... 345/100 |
| 5,862,275 A | 1/1999 | Takeuchi et al. |

(List continued on next page.)

FOREIGN PATENT DOCUMENTS

| | | |
|---|---|---|
| EP | 0 675 477 | 10/1995 |
| EP | 0 408 305 | 3/1996 |
| EP | 0 851 260 A2 | 7/1998 |
| EP | 0 867 854 A2 | 9/1998 |
| EP | 0 953 958 A2 | 11/1999 |
| EP | 0 964 421 A1 | 12/1999 |
| JP | 10-78549 | 3/1998 |

OTHER PUBLICATIONS

U.S. application Ser. No. 09/570,697, Takeuchi et al., filed May 12, 2000.

(List continued on next page.)

*Primary Examiner*—Steven Saras
*Assistant Examiner*—Amr Awad
(74) *Attorney, Agent, or Firm*—Burr & Brown

(57) ABSTRACT

One selection period S and display cycles Td of a number corresponding to a maximum gradation level are allotted in one field, and the display cycle Td is composed of an unselection period U and a reset period R to perform the following control. A row electrode-driving circuit is used to output a selection pulse Ps during the selection period S, output an unselection signal Su during the unselection period U in the display cycle Td, and output a reset pulse Pr during the reset period R. A column electrode-driving circuit is used to output an ON signal during a light emission maintenance period, and output an OFF signal at least at an end timing of the light emission maintenance period, of the period other than the light emission maintenance period. Accordingly, it is possible to effectively reduce the electric power consumption, and it is possible to achieve the high brightness.

42 Claims, 48 Drawing Sheets

U.S. PATENT DOCUMENTS

| | | | | |
|---|---|---|---|---|
| 5,953,469 A | * | 9/1999 | Zhou | 385/22 |
| 5,986,640 A | * | 11/1999 | Baldwin et al. | 345/596 |
| 6,028,578 A | * | 2/2000 | Ota et al. | 345/94 |
| 6,028,978 A | | 2/2000 | Takeuchi et al. | |
| 6,057,816 A | * | 5/2000 | Eckersley | 345/85 |
| 6,091,182 A | | 7/2000 | Takeuchi et al. | |

OTHER PUBLICATIONS

Reynaerts C. et al., "Time Integration Grey Scales for Ferroelectric LCD's," Ferroelectrics, US, New York, NY, vol. 113, NR. 1/04, pp 419–437 XP000560014.

Anzai Kazuo, "*Preparation of Electronic Materials*," General Institute of Toshiba Corporation, Denki Kagaku 53, No. 1, 1985, pp. 63–68.

Goto, Atsushi, et al., "*$PbZrO_3/PbTiO_3$ Composite Ceramics Fabricated by Electrophoretic Deposition*," Tokyo Metropolitan University, Tokyo Medical and Dental University, Proceedings of First Symposium on Higher–Order Ceramic Formation Method Based on Electrophoresis, 1998, pp. 5–6.

Yamashita, Kimihiro, "*Hybridization of Ceramics by Electrophoretic Deposition*," Institute of Medical and Dental Engineering, Tokyo Medical and Dental University, Proceedings of First Symposium on Higher–Order Ceramic Formation Method Based on Electrophoresis, 1998, pp. 23–24.

* cited by examiner

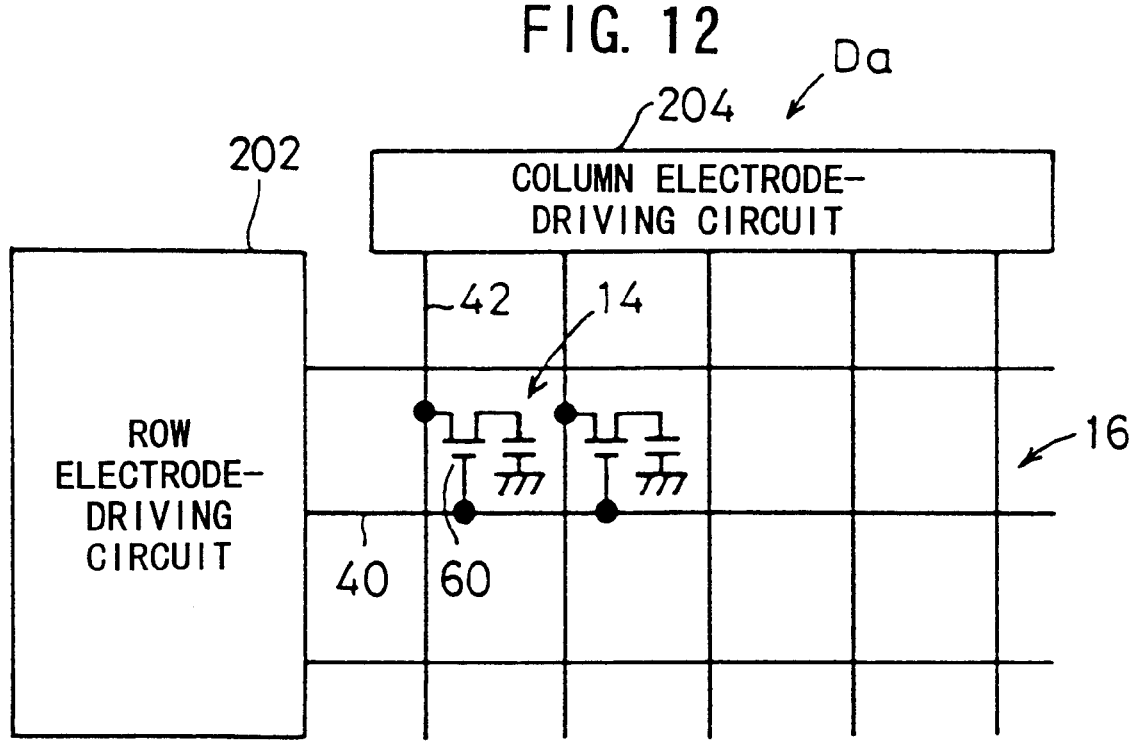

F I G. 21
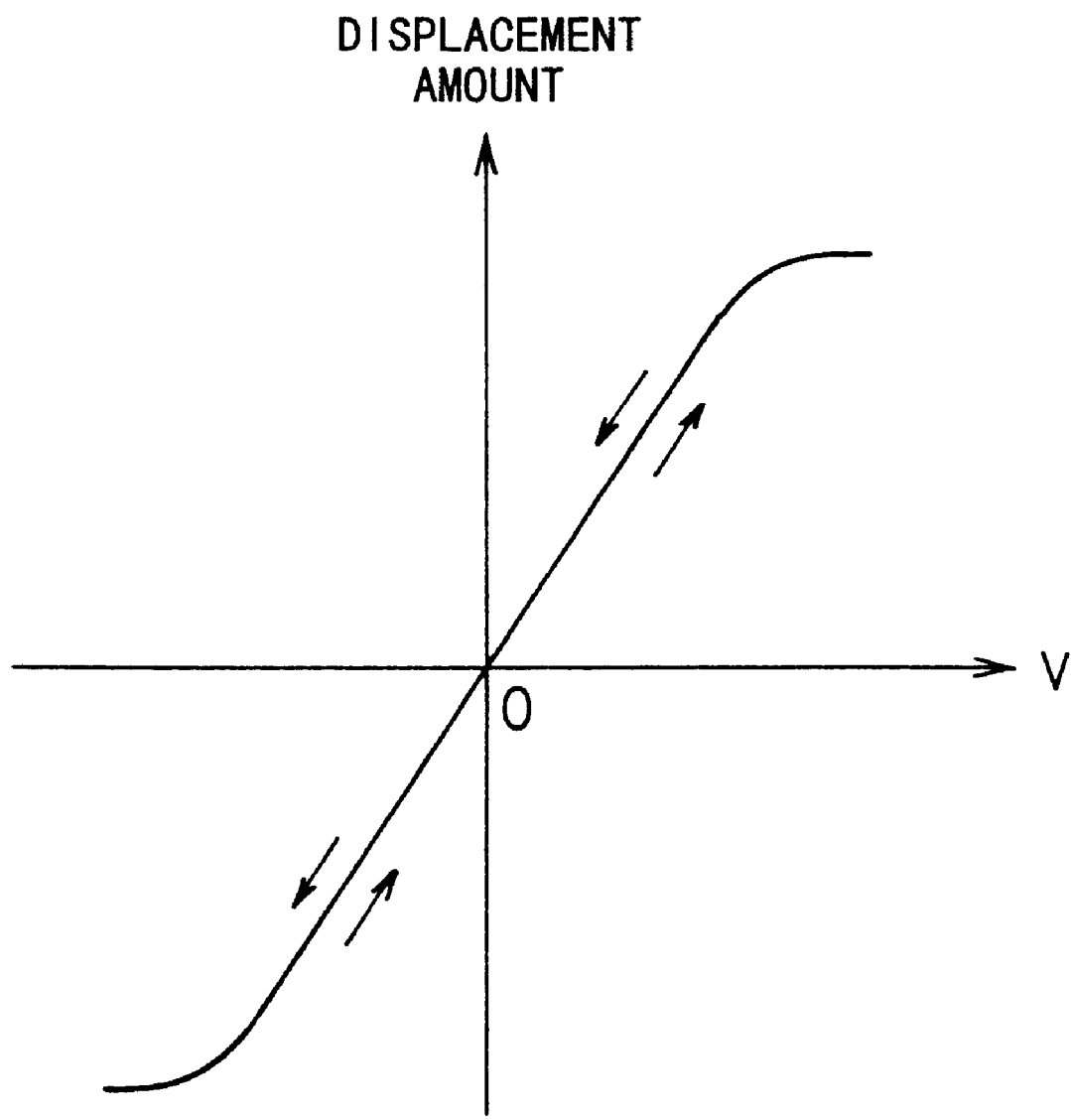

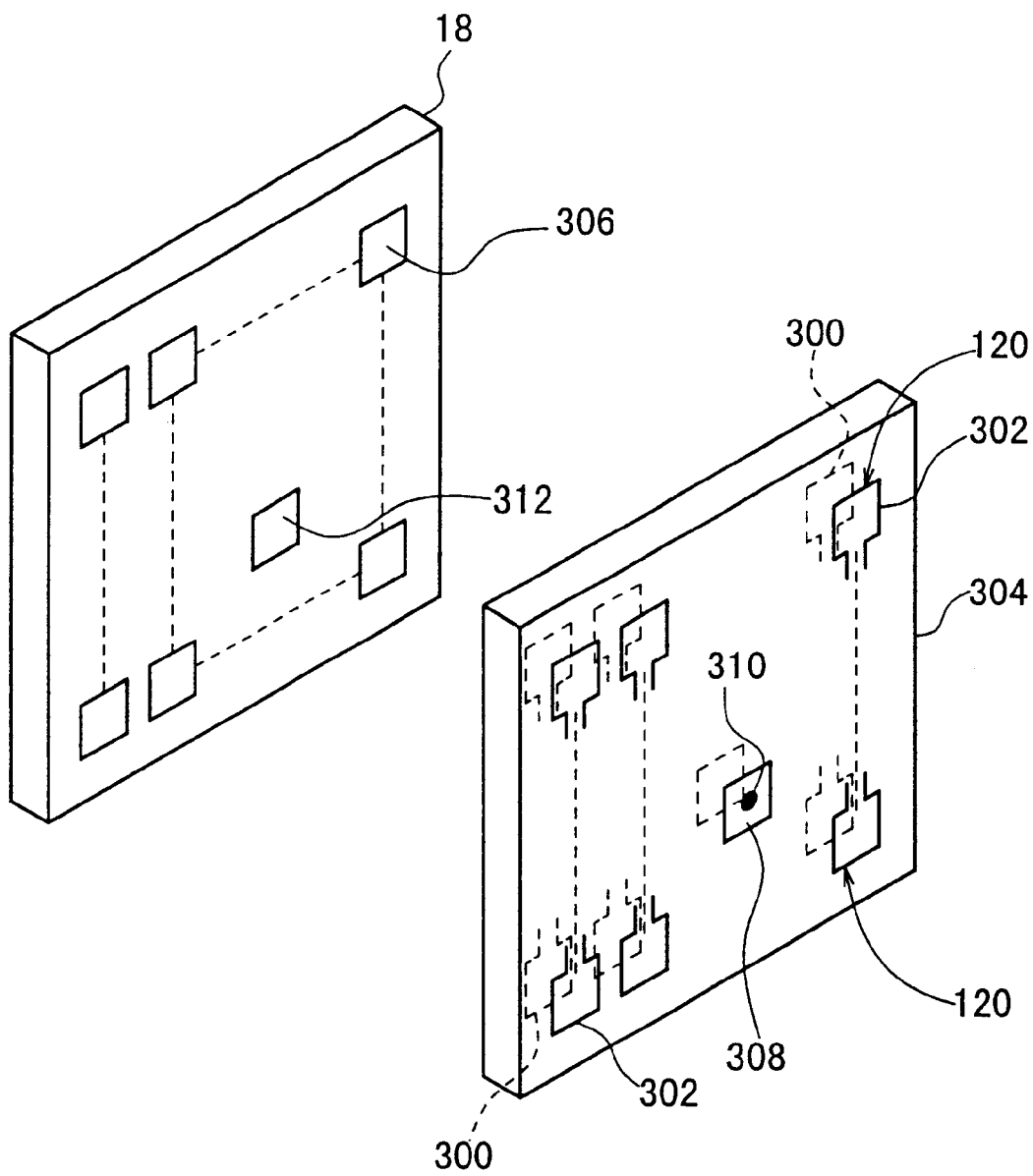

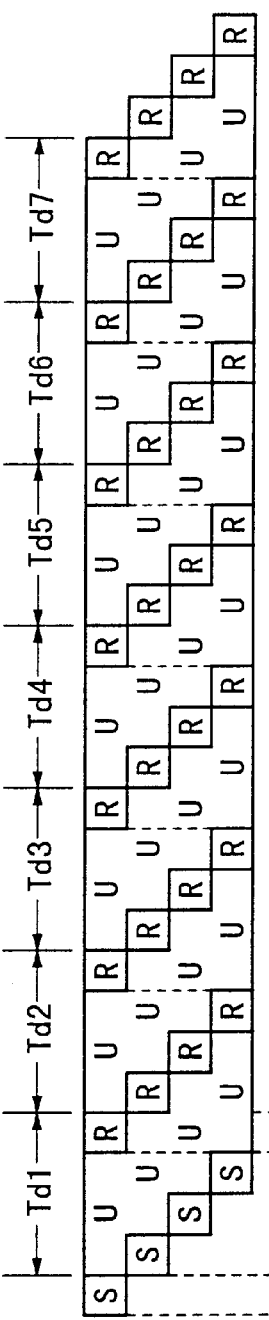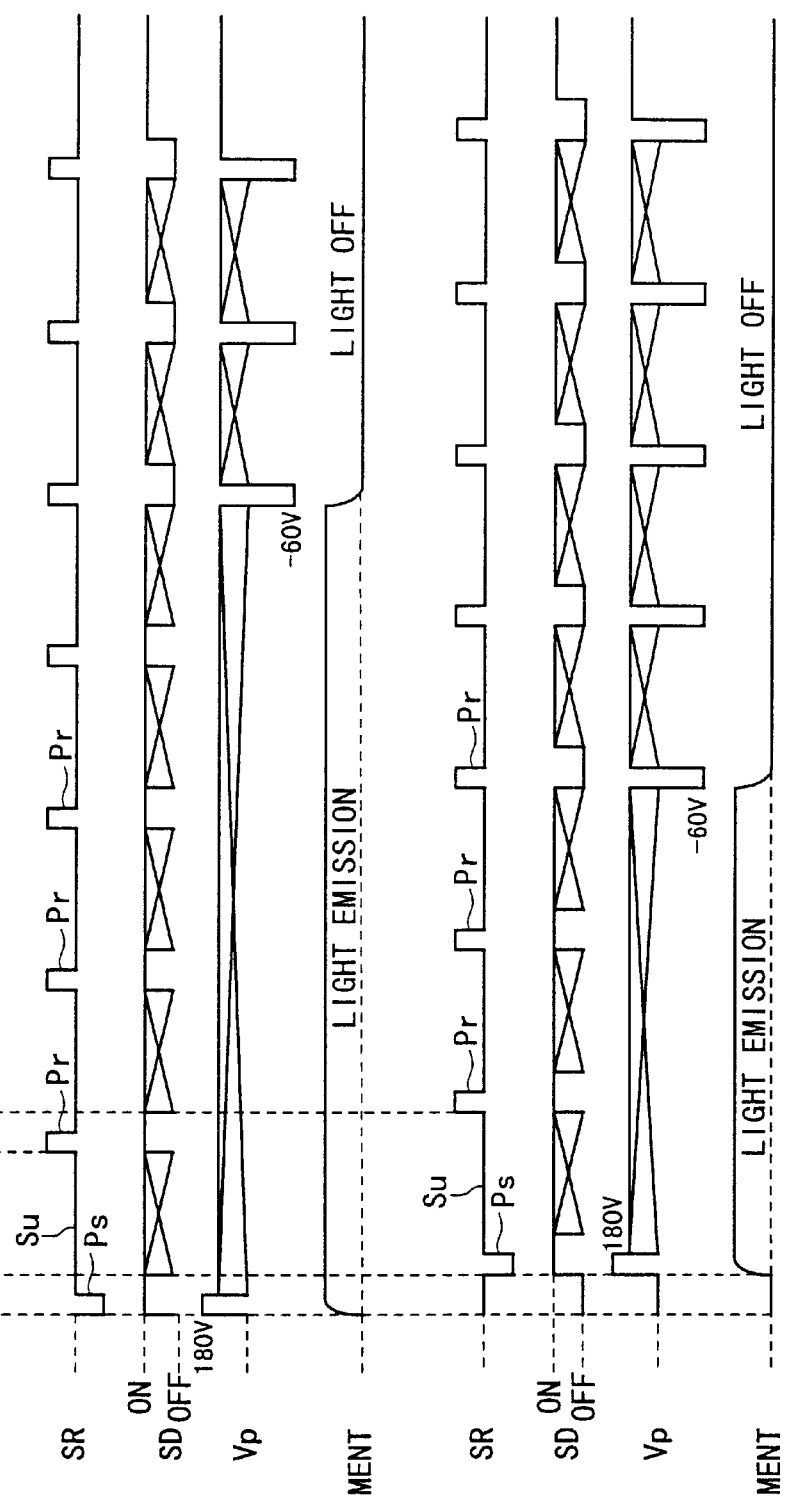

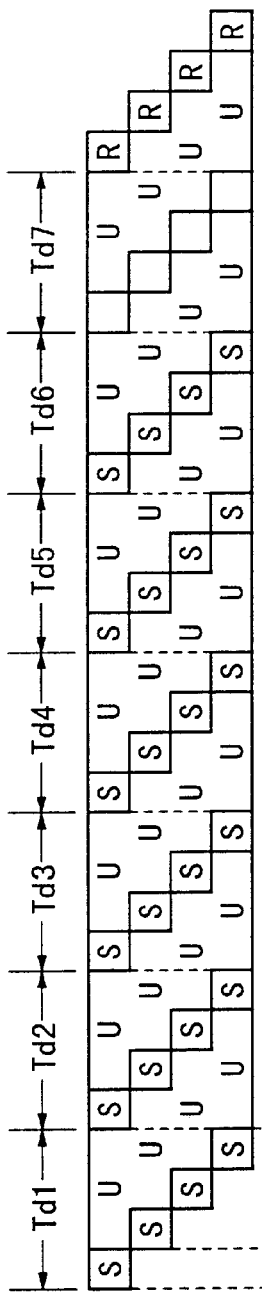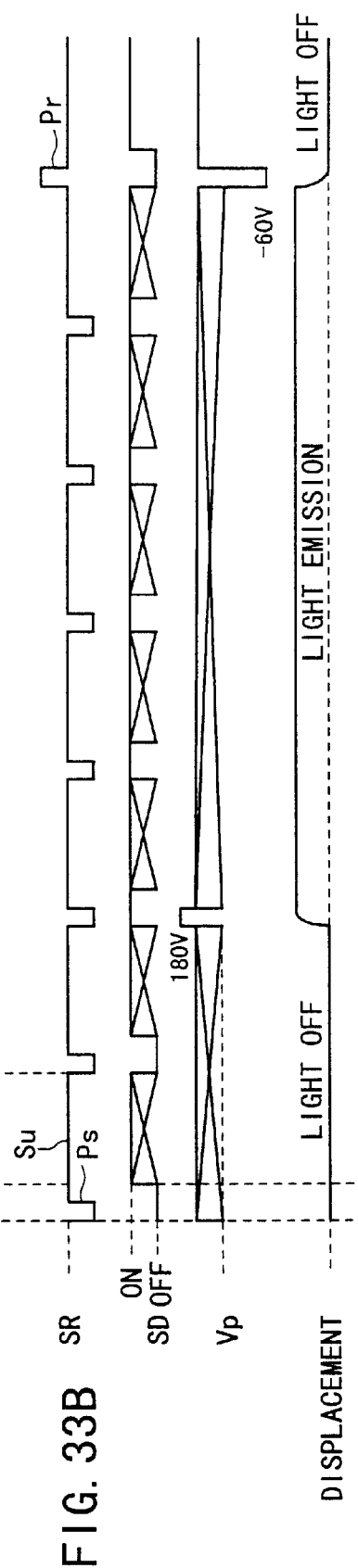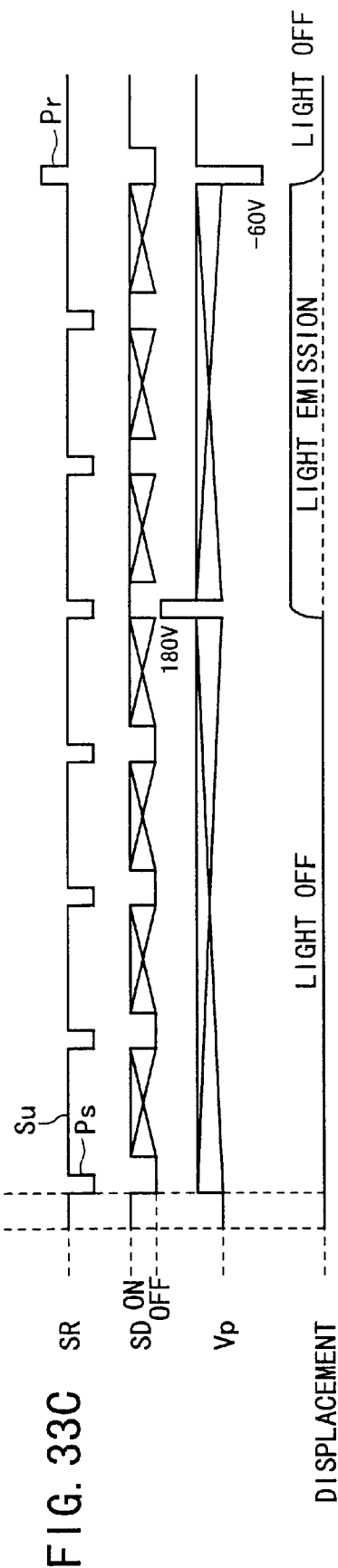
FIG. 33A
FIG. 33B
FIG. 33C

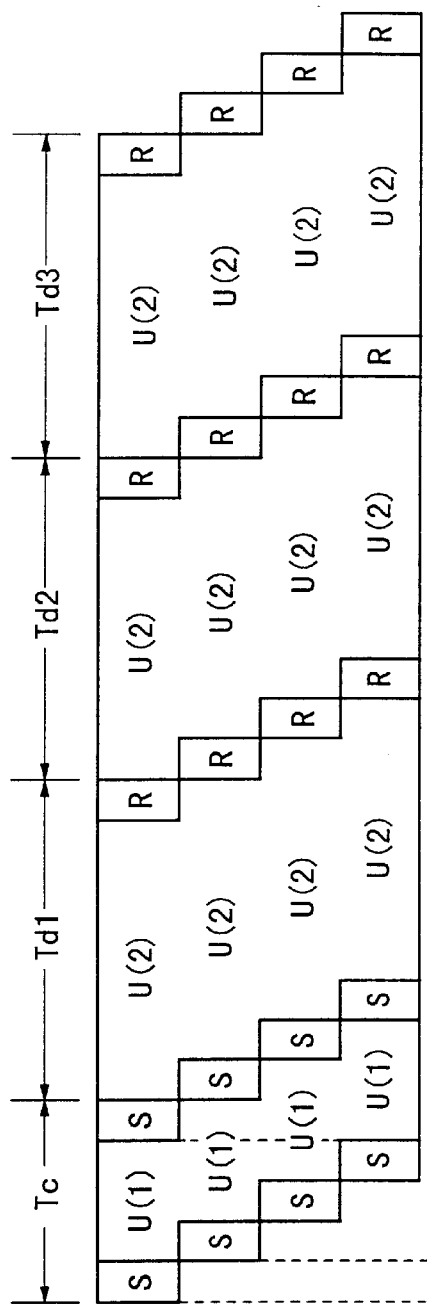
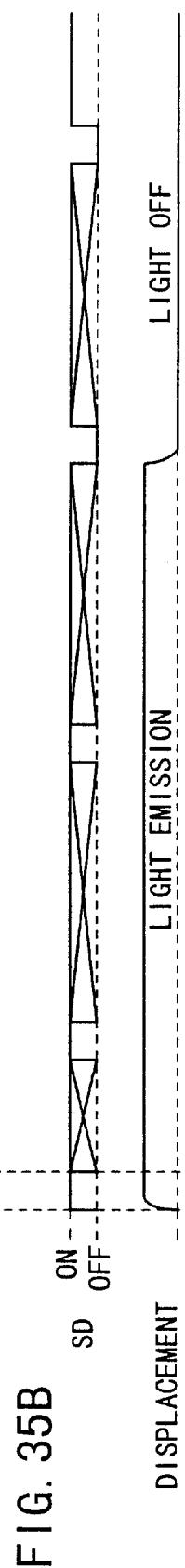
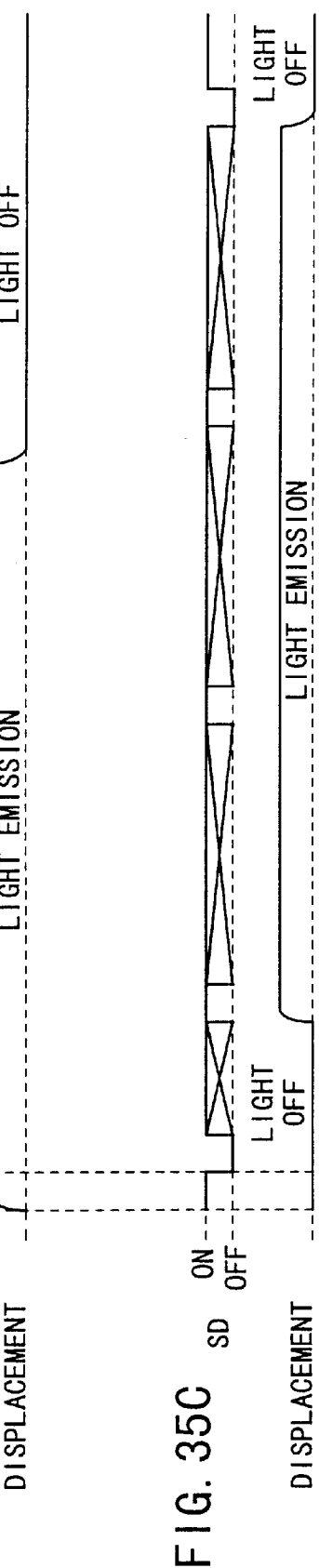
FIG. 35A
FIG. 35B
FIG. 35C

FIG. 39

| COMBINATION OF SUBFIELDS / GRADATION | ONLY U(1) | U(1) AND U(2) | U(1) AND U(4) | U(1) AND U(8) | U(1) AND U(16) | U(1) AND U(32) | U(1) AND U(64) | U(1) AND U(128) |
|---|---|---|---|---|---|---|---|---|
| 16 | 15 | 9 | 7 | 9 | — | — | — | — |
| 32 | 31 | 17 | 11 | 11 | 17 | — | — | — |
| 64 | 63 | 33 | 19 | 15 | 19 | 33 | — | — |
| 128 | 127 | 65 | 35 | 23 | 23 | 35 | 65 | — |
| 256 | 255 | 129 | 67 | 39 | 31 | 39 | 67 | 129 |

FIG. 42

|  |  | ON SIGNAL | OFF SIGNAL |
|---|---|---|---|
|  |  | 80V | 0V |
| SELECTION PULSE | -100V | 180V (LIGHT EMISSION OF PICTURE ELEMENT) | 100V (NO LIGHT EMISSION OF PICTURE ELEMENT) |
| UNSELECTION SIGNAL | -20V | 100V (MAINTENANCE OF LIGHT EMISSION OR MAINTENANCE OF NO LIGHT EMISSION) | 20V (MAINTENANCE OF LIGHT EMISSION OR MAINTENANCE OF NO LIGHT EMISSION) |
| RESET PULSE | 60V | 20V (MAINTENANCE OF LIGHT EMISSION OR MAINTENANCE OF NO LIGHT EMISSION) | -60V (LIGHT OFF OF PICTURE ELEMENT) |

FIG. 44

|  |  | ON SIGNAL | OFF SIGNAL |
|---|---|---|---|
|  |  | 0V | 100V |
| SELECTION PULSE | 90V | −90V (LIGHT EMISSION OF PICTURE ELEMENT) | 10V (NO LIGHT EMISSION OF PICTURE ELEMENT) |
| UNSELECTION SIGNAL | −10V | 10V (MAINTENANCE OF LIGHT EMISSION OR MAINTENANCE OF NO LIGHT EMISSION) | 110V (MAINTENANCE OF LIGHT EMISSION OR MAINTENANCE OF NO LIGHT EMISSION) |
| RESET PULSE | −110V | 110V (MAINTENANCE OF LIGHT EMISSION OR MAINTENANCE OF NO LIGHT EMISSION) | 210V (LIGHT OFF OF PICTURE ELEMENT) |

FIG. 45

|  |  | ON SIGNAL | OFF SIGNAL |
|---|---|---|---|
|  |  | 0V | 80V |
| SELECTION PULSE | 170V | −170V (LIGHT EMISSION OF PICTURE ELEMENT) | −90V (NO LIGHT EMISSION OF PICTURE ELEMENT) |
| UNSELECTION SIGNAL | 0V | 0V (MAINTENANCE OF LIGHT EMISSION OR MAINTENANCE OF NO LIGHT EMISSION) | 80V (MAINTENANCE OF LIGHT EMISSION OR MAINTENANCE OF NO LIGHT EMISSION) |
| RESET PULSE | −160V | 160V (MAINTENANCE OF LIGHT EMISSION OR MAINTENANCE OF NO LIGHT EMISSION) | 240V (LIGHT OFF OF PICTURE ELEMENT) |

DISPLAY-DRIVING DEVICE AND DISPLAY-DRIVING METHOD PERFORMING GRADATION CONTROL BASED ON A TEMPORAL MODULATION SYSTEM

BACKGROUND OF THE INVENTION

1. Field of the Invention

The present invention relates to a display-driving device and a display-driving method for driving a panel type display such as a liquid crystal display, a plasma display, and a display for displaying a picture image corresponding to an image signal on an optical waveguide plate by controlling leakage light at a predetermined position of the optical waveguide plate by controlling the displacement action of an actuator element in a direction to make contact or separation with respect to the optical waveguide plate in accordance with an attribute of the image signal to be inputted (conveniently referred to as "electrostrictive type display").

2. Description of the Related Art

Those hitherto known as displays include display devices such as cathode ray tubes (CRT), liquid crystal displays, and plasma displays.

Those known as the cathode ray tube include, for example, ordinary television receivers and monitor units for computers. Although the cathode ray tube has a bright screen, it consumes a large amount of electric power. Further, the cathode ray tube involves a problem that the depth of the entire display device is large as compared with the size of the screen. Further, for example, the cathode ray tube involves drawbacks in that the resolution is decreased in the circumferential areas of the display images, the image or the graphic is distorted, there is no memory function, and it is impossible to present display in a large scale.

The reason for the foregoing phenomenon is as follows. That is, in the case of the cathode ray tube, the electron beam emitted from the electron gun is greatly deflected. Therefore, the light emission point (beam spot) is expanded at portions at which the electron beam reaches the fluorescent screen of the Braun tube in an inclined manner, and thus the image is displayed in an inclined manner. For this reason, strain occurs on the display image. Moreover, there is a limit for the maintenance to keep a large space at the inside of a Braun tube to be in a vacuum.

On the other hand, the panel type display, for example, the liquid crystal display is advantageous in that the entire device can be miniaturized, and the display consumes a small amount of electric power. The plasma display and the electrostrictive type display can be miniaturized, because the display section itself does not have a large volume, in the same manner as the liquid crystal display as described above. They are advantageous in that there is no trouble in viewing the screen, because the display surface is flat. Especially, the AC type plasma display and the electrostrictive type display are also advantageous in that the refresh memory is unnecessary owing to the memory function of the cell.

SUMMARY OF THE INVENTION

An object of the present invention is to provide a display-driving device and a display-driving method which make it possible to effectively reduce electric power consumption and achieve high brightness in a panel type display as described above.

Another object of the present invention is to provide a display-driving device and a display-driving method which make it possible to effectively reduce electric power consumption and achieve high brightness in gradation control based on subfield driving.

Still another object of the present invention is to provide a display-driving device and a display-driving method which make it possible to reduce the total number of subfields and effectively reduce electric power consumption in gradation control based on subfield driving.

According to the present invention, there is provided a display-driving device for a display comprising a driving section including a large number of picture elements arranged in a matrix form for displaying a picture image corresponding to a supplied image signal; the display-driving device comprising a first driving circuit for selecting the picture elements at least in one row unit, a second driving circuit for outputting display information composed of an ON signal and an OFF signal to a selected row, and a signal control circuit for controlling the first and second driving circuits; wherein assuming that a display period for one image is one field in order to perform gradation control based on at least a temporal modulation system, the signal control circuit determines, in the one field, a light emission start timing and a light emission maintenance period having a variable length irrelevant to a selection/unselection state of the concerning picture element depending on a gradation level of the selected picture element.

Assuming that the display period for one image is one field, the light emission start time of the concerning picture element and the light emission maintenance period having the variable length irrelevant to the selection/unselection state of the concerning picture element are determined in the one field depending on the gradation level of the selected picture element, in accordance with the control performed by the signal control circuit. Accordingly, the light emission is started for the concerning picture element substantially in synchronization with the light emission start timing, and the light emission state is maintained over the light emission maintenance period.

This arrangement makes it possible to effectively reduce the electric power consumption as compared with other driving systems in which one field is divided into a plurality of subfields, and forcible reset is performed for each of the subfields (as adopted, for example, for the plasma display). Further, the light emission state is maintained over the light emission maintenance period. Therefore, it is also possible to realize the improvement in brightness.

In the display-driving device constructed as described above, it is also preferable that one selection period and display cycles of a number corresponding to a maximum gradation level are allotted in the one field; each of the display cycles is composed of an unselection period and a reset period; and the signal control circuit is operated such that the concerning picture element is in a light emission state when the ON signal indicating light emission is inputted during the selection period, or the concerning picture element is in a light off state when the OFF signal indicating light off is inputted during the reset period in the display cycle.

Accordingly, assuming that the selection period is allotted to the head of the one field, one display cycle is selected, or a plurality of display cycles are continuously selected from the head of the one field depending on the gradation level of the concerning picture element. The ON signal is outputted at the head of the selected display cycle, and the OFF signal is outputted in the reset period of the display cycle next to the selected display cycle. In other words, the head of the selected display cycle is the light emission start timing, and the period corresponding to the selected display cycle is the light emission maintenance period.

In this arrangement, only one cycle is used for the light emission and the light off for the concerning picture element in the one field. Accordingly, it is possible to effectively reduce the electric power consumption. Further, the good linearity is obtained for the gradation and the brightness, and thus it is possible to make highly accurate gradational expression. Furthermore, the efficiency of the light emission time is also enhanced.

In the display-driving device constructed as described above, it is also preferable that signal levels are determined for the unselection period and the reset period so that the light emission state of the concerning picture element is maintained during the light emission maintenance period; and signal levels are determined for the selection period and the unselection period so that the light off state of the concerning picture element is maintained during any period other than the light emission maintenance period. In this arrangement, it is easy to achieve the maintenance of light emission during the light emission maintenance period and the maintenance of light off during the period other than the light emission maintenance period. Thus, it is possible to reliably perform the cycle including only one time of light emission and light off in the one field as described above.

In the display-driving device constructed as described above, it is also preferable that display cycles of a number corresponding to a maximum gradation level and one reset period are allotted in the one field; each of the display cycles is composed of a selection period and an unselection period; and the signal control circuit is operated such that the concerning picture element is in a light emission state when the ON signal indicating light emission is inputted during the selection period, or the concerning picture element is in a light off state during the reset period.

Accordingly, assuming that the reset period is allotted to the rear end of the one field, one display cycle is selected, or a plurality of display cycles are continuously selected from the rear end of the one field depending on the gradation level of the concerning picture element. The ON signal is outputted at the head of the selected display cycle, and the OFF signal is outputted in the reset period at the rear end.

Also in this arrangement, only one cycle is used for the light emission and the light off for the concerning picture element in the one field. Accordingly, it is possible to effectively reduce the electric power consumption. Further, the good linearity is obtained for the gradation and the brightness, and thus it is possible to make highly accurate gradational expression. Furthermore, the efficiency of the light emission time is also enhanced. Especially, the brightness can be sufficiently maintained over the light emission maintenance period for the concerning picture element, because the selection period exists for every selected display cycle.

In the display-driving device constructed as described above, it is also preferable that signal levels are determined for the selection period and the unselection period so that the light emission state of the concerning picture element is maintained during the light emission maintenance period. Accordingly, it is easy to achieve the maintenance of light emission during the light emission maintenance period and the maintenance of light off during the period other than the light emission maintenance period. Thus, it is possible to reliably perform the cycle including only one time of light emission and light off in the one field.

In the display-driving device constructed as described above, it is also preferable that an odd/even-adjusting cycle including a unit unselection period having a predetermined length between two selection periods, and display cycles of a number corresponding to a maximum gradation level are allotted in the one field; and each of the display cycles is provided with a redundant unselection period having a length which is twice the predetermined length and a reset period.

In this arrangement, for example, it is assumed that eight gradations are expressed in the one field. If the one field is constructed by using only the unit display cycle, it is necessary to perform selective scanning eight times for one row. However, when the display cycles, each of which is provided with the redundant unselection period having the length twice the predetermined length, are allotted, it is enough to perform selective scanning five times for one row. Thus, it is possible to reduce the cycles (row scanning cycles) for selecting one row. This results in the reduction of the electric power consumption.

Further, this also results in the high brightness of the selected picture element, because the light emission state is maintained during the redundant unselection period.

When the gradation level of the concerning picture element is odd, the light emission start timing is set to be substantially in synchronization with the head selection period of the odd/even-adjusting cycle; while when the gradation level of the concerning picture element is even, the light emission start timing is set to be substantially in synchronization with the rear end selection period of the odd/even-adjusting cycle.

In the display-driving device constructed as described above, it is also preferable that display cycles of a number corresponding to a maximum gradation level, and an odd/even-adjusting cycle including a unit unselection period having a predetermined length between two reset periods are allotted in the one field; and each of the display cycles is provided with a selection period and a redundant unselection period having a length which is twice the predetermined length.

Also in this arrangement, it is possible to reduce the row scanning cycles as described above, and it is possible to reduce the electric power consumption.

When the gradation level of the concerning picture element is odd, an end timing for the light emission maintenance period is set to be substantially in synchronization with the terminal end reset period of the odd/even-adjusting cycle; while when the gradation level of the concerning picture element is even, the end timing for the light emission maintenance period is set to be substantially in synchronization with the head reset period of the odd/even-adjusting cycle.

In the display-driving device constructed as described above, it is also preferable that at least one unit display cycle including a unit unselection period having a predetermined length, and at least one redundant display cycle are allotted in the one field; and the redundant display cycle is provided with a redundant unselection period having a length which is n-times the predetermined length (n is an integer of not less than 2).

In this arrangement, for example, it is assumed that eight gradations are expressed in the one field. It is enough to perform selective scanning five times for one row. Thus, it is possible to greatly reduce the row scanning cycles. As a result, it is possible to realize the reduction of electric power consumption and the high brightness.

In the display-driving device constructed as described above, it is also preferable that the following expressions are satisfied:

$Z =$ (quotient of $X/n$) $-1$ $Y = X - Z \times n$

[total number of subfields $(Y+Z) = (X/n-1) + n$]

provided that a maximum gradation level is X, a number of unit display cycles is Y, and a number of redundant display cycles is Z. In this arrangement, the total number of subfield exactly corresponds to the row scanning cycles described above. Therefore, a combination to minimize the total number of subfields necessarily exists. When such a combination is adopted, then it is possible to reduce the electric power consumption more effectively, and it is possible to mitigate the load on the scanning circuit.

Preferably, "a" individuals of selection periods are allotted to the respective display cycles from a head of the one field, and "b" individuals of reset periods are allotted to the respective display cycles from a rear end of the one field; wherein the following expression is satisfied:

$a + b = Y + Z + 1.$

Accordingly, it is possible to make a variety of gradational expressions. In this arrangement, in the case of b=n, all of the gradations included in the maximum gradation level can be expressed. However, assuming that there is given b=n−1, one or several gradation levels may be curtailed. This reduces the row scanning cycles, and hence it is possible to realize the low electric power consumption.

In the display-driving device constructed as described above, it is also preferable that the unit display cycle and the redundant display cycle are allotted by using a combination which corresponds to a minimum total number of subfields of total numbers of subfields corresponding to a maximum gradation level obtained by arbitrarily combining the unit display cycle and the redundant display cycle.

For example, if the maximum gradation level is 16, the total number of subfields is 15 in the case of only the unit display cycle, 9 in the case of a combination of the unit display cycle and the 2-fold redundant display cycle, 7 in the case of a combination of the unit display cycle and the 4-fold redundant display cycle, or 9 in the case of a combination of the unit display cycle and the 8-fold redundant display cycle. In this case, the combination of the unit display cycle and the 4-fold redundant display cycle is selected, in which the total number of subfields is minimum.

As a result, it is possible to reduce the electric power consumption more effectively, and it is possible to mitigate the load on the scanning circuit as having been described above.

In the display-driving device constructed as described above, it is also preferable that the one field includes therein a first subfield block composed of at least one redundant display cycle and a second subfield block composed of at least one unit display cycle; and a forcible reset period is provided between the first and second subfield blocks.

Owing to the use of the redundant display cycle in the first subfield block, it is possible reduce the number of row scanning cycles, and it is possible to realize the reduction of electric power consumption. Especially, owing to the provision of the forcible reset period, it is possible to give a signal sufficient to quench the picture element during the period.

In the display-driving device constructed as described above, it is also preferable that the second subfield block is composed of at least one redundant display cycle and at least one unit display cycle.

In this arrangement, it is also possible to reduce the number of row scanning cycles in the second subfield block. Therefore, it is possible to realize the further reduction of electric power consumption.

In the display-driving device constructed as described above, it is also preferable that the display comprises an optical waveguide plate for introducing light thereinto, and the driving section provided opposingly to one plate surface of the optical waveguide plate and including a number of actuator elements arranged corresponding to the large number of picture elements, for displaying, on the optical waveguide plate, the picture image corresponding to the image signal by controlling leakage light at a predetermined portion of the optical waveguide plate by controlling displacement action of each of the actuator elements in a direction to make contact or separation with respect to the optical waveguide plate in accordance with an attribute of the image signal to be inputted.

In the present invention, it is desirable that the first and second driving circuits have the following features.

(1) The actuator element undergoes the capacitive load. Therefore, considering the fact that the capacitive load is subjected to the driving, it is desirable that the partial voltage ratio, which is applied to the capacitive load, is not less than 50%, for example, at the time of completion of voltage (ON voltage) application for allowing the actuator element to make the bending displacement.

(2) In order to obtain an displacement amount of the actuator element which makes it possible to express the ON state and the OFF state of the picture element, it is desirable that an voltage output of not less than 20 V can be provided.

(3) It is desirable to consider the fact that the direction of the output current is recognized to be bidirectional.

(4) It is desirable that the load concerning the two-electrode structure in the row direction and the column direction can be subjected to the driving.

Especially, it is also preferable that the actuator element comprises a shape-retaining layer, an operating section having at least a pair of electrodes formed on the shape-retaining layer, a vibrating section for supporting the operating section, and a fixed section for supporting the vibrating section in a vibrating manner; wherein the display comprises a displacement-transmitting section for transmitting the displacement action of the actuator element to the optical waveguide plate, the displacement action being generated by voltage application to the pair of electrodes.

In the present invention, the term "actuator element having the shape-retaining layer" indicates an actuator element which has at least two or more displacement states at an identical voltage level.

Accordingly, all of the light, which is introduced, for example, from the end of the optical waveguide plate, is totally reflected at the inside of the optical waveguide plate without being transmitted through the front and back surfaces of the optical waveguide plate (light off state), by regulating the magnitude of the refractive index of the optical waveguide plate. In this light off state, for example, when the displacement-transmitting section contacts with the back surface of the optical waveguide plate at a distance of not more than the wavelength of the light, then the light, which has been totally reflected, is transmitted to the surface of the displacement-transmitting section contacting with the back surface of the optical waveguide plate. The light, which has once reached the surface of the displacement-transmitting section, is reflected by the surface of the displacement-transmitting section, and the light behaves as scattered light. A part of the scattered light is reflected again at the inside of the optical waveguide plate. However, almost all of the scattered light is not reflected by the optical waveguide plate, and the light is transmitted through the front surface of the optical waveguide plate (light emission state).

As described above, it is possible to control the presence or absence of light emission (leakage light) at the front surface of the optical waveguide plate, depending on the presence or absence of the contact of the displacement-transmitting section disposed at the back of the optical waveguide plate. In this case, one unit for allowing the displacement-transmitting section to make the displacement action in the direction to give contact or separation with respect to the optical waveguide plate may be regarded as one picture element. Thus, a picture image (for example, characters and graphics) corresponding to an image signal can be displayed on the front surface of the optical waveguide plate in the same manner as in the cathode ray tube and the liquid crystal display, by arranging a large number of such picture elements in a matrix form, and controlling the displacement action of each of the picture elements in accordance with an attribute of the inputted image signal.

The actuator element having the shape-retaining layer has the following features.

(1) The threshold characteristic concerning the change from the light off state to the light emission state is steep as compared with the case in which no shape-retaining layer exists. Accordingly, it is possible to narrow the deflection width of the voltage, and it is possible to mitigate the load on the circuit.

(2) The difference between the light emission state and the light off state is distinct, resulting in improvement in contrast.

(3) The dispersion of threshold value is decreased, and an enough margin is provided for the voltage setting range.

It is desirable to use, as the actuator element, an actuator element which makes, for example, upward displacement (giving the separated state upon no voltage load and giving the contact state upon voltage application) because of easiness of control. Especially, it is desirable to use an actuator element having a structure including a pair of electrodes on its surface. It is preferable to use, for example, a piezoelectric/electrostrictive layer and an anti-ferroelectric layer as the shape-retaining layer.

In the display-driving device constructed as described above, it is also preferable that the driving section is formed with switching elements corresponding to the actuator elements respectively; and the displacement action of the actuator element is controlled by means of ON/OFF control effected by the switching element.

Accordingly, the large number of arranged actuator elements are selected in the unit of row on the basis of the input of the image signal, and the display information (voltage signal) concerning the selected row is supplied.

Usually, the voltage signal is also supplied to the actuator elements concerning the unselected row irrelevant to the selected row. However, in the case of the display according to the present invention, the actuator elements concerning the unselected row are operated as follows. That is, the unselected row can be prevented from the supply of the display information by turning off the corresponding switching elements. Accordingly, it is unnecessary to drive the picture elements (actuator elements) concerning the unselected row. Thus, it is possible to effectively reduce the electric power consumption.

The electrostatic capacity of the actuator element is small, and the CR time constant depending on the wiring resistance and the switching ON resistance is small. Therefore, when the switching element is turned on, the actuator elements concerning the selected row are quickly charged. When the switching element is turned off thereafter, the connected section between the display information supply line (signal line) and the actuator element is in a state of extremely high impedance, i.e., in a state approximately equivalent to the open state. This means the fact that the resistance becomes extremely large.

Therefore, the CR time constant also becomes extremely large.

Accordingly, even when the switching element is turned off, the supply of the display information (application of the voltage signal) to the actuator element is maintained. Therefore, the concerning actuator element continuously maintains the displacement amount of not less than a certain amount. Thus, the ON state of the concerning picture element is maintained.

As described above, the actuator element concerning the unselected row is maintained in the open state while being charged. The displacement amount, which has been given upon the selection of the row, can be maintained for a certain period of time in the state of being applied with no signal. Therefore, it is possible to effect the light emission of the picture element during the unselection period. Accordingly, it is possible to realize the high brightness.

The respective switching elements can be formed on the driving section (either on the principal surface or on the back surface thereof). Therefore, it is unnecessary to form any large wiring pattern on the driving section. Thus, it is possible to simplify the wiring arrangement.

Unlike the liquid crystal display (TFT-LCD), the respective switching elements can be installed in the space (at the place) irrelevant to the optical path. The respective switching elements can be provided on the back surface of the driving section. Accordingly, it is possible to provide a large numerical aperture of the picture element, and thus it is possible to improve the brightness.

It is preferable that the switching element is composed of a varistor. In this arrangement, an extremely excellent hysteresis characteristic is obtained when the actuator element is allowed to perform the displacement action. Thus, it is possible to obtain an memory effect as providing the approximately complete shape maintenance.

According to another aspect of the present invention, there is provided a display-driving method for a display comprising a driving section including a large number of picture elements arranged in a matrix form for displaying a picture image corresponding to a supplied image signal; the display-driving method comprising the steps of selecting the picture elements at least in one row unit; outputting display information composed of an ON signal and an OFF signal to a selected row; and performing gradation control based on at least a temporal modulation system; wherein assuming that a display period for one image is one field, a light emission start timing and a light emission maintenance period having a variable length irrelevant to a selection/unselection state of the concerning picture element are determined in the one field depending on a gradation level of the selected picture element.

In this method, it is also preferable that one selection period and display cycles of a number corresponding to a maximum gradation level are allotted in the one field; each of the display cycles is composed of an unselection period and a reset period; and the concerning picture element is in a light emission state when the ON signal indicating light emission is inputted during the selection period; or the concerning picture element is in a light off state when the OFF signal indicating light off is inputted during the reset period in the display cycle.

In this case, it is also preferable that signal levels are determined for the unselection period and the reset period so that the light emission state of the concerning picture element is maintained during the light emission maintenance period; and signal levels are determined for the selection period and the unselection period so that the light off state of the concerning picture element is maintained during any period other than the light emission maintenance period.

Further, it is also preferable that display cycles of a number corresponding to a maximum gradation level and one reset period are allotted in the one field; each of the display cycles is composed of a s election period and an unselection period; and the concerning picture element is in a light emission state when the ON signal indicating light emission is inputted during the selection period; or the concerning picture element is in a light off state during the reset period.

In this case, it is also preferable that signal levels are determined for the selection period and the unselection period so that the light emission state of the concerning picture element is maintained during the light emission maintenance period.

In the method described above, it is also preferable that an odd/even-adjusting cycle including a unit unselection period having a predetermined length between two selection periods, and display cycles of a number corresponding to a maximum gradation level are allotted in the one field; and each of the display cycles is provided with a redundant unselection period having a length which is twice the predetermined length and a reset period.

When the gradation level of the concerning picture element is odd, the light emission start timing is set to be substantially in synchronization with the head selection period of the odd/even-adjusting cycle; while when the gradation level of the concerning picture element is even, the light emission start timing is set to be substantially in synchronization with the rear end selection period of the odd/even-adjusting cycle.

In the method described above, it is also preferable that display cycles of a number corresponding to a maximum gradation level, and an odd/even-adjusting cycle including a unit unselection period having a predetermined length between two reset periods are allotted in the one field; and each of the display cycles is provided with a selection period and a redundant unselection period having a length which is twice the predetermined length.

When the gradation level of the concerning picture element is odd, an end timing for the light emission maintenance period is set to be substantially in synchronization with the terminal end reset period of the odd/even-adjusting cycle; while when the gradation level of the concerning picture element is even, the end timing for the light emission maintenance period is set to be substantially in synchronization with the head reset period of the odd/even-adjusting cycle.

In the method described above, it is also preferable that at least one unit display cycle including a unit unselection period having a predetermined length, and at least one redundant display cycle are allotted in the one field; and the redundant display cycle is provided with a redundant unselection period having a length which is n-times the predetermined length (n is an integer of not less than 2).

In this case, it is also preferable that the following expressions are satisfied:

$Z$=(quotient of $X/n$)$-1$ $Y$=$X$$-$$Z$$\times$$n$

[total number of subfields $(Y+Z)=(X/n-1)+n$]

provided that a maximum gradation level is X, a number of unit display cycles is Y, and a number of redundant display cycles is Z.

It is also preferable that "a" individuals of selection periods are allotted to the respective display cycles from a head of the one field, and "b" individuals of reset periods are allotted to the respective display cycles from a rear end of the one field; wherein the following expression is satisfied:

$a+b=Y+Z+1$.

In this case, there may be given b=n, or b=n−1.

Especially, it is preferable that the unit display cycle and the redundant display cycle are allotted by using a combination which corresponds to a minimum total number of subfields of total numbers of subfields corresponding to a maximum gradation level obtained by arbitrarily combining the unit display cycle and the redundant display cycle.

In the method described above, it is also preferable that the one field includes therein a first subfield block composed of at least one redundant display cycle and a second subfield block composed of at least one unit display cycle; and a forcible reset period is provided between the first and second subfield blocks.

In this case, it is also preferable that the second subfield block is composed of at least one redundant display cycle and at least one unit display cycle.

In the driving method described above, it is also preferable that the gradation control is performed for the picture element by means of ON/OFF control effected by a switching element. In this case, it is preferable that a varistor is used as the switching element.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 12 shows an equivalent circuit concerning respective picture elements arranged in a driving section of the display according to the first modified embodiment;

FIG. 21 shows a bending displacement characteristic of a material having no hysteresis;

FIG. 23 illustrates an example of lamination of a varistor substrate to an actuator substrate;

FIG. 30A illustrates, for example, allotment of display cycles used in a driving system according to a first specified embodiment;

FIG. 30B shows signal waveforms illustrating the process for determining the light emission maintenance period concerning a picture element of first row and first column;

FIG. 30C shows signal waveforms illustrating the process for determining the light emission maintenance period concerning a picture element of second row and first column;

FIG. 33A illustrates, for example, allotment of display cycles used in a driving system according to a second specified embodiment;

FIG. 33B shows signal waveforms illustrating the process for determining the light emission maintenance period concerning a picture element of first row and first column;

FIG. 33C shows signal waveforms illustrating the process for determining the light emission maintenance period concerning a picture element of second row and first column;

FIG. 35A illustrates, for example, allotment of display cycles used in a driving system according to a fourth specified embodiment;

FIG. 35B shows signal waveforms illustrating the process for determining the light emission maintenance period concerning a picture element of first row and first column;

FIG. 35C shows signal waveforms illustrating the process for determining the light emission maintenance period concerning a picture element of second row and first column;

FIG. 39 shows a table illustrating the total number of subfields corresponding to the maximum gradation level obtain by arbitrary combining the unit display cycle and the redundant display cycle;

FIG. 42 shows a table illustrating the relationship concerning, in the first to ninth specified embodiments, the selection pulse, the unselection signal, and the reset pulse outputted from the row electrode-driving circuit, the electric potentials of the ON signal and the OFF signal outputted from the column electrode-driving circuit, and the voltage applied between the row electrode and the column electrode of each of the picture elements;

FIG. 44 shows a table illustrating an example of the relationship concerning the selection pulse, the unselection signal, and the reset pulse outputted from the row electrode-driving circuit, the electric potentials of the ON signal and the OFF signal outputted from the column electrode-driving circuit, and the voltage applied between the row electrode and the column electrode of each of the picture elements when the driving system concerning any of the first to ninth specified embodiments is applied to the display according to the sixth modified embodiment;

FIG. 45 shows a table illustrating another example of the relationship concerning the selection pulse, the unselection signal, and the reset pulse outputted from the row electrode-driving circuit, the electric potentials of the ON signal and the OFF signal outputted from the column electrode-driving circuit, and the voltage applied between the row electrode and the column electrode of each of the picture elements when the driving system concerning any of the first to ninth specified embodiments is applied to the display according to the sixth modified embodiment;

DESCRIPTION OF THE PREFERRED EMBODIMENTS

Illustrative embodiments of the display-driving device and the display-driving method according to the present invention (hereinafter simply referred to as "driving device according to the embodiment") will be explained below with reference to FIGS. 1 to 48B. Prior thereto, explanation will be made with reference to FIGS. 1 to 28 for the arrangement of the display to which the driving device according to the embodiment of the present invention is applied.

General Structure of Display

Figure 1:
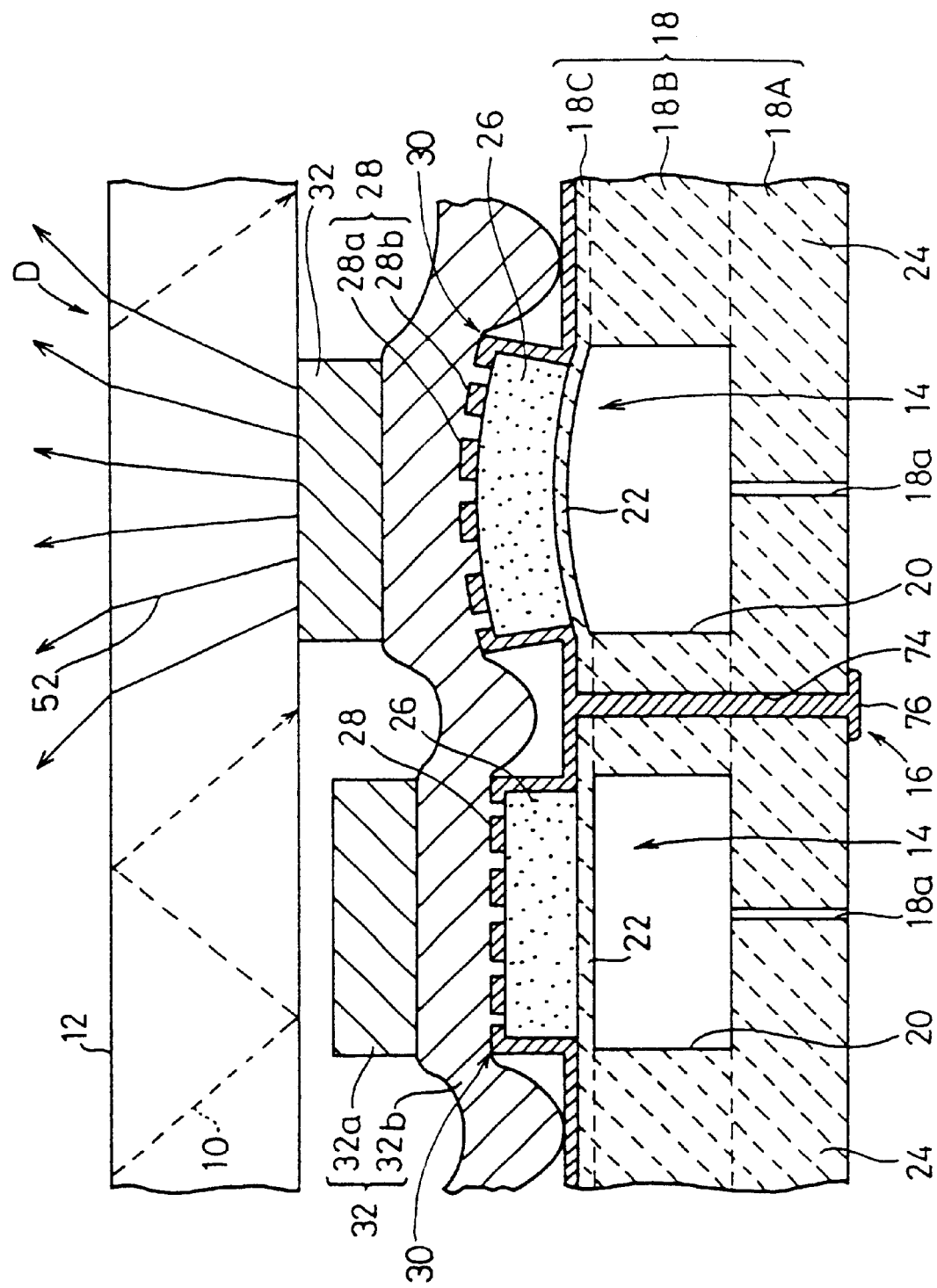
FIG. 1 shows a cross-sectional arrangement illustrating a display to which a driving device according to an embodiment of the present invention is applied.

As shown in FIG. 1, the display D comprises an optical waveguide plate 12 for introducing light 10 from a light source (not shown) thereinto, and a driving section 16 provided opposingly to the back surface of the optical waveguide plate 12 and including a large number of actuator elements 14 which are arranged corresponding to picture elements (image pixels).

The display section 16 includes an actuator substrate 18 composed of, for example, ceramics. The actuator elements 14 are arranged at positions corresponding to the respective picture elements on the actuator substrate 18. The actuator substrate 18 has its first principal surface which is arranged to oppose to the back surface of the optical waveguide plate 12. The first principal surface is a continuous surface (flushed surface). Hollow spaces 20 for forming respective vibrating sections as described later on are provided at positions corresponding to the respective picture elements at the inside of the actuator substrate 18. The respective hollow spaces 20 communicate with the outside via through-holes 18a each having a small diameter and provided at a second principal surface of the actuator substrate 18.

The portion of the actuator substrate 18, at which the hollow space 20 is formed, is thin-walled. The other portion of the actuator substrate 18 is thick-walled. The thin-walled portion has a structure which tends to undergo vibration in response to external stress, and it functions as a vibrating section 22. The portion other than the hollow space 20 is thick-walled, and it functions as a fixed section 24 for supporting the vibrating section 22.

That is, the actuator substrate 18 has a stacked structure comprising a substrate layer 18A as a lowermost layer, a spacer layer 18B as an intermediate layer, and a thin plate layer 18C as an uppermost layer. The actuator substrate 18 can be recognized as an integrated structure including the hollow spaces 20 formed at the positions in the spacer layer 18B corresponding to the picture elements. The substrate layer 18A functions as a substrate for reinforcement, as well as it functions as a substrate for wiring. The actuator substrate 18 may be sintered in an integrated manner, or it may be additionally attached.

As shown in FIG. 1, each of the actuator elements 14 comprises the vibrating section 22 and the fixed section 24 described above, as well as a main actuator element 30 including a shape-retaining layer 26 composed of, for example, a piezoelectric/electrostrictive layer or an antiferroelectric layer directly formed on the vibrating section 22 and a pair of electrodes 28 (a row electrode 28a and a column electrode 28b) formed on an upper surface of the shape-retaining layer 26, and a displacement-transmitting section 32 connected onto the main actuator element 30 as shown in FIG. 1, for increasing the contact area with respect to the optical waveguide plate 12 to obtain an area corresponding to the picture element.

That is, the display D has the structure in which the main actuator elements 30 comprising the shape-retaining layers 26 and the pairs of electrodes 28 are formed on the actuator substrate 18. The pair of electrodes 28 may have a structure in which they are formed on upper and lower sides of the shape-retaining layer 26, or they are formed on only one side of the shape-retaining layer 26. However, in order to advantageously join the actuator substrate 18 and the shape-retaining layer 26, it is preferable that the pair of electrodes 28 are formed only on the upper side (the side opposite to the actuator substrate 18) of the shape-retaining layer 26 so that the actuator substrate 18 directly contacts with the shape-retaining layer 26 without any difference in height, as in the display D.

Explanation of Shapes and Related Matters of Respective Constitutive Members The shapes of the respective members are described in detail in Japanese Laid-Open Patent Publication No. 10-578549. Therefore, they will be described briefly herein.

At first, those adopted for the planar configurations of the vibrating section 22 and the shape-retaining layer 26 include, for example, circular configurations, oblong circular configurations (track-shaped configurations), elliptic configurations, rectangular configurations (including configurations with rounded corners), and polygonal configurations (including, for example, octagonal configurations with rounded apex angles).

In this embodiment, the size of the vibrating section is the largest, and the outer circumferential configuration of the pair of electrodes 28 is the second largest. The planar configuration of the shape-retaining layer 26 is designed to be the smallest. Alternatively, it is allowable that the outer circumferential configuration of the pair of electrodes 28 is designed to be the largest.

Figure 2:
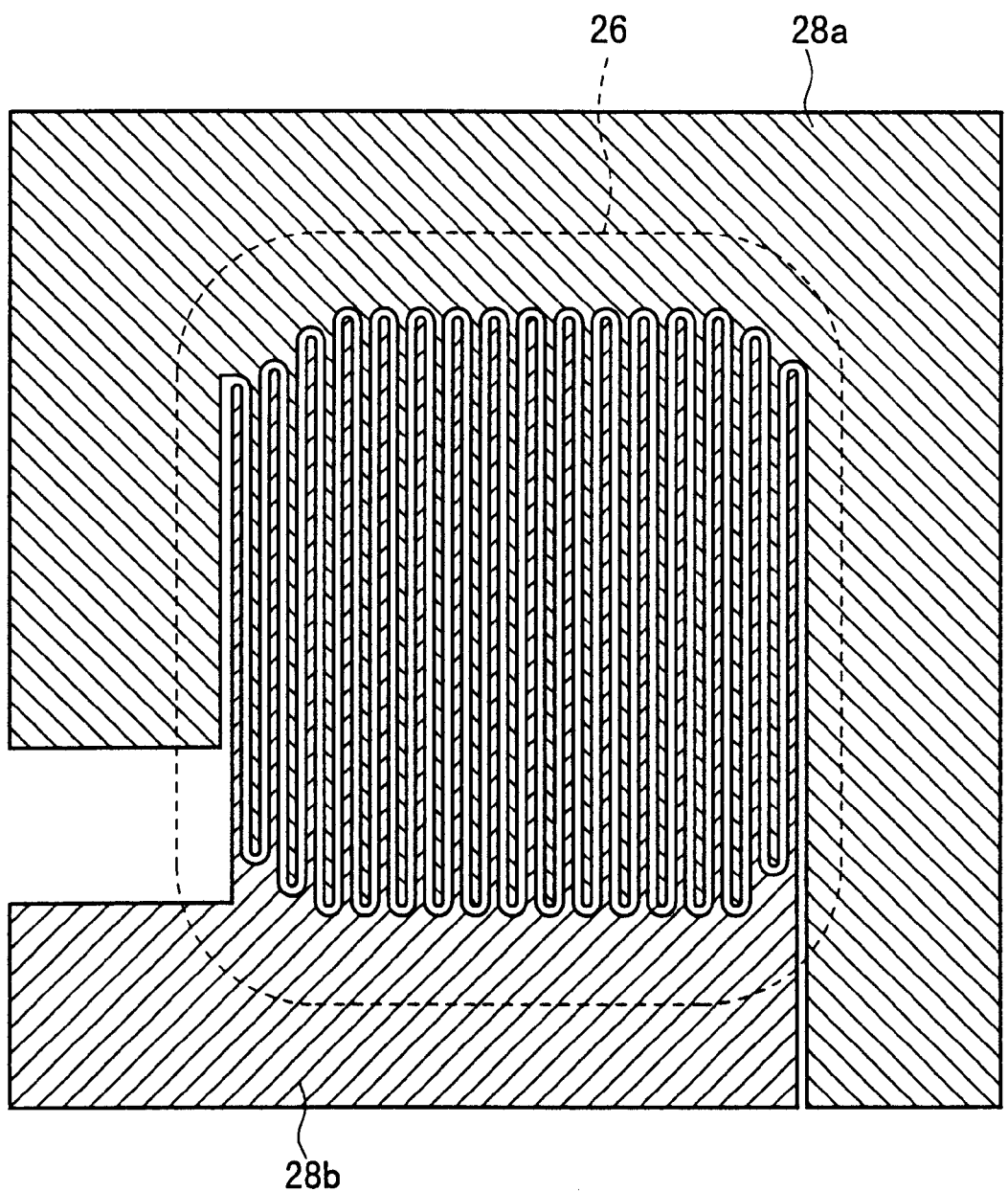
FIG. 2 shows a view illustrating an example of a planar configuration of a pair of electrodes formed on an actuator element.

The planar configuration of the pair of electrodes 28 (the row electrode 28a and the column electrode 28b) may be a shape in which a large number of comb teeth are opposed to one another in a complementary manner as shown in FIG. 2. Alternatively, it is possible to :adopt, for example, a spiral configuration and a branched configuration as disclosed in Japanese Laid-Open Patent Publication No. 10-78549 as well.

Figure 3A:
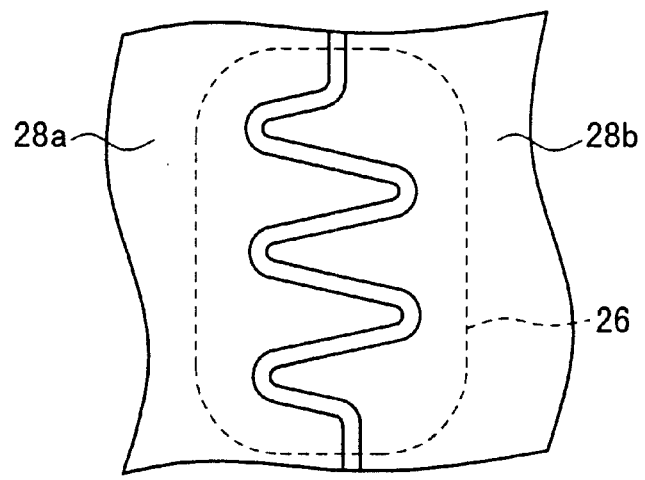
FIG. 3A illustrates an example in which comb teeth of a pair of electrodes are arranged along a major axis of a shape-retaining layer.
Figure 3B:
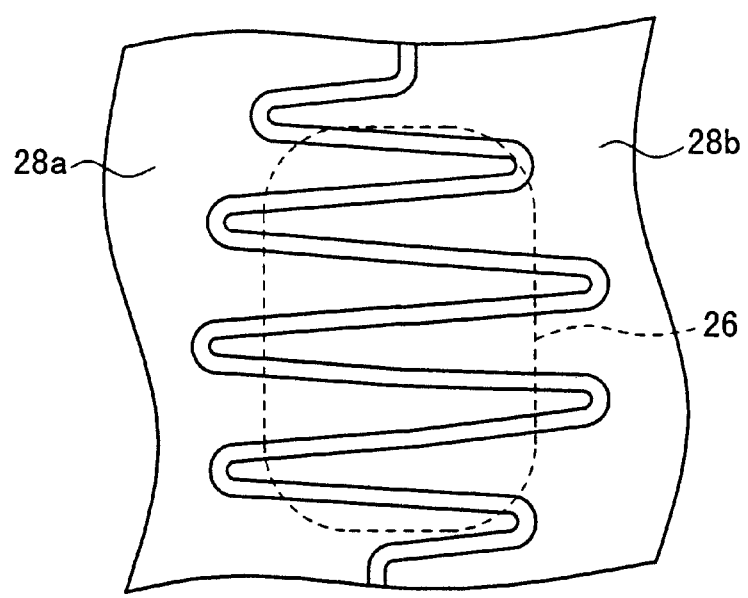
FIG. 3B illustrates another example.
Figure 4A:
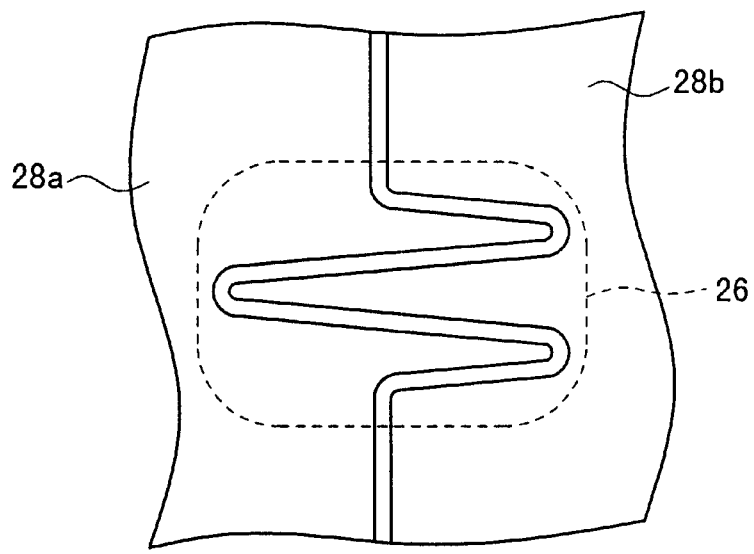
FIG. 4A illustrates an example in which comb teeth of a pair of electrodes are arranged along a minor axis of a shape-retaining layer.
Figure 4B:
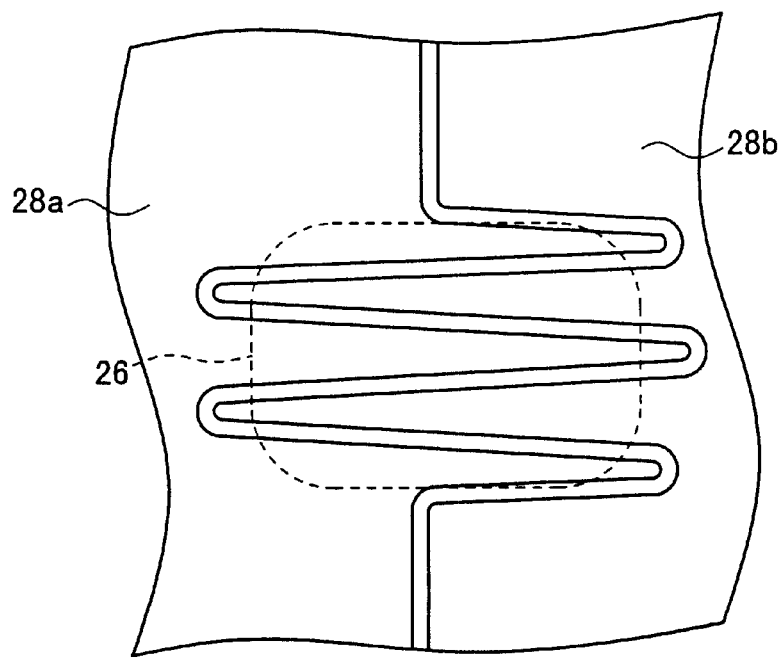
FIG. 4B illustrates another example.

When the planar configuration of the shape-retaining layer 26 is, for example, an elliptic configuration, and the pair of electrodes 28 are formed to have a comb teeth-shaped configuration, then it is possible to adopt, for example, a form in which the comb teeth of the pair of electrodes 28 are arranged along the major axis of the shape-retaining layer 26 as shown in FIGS. 3A and 3B, and a form in which the comb teeth of the pair of electrodes 28 are arranged along the minor axis of the shape-retaining layer 26 as shown in FIGS. 4A and 4B.

It is possible to adopt, for example, the form in which the comb teeth of the pair of electrodes 28 are included in the planar configuration of the shape-retaining layer 26 as shown in FIGS. 3A and 4A, and the form in which the comb teeth of the pair of electrodes 28 protrude from the planar configuration of the shape-retaining layer 26 as shown in FIGS. 3B and 4B. The form shown in FIGS. 3B and 4B are more advantageous to effect the bending displacement of the actuator element 14.

Figure 5:
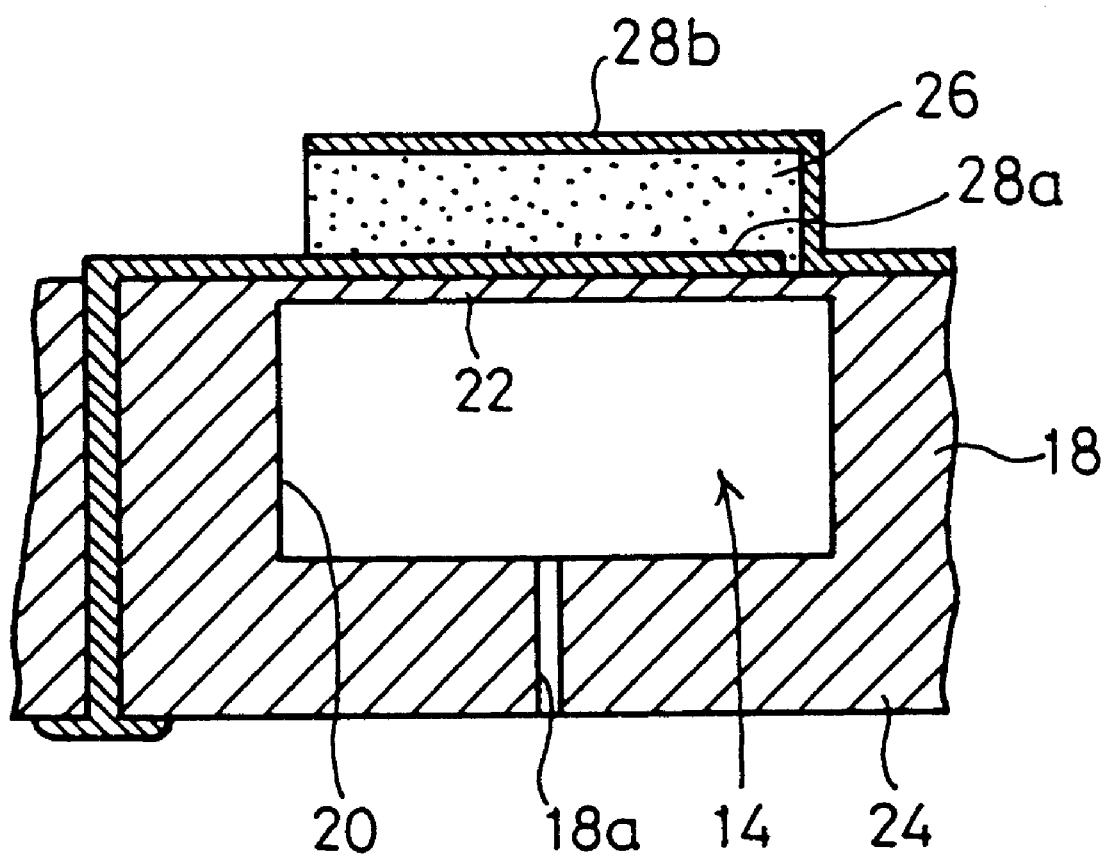
FIG. 5 shows an arrangement illustrating another example of a pair of electrodes formed on the actuator element.

The pair of electrodes 28 may be arranged, for example, as follows as shown in FIG. 5. That is, for example, the row electrode 28a is formed on the lower surface of the shape-retaining layer 26, and the column electrode 28b is formed on the upper surface of the shape-retaining layer 26.

In this embodiment, as shown in FIG. 1, it is possible that the actuator element 14 is allowed to make bending displacement in the first direction so that it is convex toward the optical waveguide plate 12. Alternatively, it is also possible that the actuator element 14 is allowed to make bending displacement in the second direction so that it is convex toward the hollow space 20.

The wiring arrangement communicating with the respective electrodes 28a, 28b will be explained on the basis of an example shown in FIG. 6. That is, the wiring arrangement includes vertical selection lines 40 having a number corresponding to a number of rows of a large number of the picture elements, and signal lines 42 having a number corresponding to a number of columns of the large number of the picture elements.

Each of the vertical selection lines 40 is electrically connected to the row electrode 28a of each of the picture elements (actuator elements 14, see FIG. 1). Each of the signal lines 42 is electrically connected to the column electrode 28b of each of the picture elements 14. The respective vertical selection lines 40, which are included in one row, are wired in series such that the wiring is led from the row electrode 28a provided for the picture element in the previous column, and then the wiring is connected to the row electrode 28a provided for the picture element in the present column. The signal line 42 comprises a main line 42a extending in the direction of the column, and branch lines 42b branched from the main line 42a and connected to the column electrode 28b of each of the picture elements 14.

The voltage signal is supplied to the respective vertical selection lines 40 from an unillustrated wiring board (stuck to the second principal surface of the substrate 18) via through-holes 44. The voltage signal is also supplied to the respective signal lines 42 from the unillustrated wiring board via through-holes 46.

The through-hole 44 for the vertical selection line 40 is not formed on the vertical selection line 40, unlike the through-hole 46 for the signal line 42. Accordingly, a mediating conductor 48 is formed between the through-hole 44 and one of the electrodes 28a, for making electric continuity therebetween.

Insulative films 50 (shown by two-dot chain lines), each of which is composed of, for example, a silicon oxide film, a glass film, or a resin film, are allowed to intervene at portions of intersection between the respective vertical selection lines 40 and the respective signal lines 42, in order to ensure insulation between the mutual wiring arrangements 40, 42.

The configuration of the vibrating section 22, the planar configuration of the shape-retaining layer 26, and the outer circumferential configuration formed by the pair of electrodes 28 may be combinations of circular and elliptic configurations, or combinations of rectangular and elliptic configurations, without any special limitation.

Although not shown, those preferably adopted as the planar configuration of the shape-retaining layer 26 include a ring-shaped configuration. In this case, those usable as the outer circumferential configuration include various ones such as circular, elliptic, and rectangular configurations. The ring-shaped planar configuration of the shape-retaining layer 26 makes it unnecessary to form any electrode on the hollow portion. Therefore, it is possible to decrease the electrostatic capacity without decreasing the displacement amount.

Figure 6:
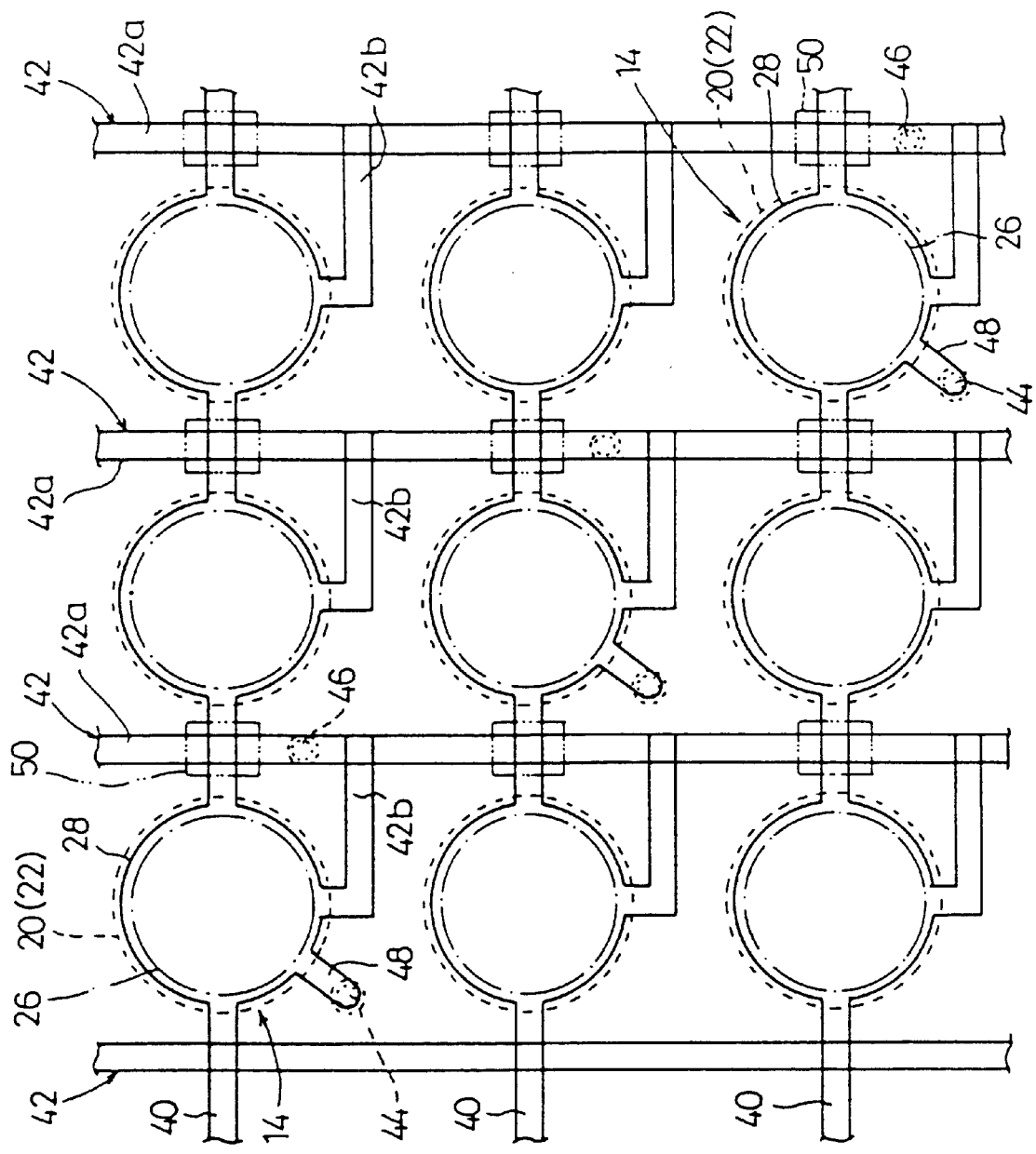
FIG. 6 shows a magnified plan view illustrating an arrangement of actuator elements (picture elements) included in the display.

In the illustrative arrangement shown in FIG. 6, the respective actuator elements 14 (picture elements) are illustratively arranged in the matrix form on the actuator substrate 18. Alternatively, it is also preferable that the picture elements (actuator elements) 14 are arranged in a zigzag form with respect to the respective rows.

Explanation of Shape-Retaining Layer

By the way, when the piezoelectric/electrostrictive layer is used as the shape-retaining layer 26, those usable as the piezoelectric/electrostrictive layer include ceramics containing, for example, lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstate, and lead cobalt niobate, as well as any combination of them. It is needless to say that the major component contains the compound as described above in an amount of not less than 50% by weight. Among the ceramics described above, the ceramics containing lead zirconate is most frequently used as the constitutive material of the piezoelectric/electrostrictive layer according to the embodiment of the present invention.

When the piezoelectric/electrostrictive layer is composed of ceramics, it is also preferable to use ceramics obtained by appropriately adding, to the ceramics described above, oxide of, for example, lanthanum, calcium, strontium, molybdenum, tungsten, barium, niobium, zinc, nickel, and manganese, or any combination thereof or another type of compound thereof. For example, it is preferable to use ceramics containing a major component composed of lead magnesium niobate, lead zirconate, and lead titanate and further containing lanthanum and strontium.

The piezoelectric/electrostrictive layer may be either dense or porous. When the piezoelectric/electrostrictive layer is porous, its porosity is preferably not more than 40%.

When the anti-ferroelectric layer is used as the shape-retaining layer 26, it is desirable to use, as the anti-ferroelectric layer, a compound containing a major component composed of lead zirconate, a compound containing a major component composed of lead zirconate and lead stannate, a compound obtained by adding lanthanum to lead zirconate, and a compound obtained by adding lead zirconate and lead niobate to a component composed of lead zirconate and/or lead stannate.

Especially, when an anti-ferroelectric film, which contains a component comprising lead zirconate and lead stannate as represented by the following composition, is applied as a film-type element such as the actuator element 14, it is possible to perform driving at a relatively low voltage. Therefore, application of such an anti-ferroelectric film is especially preferred.

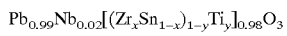

wherein, $0.5<x<0.6$, $0.05<y<0.063$, $0.01<Nb<0.03$

The anti-ferroelectric layer may be porous. When the anti-ferroelectric layer is porous, it is desirable that the porosity is not more than 30%.

Those usable as the method for forming the shape-retaining layer 26 on the vibrating section 22 include various types of the thick film formation method such as the screen printing method, the dipping method, the application method, and the electrophoresis method, and various types of the thin film formation method such as the ion beam method, the sputtering method, the vacuum evaporation method, the ion plating method, the chemical vapor deposition method (CVD), and the plating.

In this embodiment, when the shape-retaining layer 26 is formed on the vibrating section 22, the thick film formation method is preferably adopted, based on, for example, the screen printing method, the dipping method, the application method, and the electrophoresis method.

In the techniques described above, the shape-retaining layer 26 can be formed by using, for example, paste, slurry, suspension, emulsion, or sol containing a major component of piezoelectric ceramic particles having an average grain size of 0.01 to 5 μm, preferably 0.05 to 3 μm, in which it is possible to obtain good piezoelectric operation characteristics.

Especially, the electrophoresis method makes it possible to form the film at a high density with a high shape accuracy, and it further has the features as described in technical literatures such as Anzai, Kazuo, "*Preparation of Electronic Materials by Electrophoretic Deposition*," General Institute of Toshiba Corporation, Denki Kagaku 53, No. 1, 1985, pp. 63–68, Goto, Atsushi, et al., "*PbZrO₃/PbTiO₃, Composite Ceramics Fabricated by Electrophoretic Deposition*," Tokyo Metropolitan University, Tokyo Medical and Dental University, Proceedings of First Symposium on Higher-Order Ceramic Formation Method Based on Electrophoresis, 1998, pp. 5–6, and Yamashita, Kimihiro, "*Hybridization of Ceramics by Electrophoretic Deposition*," Institute of Medical and Dental Engineering, Tokyo Medical and Dental University, Proceedings of First Symposium on Higher-Order Ceramic Formation Method Based on Electrophoresis, 1998, pp. 23–24. Therefore, the technique may be appropriately selected and used considering, for example, the required accuracy and the reliability.

Explanation of Operation of Display

Next, the operation of the display D constructed as described above will be briefly described with reference to FIG. 1. At first, the light 10 is introduced, for example, from the end portion of the optical waveguide plate 12. In this embodiment, all of the light 10 is totally reflected at the inside of the optical waveguide plate 12 without being transmitted through the front and back surfaces thereof by controlling the magnitude of the refractive index of the optical waveguide plate 12. In this state, when a certain actuator element 14 is in the selected state, and the displacement-transmitting section 32 corresponding to the actuator element 14 contacts, at a distance of not more than the wavelength of light 10, with the back surface of the optical waveguide plate 12, then the light 10, which has been totally reflected until that time, is transmitted to the surface of the displacement-transmitting section 32 contacting with the back surface of the optical waveguide plate 12.

The light 10, which has once arrived at the surface of the displacement-transmitting section 32, is reflected by the surface of the displacement-transmitting section 32, and it behaves as scattered light 52. A part of the scattered light 52 is reflected again in the optical waveguide plate 12. However, almost all of the scattered light 52 is not reflected by the optical waveguide plate 12, and it is transmitted through the front surface of the optical waveguide plate 12.

That is, the presence or absence of light emission (leakage light) at the front surface of the optical waveguide plate 12 can be controlled depending on the presence or absence of the contact of the displacement-transmitting section 32 disposed at the back of the optical waveguide plate 12. Especially, In the display according to the embodiment of the present invention, one unit for making the displacement action of the displacement-transmitting section 32 in the direction to make contact or separation with respect to the optical waveguide plate 12 may be recognized as one picture element. A large number of the picture elements are arranged in a matrix configuration or in a zigzag configuration concerning the respective rows. Therefore, it is possible to display a picture image (characters and graphics) corresponding to the image signal on the front surface of the optical waveguide plate in the same manner as in the cathode ray tube, the liquid crystal display device, and the plasma display, by controlling the displacement action in each of the picture elements in accordance with the attribute of the inputted image signal.

Principle of Operation of Actuator Element

Next, the principle of operation in the respective actuator elements 14, which is effected when the piezoelectric layer is used as the shape-retaining layer 26, will be explained on the basis of the bending displacement characteristic shown in FIG. 7 and the electric charge-applied voltage characteristic shown in FIG. 8.

Figure 7:
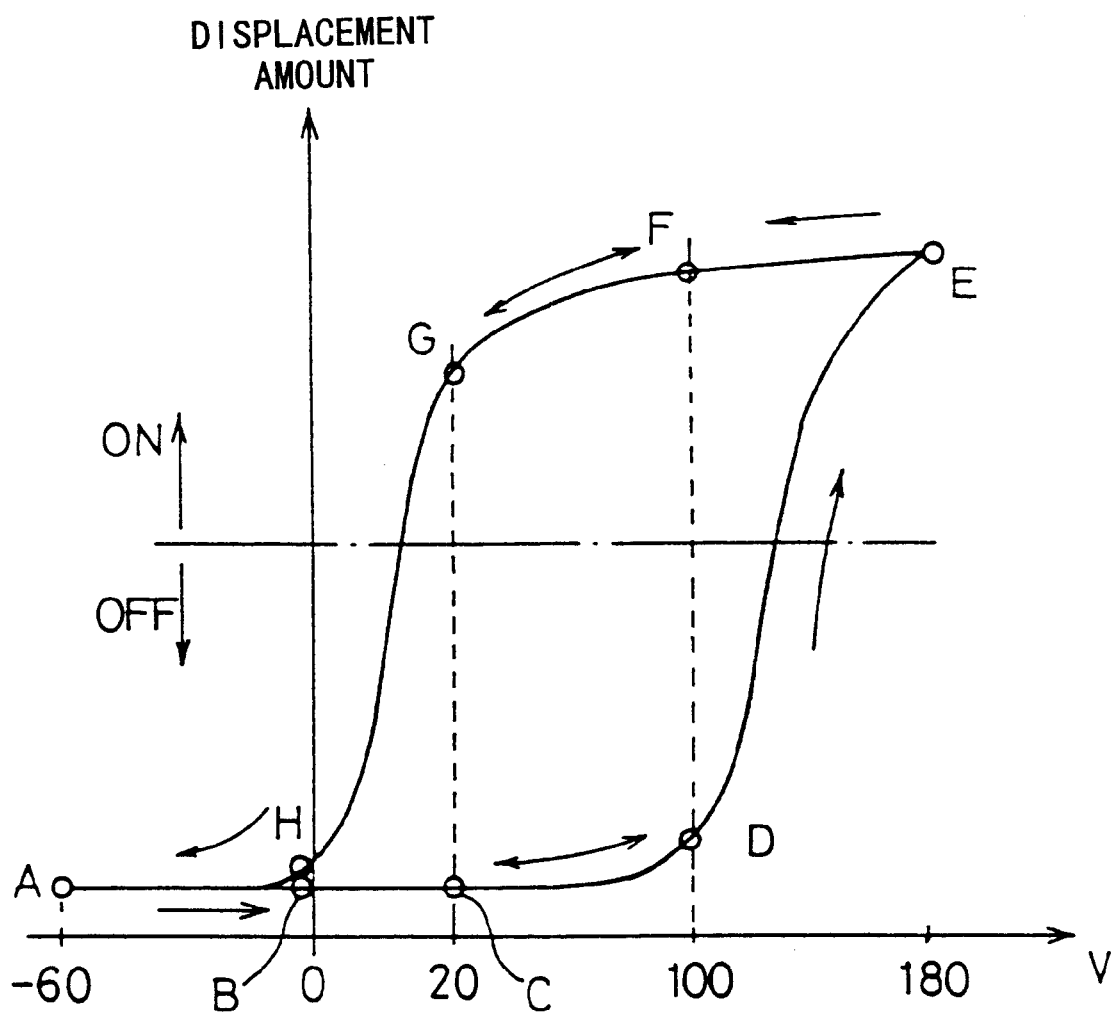
FIG. 7 shows a bending displacement characteristic of the actuator element.

The bending displacement characteristic shown in FIG. 7 is obtained by observing the bending displacement of the actuator element 14 while continuously changing the voltage applied to the actuator element 14. In this embodiment, as shown in FIG. 1, the direction of bending displacement is positive when the actuator element, 14 makes bending displacement in a first direction (direction to make approach to the optical waveguide plate 12).

Figure 8:
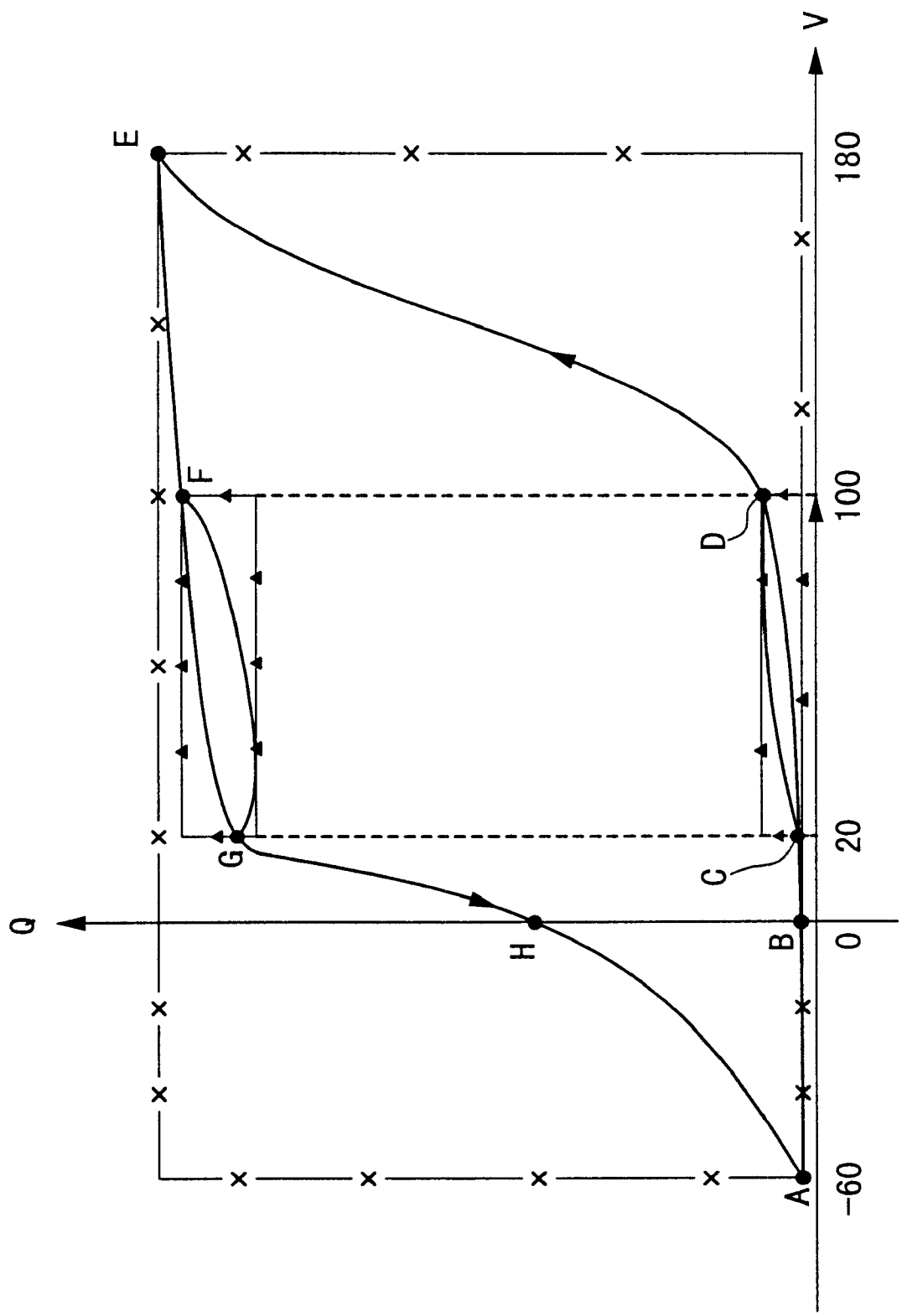
FIG. 8 shows an electric charge-applied voltage characteristic of the actuator element.

The electric charge-applied voltage characteristic shown in FIG. 8 is obtained by observing the change in amount of electric charge Q accumulated between the pair of electrodes 28a, 28b of the actuator element 14 while continuously changing the voltage applied to the actuator element 14 as well. In the display D shown in FIG. 1, the pair of electrodes 28a, 28b are connected as follows as explained with reference to FIG. 6. That is, the vertical selection line 40 is connected to the row electrode 28a, and the signal line 42 is connected to the column electrode 28b. Therefore, the applied voltage indicated along the horizontal axis in FIGS. 7 and 8 represents the voltage between the vertical selection line 40 and the signal line 42 relative to the concerning actuator element 14.

The measurement of the bending displacement characteristic will be specifically explained with reference to an example. At first, a sine wave having a frequency of 1 kHz, a positive peak voltage of 180 V, and a negative peak voltage of −60 v is applied between the pair of electrodes 28a, 28b of the actuator element 14. The displacement amount on this condition is continuously measured at respective points (Point A to Point H) by using a laser displacement meter. FIG. 7 shows the bending displacement characteristic obtained on this condition by plotting results of the measurement on the graph of voltage-bending displacement. As indicated by arrows in FIG. 7, the displacement amount of the bending displacement continuously changes in accordance with the continuous increase and decrease in applied voltage while providing a certain degree of hysteresis. As shown in FIG. 8, the amount of electric charge Q accumulated by the pair of electrodes 28a, 28b also continuously changes in accordance with the continuous increase and decrease in applied voltage while providing a certain degree of hysteresis, in the same manner as in the characteristic shown in FIG. 7.

Specifically, at first, it is assumed that the measurement is started from a no-voltage-loaded state (applied voltage=0 V) indicated by Point B. At Point B, no elongation occurs in the shape-retaining layer 26, and the displacement-transmitting section 32 and the optical waveguide plate 12 are in a separated state, i.e., in the light off state. The amount of electric charge Q is at the lowest level as well.

Next, when the positive peak voltage (=180 V) is applied between the pair of electrodes 28a, 28b of the actuator element 14, then the shape-retaining layer 26 is elongated in accordance with the increase in amount of electric charge Q as shown by Point E, and the actuator element 14 makes bending displacement in the first direction (the direction to make approach to the optical waveguide plate 12). At this time, the amount of electric charge Q is at the maximum level. The convex deformation of the actuator element 14 allows the displacement-transmitting section 32 to make displacement toward the optical waveguide plate 12, and the displacement-transmitting section 32 contacts with the optical waveguide plate 12.

The displacement-transmitting section 32 contacts with the back surface of the optical waveguide plate 12 in response to the bending displacement of the actuator element 14. When the displacement-transmitting section 32 contacts with the back surface of the optical waveguide plate 12, for example, the light 10, which has been totally reflected in the optical waveguide plate 12, is transmitted through the back surface of the optical waveguide plate 12, and it is transmitted to the surface of the displacement-transmitting section 32. The light 10 is reflected by the surface of the displacement-transmitting section 32. Accordingly, the picture element corresponding to the concerning actuator element 14 is in the light emission state.

The displacement-transmitting section 32 is provided to reflect the light transmitted through the back surface of the optical waveguide plate 12. Specifically, the displacement-transmitting section 32 is provided to increase the contact area with respect to the optical waveguide plate 12 to be not less than a predetermined size. That is, the light emission area is determined by the contact area between the displacement-transmitting section 32 and the optical waveguide plate 12.

In the display D described above, the displacement-transmitting section 32 includes the plate member 32a for determining the substantial light emission area, and the displacement-transmitting member 32b for transmitting the displacement of the main actuator element 30 to the plate member 32a.

The contact between the displacement-transmitting section 32 and the optical waveguide plate 12 means the fact that the displacement-transmitting section 32 and the optical waveguide plate 12 are positioned at a distance of not more than the wavelength of the light 10 (light 10 introduced into the optical waveguide plate 12).

It is preferable that portions other than the plate member 32a which makes contact with the optical waveguide plate 12 are covered with a black matrix formed by a metal film or a film containing carbon black, black pigment, or black dye. Especially, it is preferable to use, for example, a metal film such as those made of Cr, Al, Ni, and Ag as the black matrix, because of the following reason. That is, such a metal film absorbs a small amount of light, and hence it is possible to suppress attenuation and scattering of the light transmitted through the optical waveguide plate 12. Therefore, such a metal film is used especially preferably. Alternatively, when a film containing carbon black, black pigment, or black dye is used as the black matrix, then the light-absorbing performance is excellent, and it is possible to improve the contrast.

Next, when the voltage application to the pair of electrode 28a, 28b of the actuator element 14 is stopped to give the no-voltage-loaded state, the actuator element 14 intends to make restoration from the convex state to the original state (state indicated by Point B). However, due to the hysteresis characteristic, the actuator element 14 does not undergo complete restoration to the state of Point B, and it gives a state in which it is slightly displaced in the first direction from Point B (state indicated by Point H). In this state, the displacement-transmitting section 32 and the optical waveguide plate 12 are in a state in which they are separated from each other, i.e., in the light off state.

Next, when the negative peak voltage (−60 V) is applied between the pair of electrode 28a, 28b of the actuator element 14, the shape-retaining layer 26 is contracted as shown by Point A. Accordingly, the slight displacement in the first direction in the no-voltage-loaded state is counteracted, and the actuator element 14 completely makes restoration to the original state.

As also understood from the characteristic curves shown in FIGS. 7 and 8, the light emission state is maintained owing to the memory function (hysteresis characteristic) of the shape-retaining layer 26 even when the applied voltage is lowered, for example, up to +20 V to +100 V after giving the light emission state by applying the positive peak voltage (+180 V) between the pair of electrodes 28a, 28b. The memory function is also effected in the light off state in the same manner as described above. The light off state is maintained owing to the memory function (hysteresis characteristic) of the shape-retaining layer 26 even when the applied voltage is raised, for example, up to +20 V to +100 V after giving the light off state by applying, for example, 0 V or the negative peak voltage (−60 V) between the pair of electrodes 28a, 28b.

That is, the actuator element 14 having the shape-retaining layer 26 can be defined as an actuator element 14 which has at least two or more displacement states at an identical voltage level.

The actuator element 14 having the shape-retaining layer 26 has the following features.

(1) The threshold characteristic concerning the change from the light off state to the light emission state is steep as compared with the case in which no shape-retaining layer 26 exists. Accordingly, it is possible to narrow the deflection width of the voltage, and it is possible to mitigate the load on the circuit.

(2) The difference between the light emission state and the light off state is distinct, resulting in improvement in contrast.

(3) The dispersion of threshold value is decreased, and an enough margin is provided for the voltage setting range.

It is desirable to use, as the actuator element 14, an actuator element 14 which makes, for example, upward displacement (giving the separated state upon no voltage load and giving the contact state upon voltage application) because of easiness of control. Especially, it is desirable to use the structure having the pair of electrodes 28a, 28b on the surface.

Explanation of Driving Device

Figure 9:
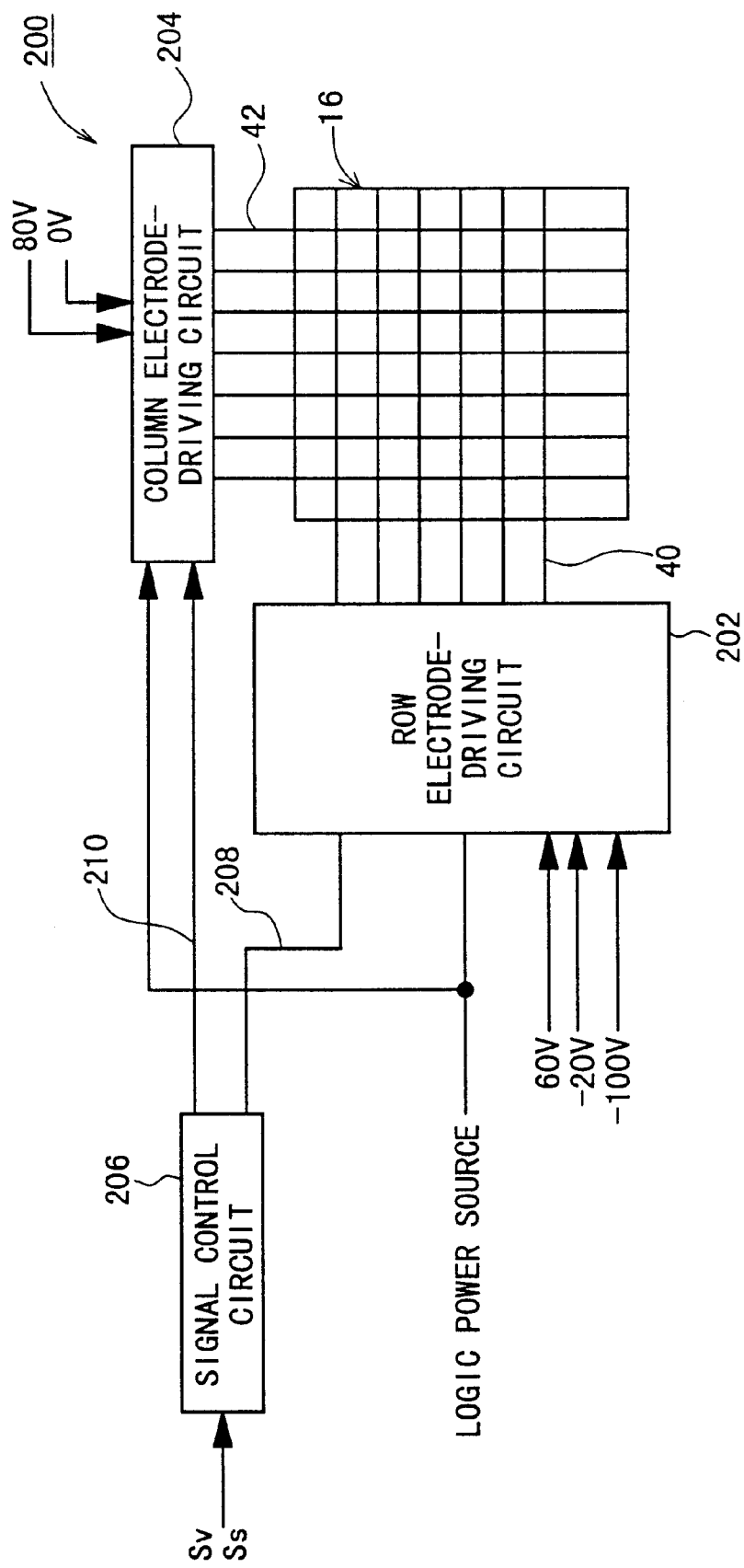
FIG. 9 shows an arrangement of the driving device according to the embodiment of the present invention.

Next, explanation will be made for a driving device 200 according to the embodiment of the present invention with reference to FIG. 9. The driving device 200 comprises a row electrode-driving circuit 202 for selectively supplying a row signal SR to the vertical selection lines 40 (connected in series to the row electrodes 28a of the actuator elements 14 for the respective rows) for the driving section 16 comprising a large number of actuator elements 14 arranged in the matrix configuration or in the zigzag configuration so that the actuator elements 14 are successively selected in one row unit, a column electrode-driving circuit 204 for outputting a data signal SD in parallel to the signal lines 42 for the driving section 16 so that the data signal SD is supplied to the column electrodes 28b of the respective actuator elements 14 on the row (selected row) selected by the row electrode-driving circuit 202 respectively, and a signal control circuit 206 for controlling the row electrode-driving circuit 202 and the column electrode-driving circuit 204 on the basis of a picture image signal Sv and a synchronization signal Ss to be inputted.

A logic power source voltage (for example, ±5 V) for logical operation performed in an internal logic circuit, and three types of row side power source voltages (for example, −100 V, −20 V, and +60 V) for generating the row signal SR are supplied to the row electrode-driving circuit 202 by the aid of an unillustrated power source circuit. The logic power source voltage and two types of column side power source voltages (for example, 80 V and 0 V) for generating the data signal SD are supplied to the column electrode-driving circuit 204 by the aid of the unillustrated power source circuit.

In this embodiment, the three types of the row side power source voltages are used as follows. That is, the voltage of −100 V is used as a peak voltage of the selection pulse Ps as described later on, the voltage of −20 V is used as a peak voltage of the unselection signal Su, and the voltage of 60 V is used as a peak voltage of the reset pulse Pr. Further, the two types of the column side power source voltages are used as follows. That is, the voltage of 80 V is used as a peak voltage of the ON signal as described later on, and the voltage of 0 V is used as a peak voltage of the OFF signal.

The signal control circuit 206 comprises, at its inside, a timing controller, a frame memory, and an I/O buffer, which is constructed such that the row electrode-driving circuit 202 and the column electrode-driving circuit 204 are subjected to the gradation control on the basis of the temporal modulation system via a row side control line 208 communicating with the row electrode-driving circuit 202 and a column side control line 210 communicating with the column electrode-driving circuit 204.

It is desirable that the row electrode-driving circuit 202 and the column electrode-driving circuit 204 have the following features.

(1) The actuator element 14 undergoes the capacitive load. Therefore, considering the fact that the capacitive load is subjected to the driving, for example, it is desirable that the partial voltage ratio, which is applied to the capacitive load; is not less than 50% at the time of completion of voltage (ON voltage) application for allowing the actuator element 14 to make the bending displacement.

(2) In order to obtain an displacement amount of the actuator element 14 which makes it possible to express the light emission state and the light off state of the picture element, it is desirable that an voltage output of not less than 20 V can be provided.

(3) It is desirable to consider the fact that the direction of the output current is recognized to be bidirectional.

(4) It is desirable that the load concerning the two-electrode structure in the row direction and the column direction can be subjected to the driving.

Modified Embodiments of Display

Next, several modified embodiments of the display D will be explained with reference to FIGS. 10 to 28. Components or parts corresponding to those shown in FIG. 1 are designated by the same reference numerals, duplicate explanation of which will be omitted.

Figure 10:
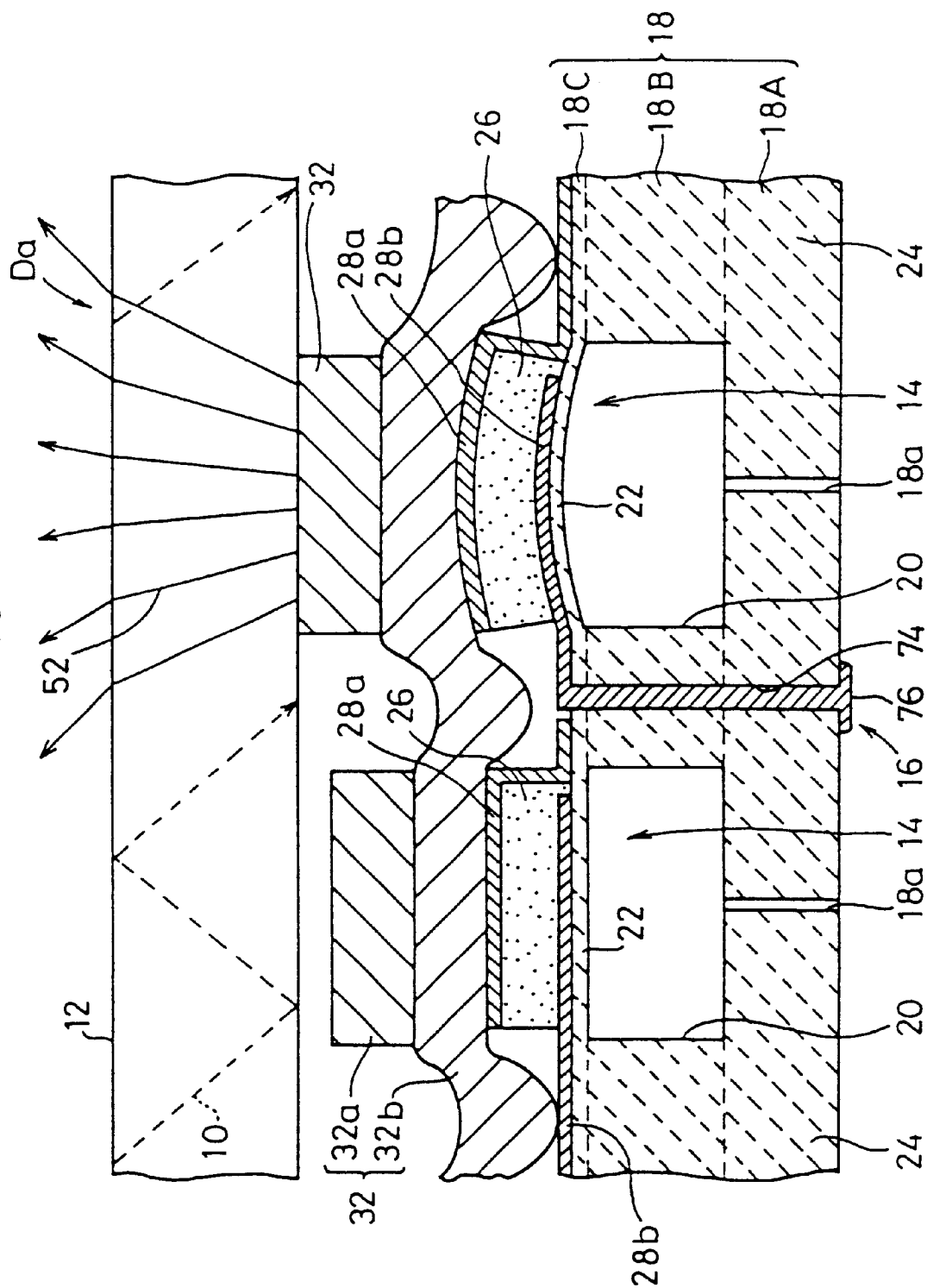
FIG. 10 shows a cross-sectional arrangement illustrating a display according to a first modified embodiment.
Figure 11:
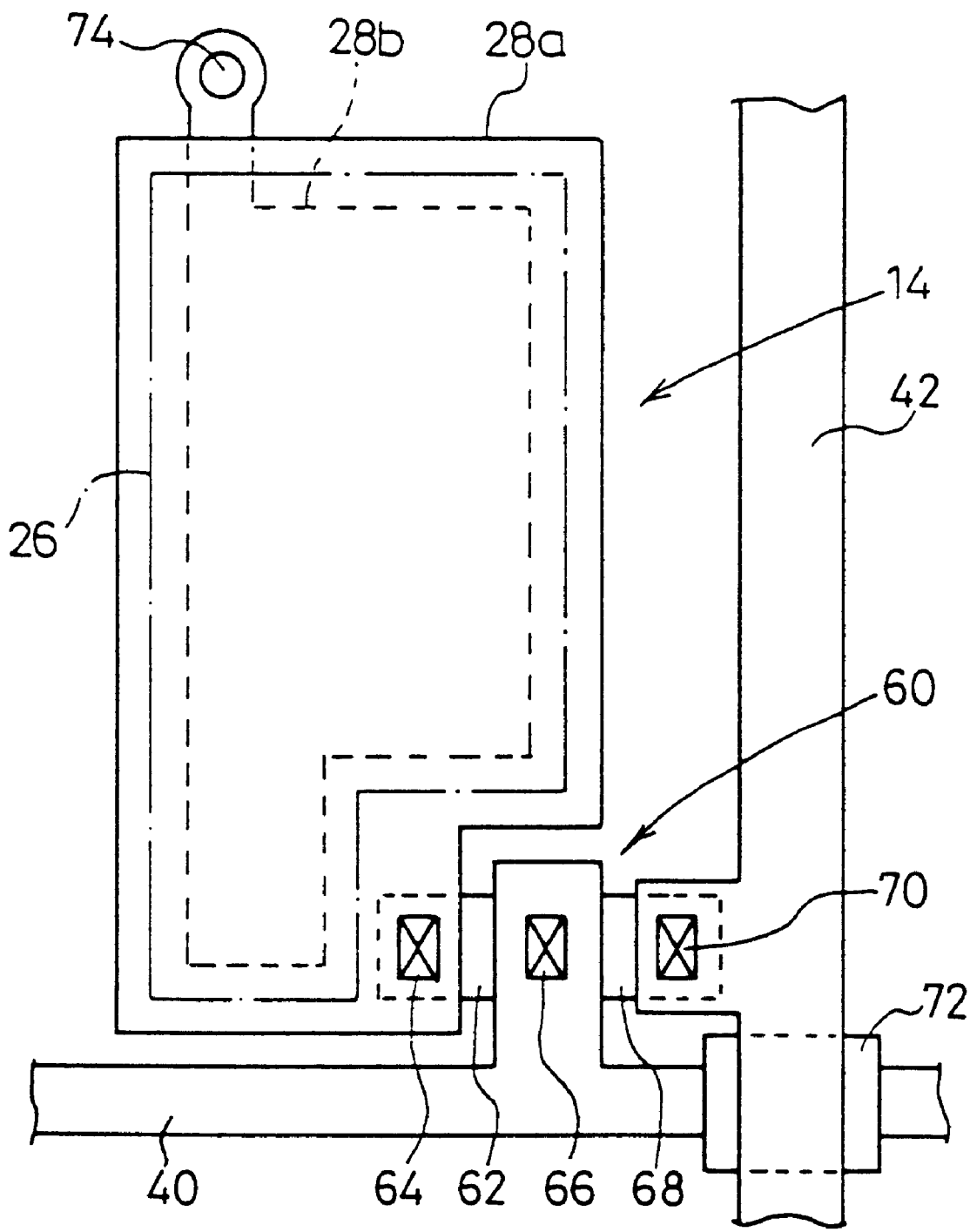
FIG. 11 shows a plan view illustrating an actuator element of the display according to the first modified embodiment.

At first, as shown in FIG. 10, a display Da according to a first modified embodiment is constructed in approximately the same manner as the display D shown in FIG. 1. However, the former is different from the latter in that an upper electrode 28a is formed on the upper surface of the shape-retaining layer 26 and a lower electrode 28b is formed on the lower surface of the shape-retaining layer 26, and in that a switching TFT (thin film transistor) 60 is formed in the vicinity of each of the actuator elements 14 on the actuator substrate 18 (see FIG. 10,.) as shown in FIG. 11. In this modified embodiment, the upper electrode 28a of each of the actuator elements 14 is electrically connected via a contact 64 to a source/drain region 62 of the corresponding TFT 60.

As shown in FIG. 11, any one of the planar configuration of the upper electrode 28a (see solid lines), the planar configuration of the shape-retaining layer 26 (see dashed lines), and the outer circumferential configuration of the lower electrode 28b (see broken lines) is rectangular. In this modified embodiment, the size of the upper electrode 28a is designed to be the largest. The planar configuration of the shape-retaining layer 26 is designed to be the second largest. The planar configuration of the lower electrode 28b is designed to be the smallest.

As shown in FIGS. 11 and 12, each of the vertical selection lines 40 is electrically connected via a contact 66 to the gate electrode of TFT 60 formed corresponding to each of the picture elements (actuator elements) 14. Each of the signal lines 42 is electrically connected via a contact 70 to the source/drain region 68 of TFT 60 formed corresponding to each of the picture elements 14.

An insulating film 72, which is composed of, for example, a silicon oxide film, a glass film, or a resin film, is allowed to intervene at the portion of intersection of each of the vertical selection lines 40 and each of the signal lines 42 in order to effect mutual insulation for the wirings 40, 42.

The lower electrode 28b of each of the actuator elements 14 is led to the back surface side of the actuator substrate 18 via a through-hole 74 formed through the actuator substrate 18, and it is electrically connected to a ground line 76 (see FIG. 10) formed on the back surface of the actuator substrate 18.

Therefore, when one row is selected by the row electrode-driving circuit 202, all of TFT's 60 concerning the selected row are turned on. Accordingly, the data signal, which is supplied by the column electrode-driving circuit 204, is supplied via the channel region of TFT 60 to the upper electrode 28a of the actuator element 14.

In the display Da according to the first modified embodiment, TFT 60, which is the switching element for performing ON/OFF control of the voltage application to each of the actuator elements 14, is provided corresponding to each of the actuator elements 14. Therefore, the supply of the data signal (the operation voltage and the reset voltage) to the unselected row can be avoided by turning off TFT 60 corresponding to the actuator element 14 concerning the unselected row. It is unnecessary to drive the picture element (actuator element) 14 concerning the unselected row. Thus, it is possible to effectively reduce the electric power consumption.

Even when TFT 60 is turned off, the supply of the data signal (application of the operation voltage or the reset voltage) to the actuator element 14 is maintained. Accordingly, the concerning actuator element 14 continuously maintains the displacement amount which is not less than a certain amount. Thus, the ON state or the OFF state of the concerning picture element is maintained.

As described above, the actuator element 14 concerning the unselected row is maintained in the open state while being charged, and the displacement amount, which is given when the row selection is performed, can be maintain for a certain period of time in the state of being applied with no signal. Accordingly, the light emission of the picture element can be effected during the unselection period. Therefore, it is possible to realize the high brightness.

In the display Da according to the first modified embodiment, TFT 60 is formed on the actuator substrate 18 in the vicinity of each of the actuator elements 14. Therefore, it is unnecessary to form any large wiring pattern on the actuator substrate 18. Thus, it is possible to simplify the wiring arrangements.

In the display Da according to the first modified embodiment, the actuator element 14, TFT 60, the vertical selection line 40, and the signal line 42 are formed on the actuator substrate 18. The ground line 76 is formed on the back surface side of the actuator substrate 18. Alternatively, it is also preferable that the actuator element 14 and the ground line 74 are formed on the actuator substrate 18, and TFT 60, the vertical selection line 40, and the signal line 42 are formed on the back surface side of the actuator substrate 18.

In the display Da according to the first modified embodiment, the upper electrode 28a and the lower electrode 28b are formed on the upper surface and the lower surface of the shape-retaining layer 26. Alternatively, as shown in FIG. 1, it is also preferable that the shape-retaining layer 26 is directly formed on the vibrating section 22, and the pair of electrodes 28 are formed on the upper surface of the shape-retaining layer 26.

Figure 13B:
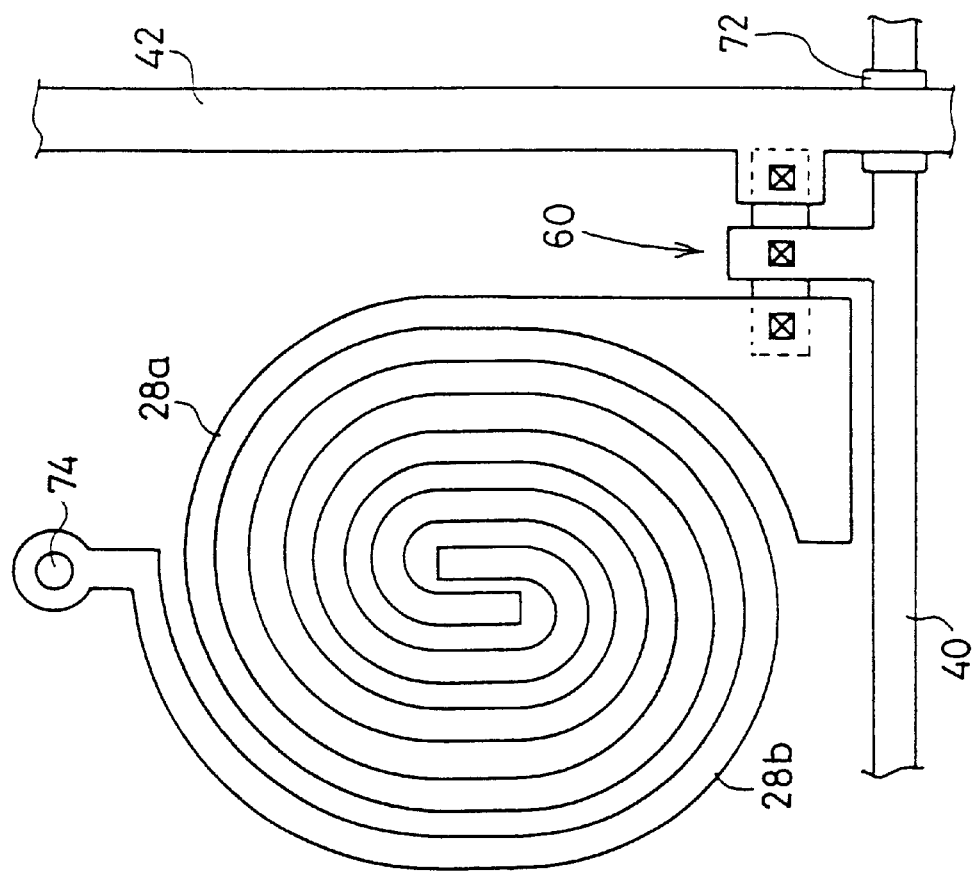
FIG. 13B shows a plan view illustrating an arrangement in which a pair of spiral-shaped electrodes are formed on a shape-retaining layer in the same manner as described above.
Figure 13A:
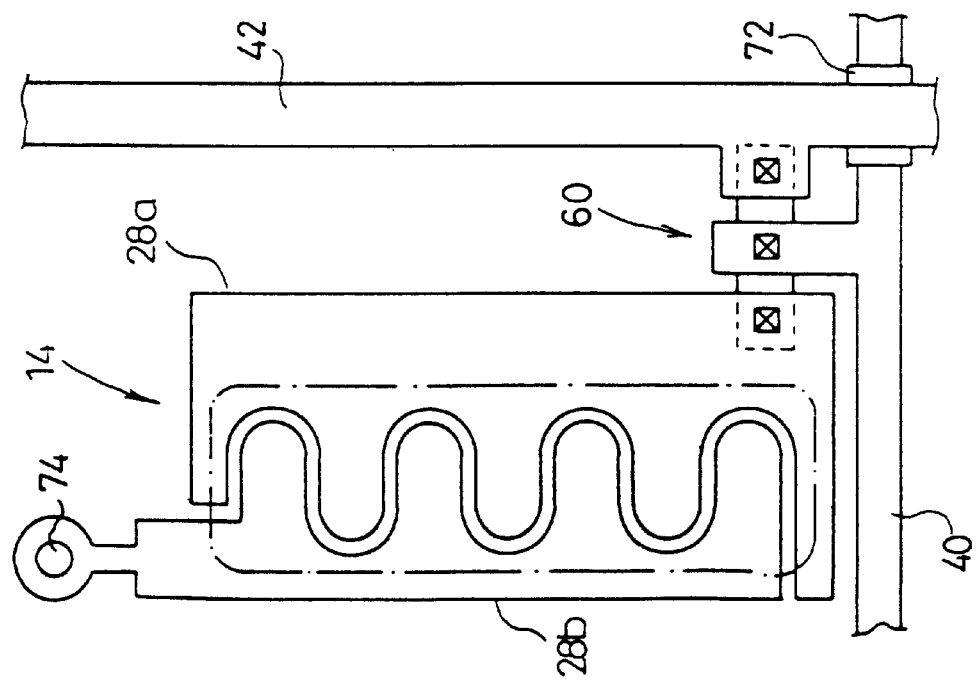
FIG. 13A shows a plan view illustrating an arrangement in which a pair of comb-shaped electrodes are formed on a shape-retaining layer of the actuator element of the display according to the first modified embodiment.
Figure 14:
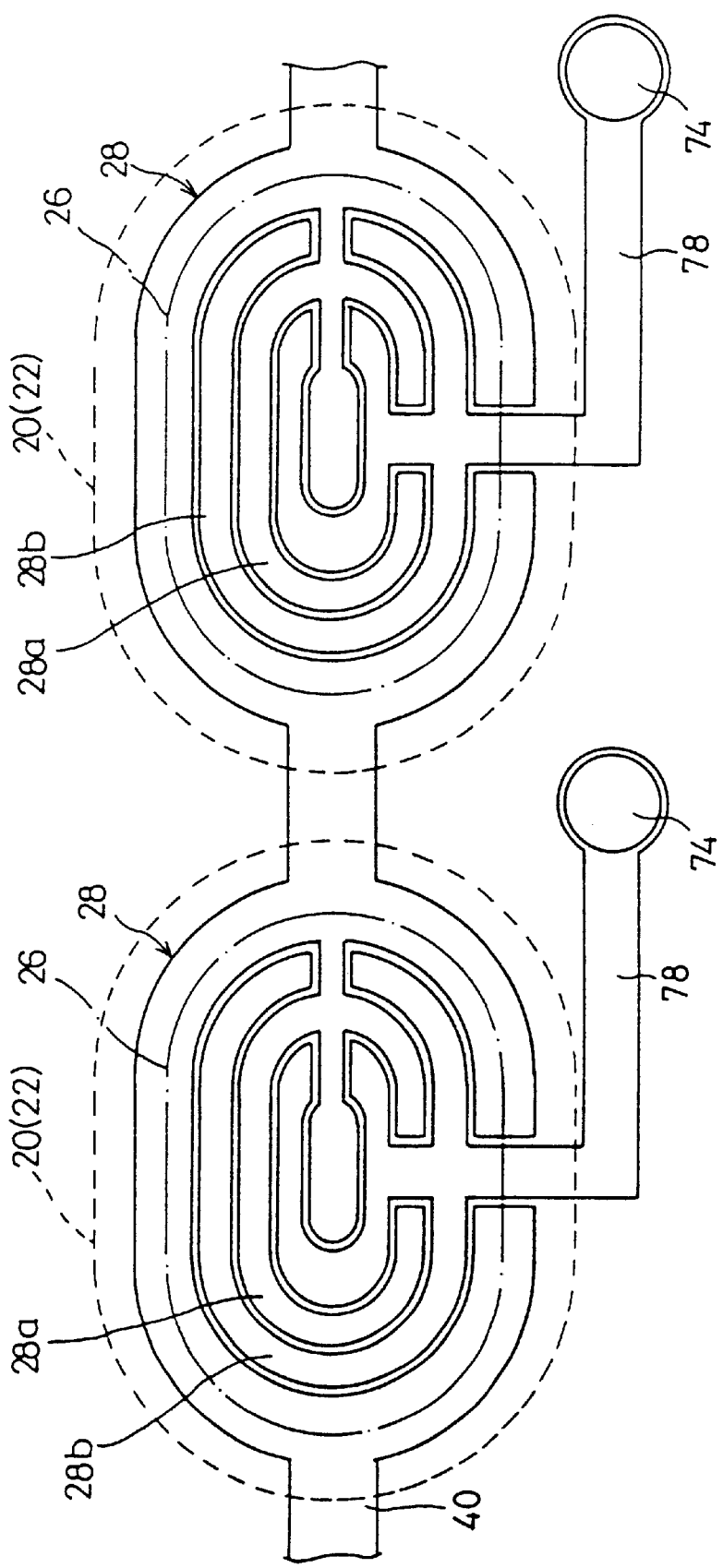
FIG. 14 shows a plan view illustrating an arrangement in which a pair of branch-shaped electrodes are formed on a shape-retaining layer of the actuator element of the display according to the first modified embodiment.

In this arrangement, the pair of electrodes 28a, 28b may have a configuration of comb teeth arranged alternately as shown in FIG. 13A. The pair of electrodes 28a, 28b may have a spiral configuration in which they are arranged in parallel to one another and separated from each other as shown in FIG. 13B. Alternatively, the pair of electrodes 28a, 28b may have a configuration (branched configuration) in which they are separated from each other and arranged complementarily as shown in FIG. 14. FIG. 14 is illustrative of the case in which the switching element (not shown) is formed on the back surface of the actuator substrate 18 (see FIG. 1), and one of the electrodes 28a is electrically connected to the switching element via the mediating conductor 78 and the through-hole 74.

The displays D, Da shown in FIGS. 1 and 10 are illustrative of the case in which the displacement-transmitting member 32b of the displacement-transmitting section 32 is formed in the film form over the entire surface. Alternatively, as in displays Db and Dc according to second and third modified embodiments shown in FIGS. 15 and 16, it is also preferable that the displacement-transmitting section 32 is formed in a separated manner as a unit corresponding to each of the picture elements. In this arrangement, the displacement-transmitting section 32 is preferably constructed such that the plate member 32a and the displacement-transmitting member 32b are integrated into one unit. In these modified embodiments, a color filter 100 and a transparent layer 102 are stacked on the displacement-transmitting section 32.

Accordingly, it is possible to allow the displacement-transmitting section 32 to have a light weight. It is possible to improve the response speed of each of the actuator elements 14. Further, it is possible to obtain higher contrast, because this arrangement is scarcely affected by the operation (displacement) of the surrounding picture elements.

Figure 15:
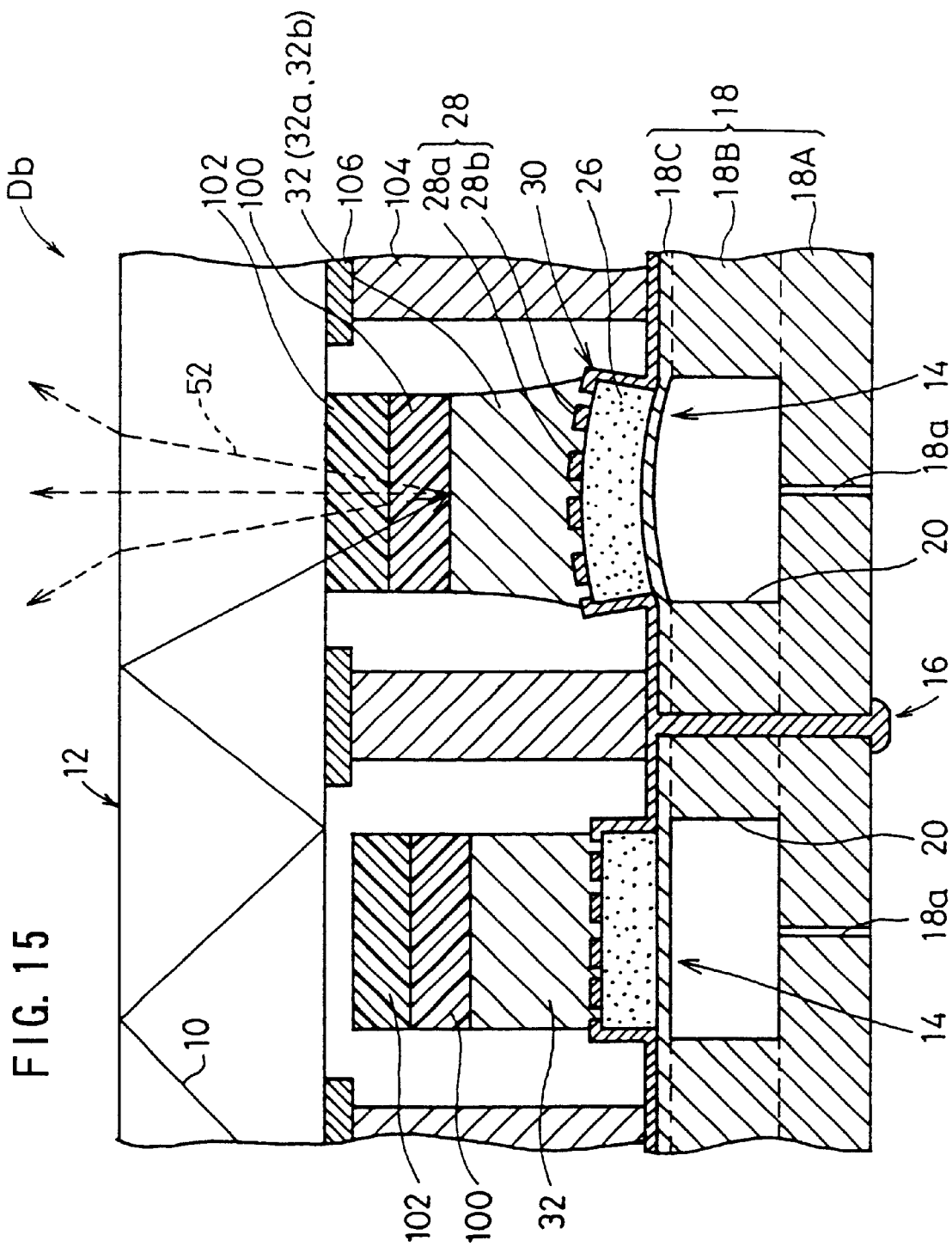
FIG. 15 shows a cross-sectional arrangement illustrating a display according to a second modified embodiment.

A display Db according to a second modified embodiment is shown in FIG. 15, in which the optical waveguide plate 12 and the actuator substrate 18 are fixed by means of a crosspiece 104. A black matrix layer 106 is provided between the forward end of the crosspiece 104 and the optical waveguide plate 12. Thus, the black matrix layer 106 is used to adjust the gap between the transparent layer 102 as the upper layer and the optical waveguide plate 12. This arrangement is effective in that the gap can be made more uniform for all of the picture elements.

In this modified embodiment, it is preferable for the crosspiece 104 to use a material having a quality which does not cause deformation due to heat and pressure. When the positions of the upper surface of the transparent layer 102 and the upper surface of the crosspiece 104 (surface to make contact with the black matrix layer 106) are aligned, it is advantageous to adjust the gap with ease. The method to realize this arrangement includes, for example, a method in which a flat glass surface is used to simultaneously form the transparent layer 102 and the crosspiece 104, and a method in which the transparent layer 102 and the crosspiece 104 are formed, followed by polishing to perform figuring.

Figure 16:
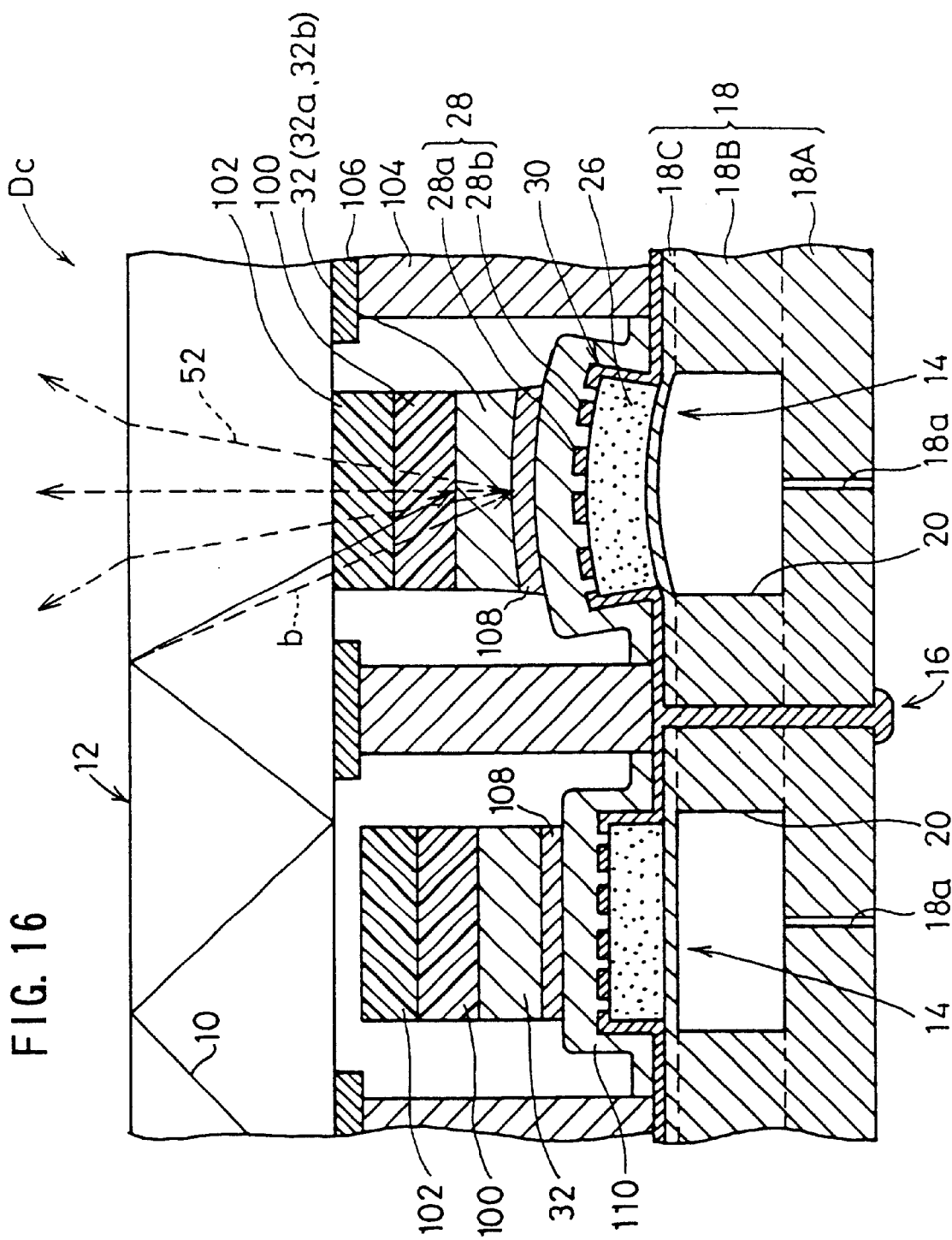
FIG. 16 shows a cross-sectional arrangement illustrating a display according to a third modified embodiment.

On the other hand, as shown in FIG. 16, a display Dc according to a third modified embodiment is characterized in that a light-reflective layer 108 is formed on the side of the actuator substrate 18 of the displacement-transmitting section 32. When the light-reflective layer 108 is formed just under the displacement-transmitting section 32 as shown in the drawing, if the light-reflective layer 108 is composed of a conductive layer made of metal or the like, then it is feared that a short circuit is formed between the pair of electrodes 28a, 28b of the actuator element 14. Therefore, it is desirable that an insulative layer 110 is formed between the light-reflective layer 108 and the actuator element 14.

Usually, a part of the light 10 is transmitted through the displacement-transmitting section 32 in some cases (for example, due the fact that the layer thickness of the displacement-transmitting section 32 is thin, or the content of ceramic powder as the material therefor in the organic resin is low). In such a case, the part of the light 10 introduced via the optical waveguide plate 12 is transmitted through the displacement-transmitting section 32 to the actuator substrate 18. As a result, it is feared that the brightness is lowered.

However, as described above, the display Dc according to the third modified embodiment comprises the light-reflective layer 110 which is formed on the side of the actuator substrate 18 of the displacement-transmitting section 32. Therefore, the light 10 (indicated by the optical path "b"), which is transmitted through the displacement-transmitting section 32, can be reflected toward the optical waveguide plate 12. Thus, it is possible to improve the brightness.

Especially, when the displacement-transmitting section 32 is transmissive with respect to the light 10, and it also has the absorbing property for the light 10, then the formation of the light-reflective layer 108 is more effective as in the display Dc according to the third modified embodiment in order to improve the brightness, as compared with an arrangement in which the thickness of the displacement-transmitting section 32 is made thick.

The color layer such as the color filter 100 for constructing the displacement-transmitting section 32 is the layer which is used to extract only the light in a specified wavelength region, and it includes, for example, those which cause light emission by absorbing, transmitting, reflecting, or scattering the light having a specified wavelength, and those which convert the incident light into light having a different wavelength. It is possible to use a transparent member, a semitransparent member, and an opaque member singly or in combination.

The color layer is constructed, for example, as follows. That is, those usable for the color layer include, for example, those obtained by dispersing or dissolving a dyestuff or a fluorescent material such as dye, pigment, and ion in rubber, organic resin, light-transmissive ceramic, glass, liquid or the like, those obtained by applying the dyestuff or the fluorescent material on the surface of the foregoing material, those obtained by sintering, for example, the powder of the dyestuff or the fluorescent material as described above, and,those obtained by pressing and solidifying the powder of the dyestuff or the fluorescent material. As for the material quality and the structure, the material may be used singly, or the materials may be used in combination.

The method for forming the film of the color layer is not specifically limited, to which it is possible to apply a variety of known film formation methods. Those usable include, for example, a film lamination method in which the color layer in a chip form or in a film form is directly stuck on the surface of the optical waveguide plate 12 or the actuator element 14, as well as a method for forming the. color layer in which, for example, powder, paste, liquid, gas, or ion to serve as a raw material for the color layer is formed into a film in accordance with the thick film formation method such as the screen printing, the photolithography method, the spray dipping, and the application, or in accordance with the thin film formation method such as the ion beam, the sputtering, the vacuum evaporation, the ion plating, CVD, and the plating.

Alternatively, it is also preferable that a light emissive layer for a part or all of the displacement-transmitting section 32. Those usable as the light-emissive layer include a fluorescent layer. The fluorescent layer includes those which are excited by invisible light (ultraviolet light and infrared light) to emit visible light, and those which are excited by visible light to emit visible light. However, any of them may be used.

A fluorescent pigment may be also used for the light-emissive layer. The use of the fluorescent pigment is effective for those added with fluorescent light having a wavelength approximately coincident with the color of the pigment itself, i.e., the reflected light such that the color stimulus is large corresponding thereto, and the light emission is vivid. Therefore, the fluorescent pigment is used more preferably to obtain the high brightness for the display element and the display. A general daylight fluorescent pigment is preferably used.

A stimulus fluorescent material, a phosphorescent material, or a luminous pigment is also used for the light-emissive layer. These materials may be either organic or inorganic.

Those preferably used include those formed with the light-emissive layer by using the light-emissive material as described above singly, those formed with the light-emissive layer by using the light-emissive material as described above dispersed in resin, and those formed With the light-emissive layer by using the light-emissive material as described above dissolved in resin.

The afterglow or decay time of the light-emissive material is preferably not more than 1 second, preferably 30 milliseconds. More preferably the afterglow or decay time is not more than several milliseconds.

When the light-emissive layer is used as a part or all of the displacement-transmitting section 32, the light source (not shown) is not specifically limited provided that it includes the light having a wavelength capable of exciting the light-emissive layer and it has an energy density sufficient for excitation. Those usable include, for example, cold cathode tube, hot cathode tube, metal halide lamp, xenon lamp, laser including infrared laser, black light, halogen lamp, incandescent lamp, deuterium discharge lamp, fluorescent lamp, mercury lamp, tritium lamp, light emitting diode, and plasma light source.

Figure 17:
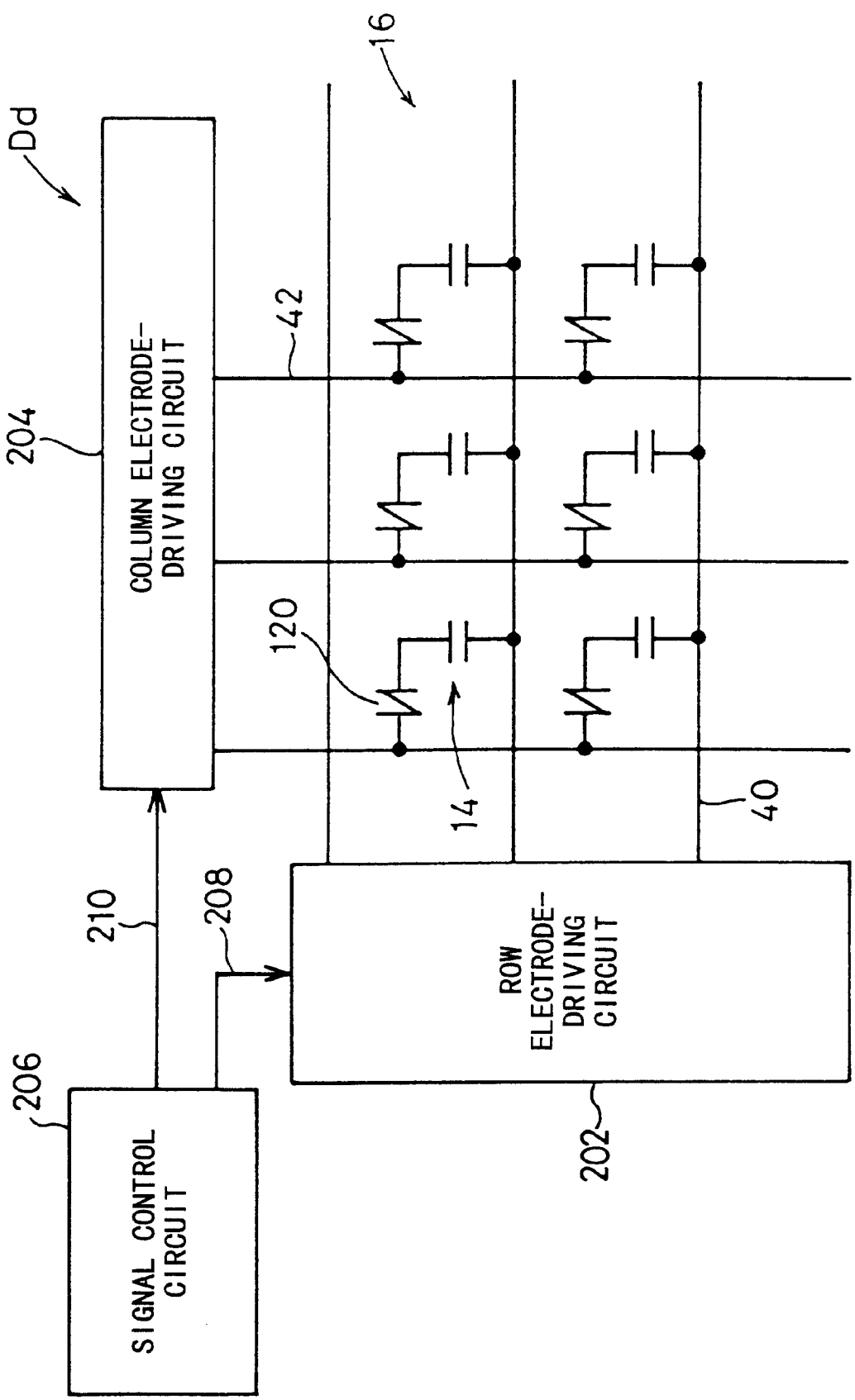
FIG. 17 shows an equivalent circuit concerning respective picture elements arranged in a driving section of a display according to a fourth modified embodiment.

Next, as shown in FIG. 17, a display Dd according to a fourth modified embodiment differs in that a varistor 120 is inserted and connected between the signal line 42 and the column electrode 28b of the actuator element 14, the common vertical selection line 40 is connected to a picture element group in one row, and the signal line 42 is formed on the back surface side of the actuator substrate 18.

Figure 18:
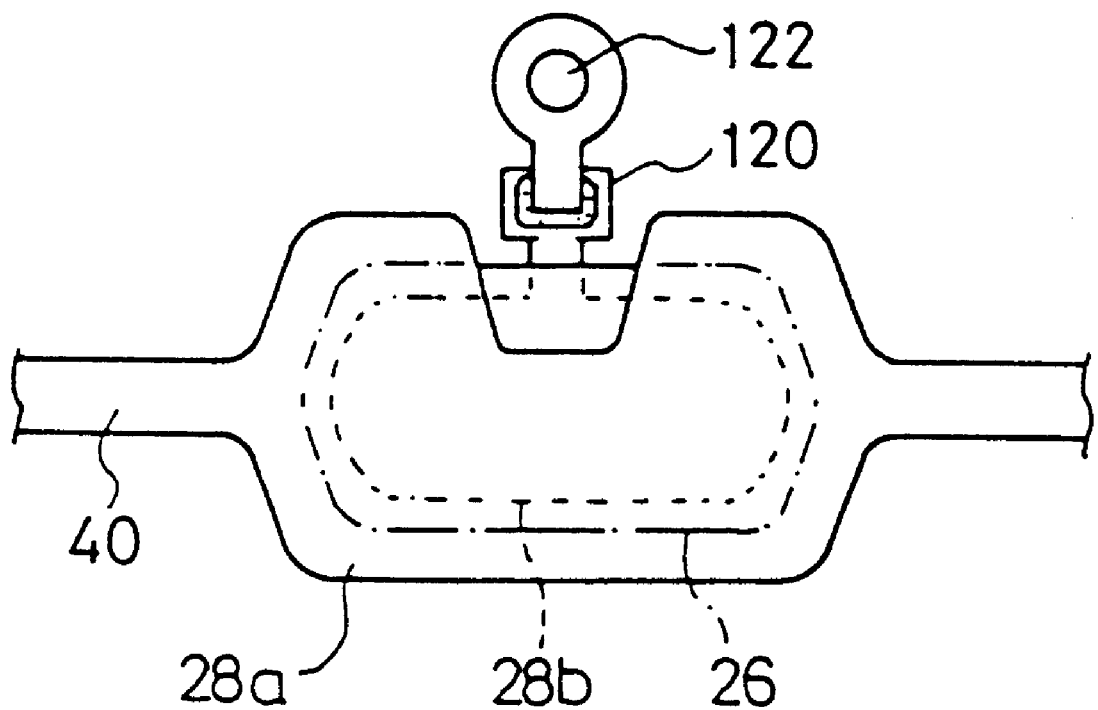
FIG. 18 shows a plan view illustrating an actuator element of the display according to the fourth modified embodiment.

As shown in FIG. 18, the vertical selection line 40 is led from the row electrode 28a relevant to the picture element of the previous column, and it is connected to the row electrode 28a relevant to the concerning picture element, giving a form of being wired in series relevant to one row. The column electrode 28b and the signal line 42 are electrically connected to one another via a through-hole 122 formed through the substrate 18.

The varistor 120 is a resistor element in which the resistance value varies nonlinearly depending on the change in applied voltage. The varistor 120 is constructed, for example, by an SiC varistor, a pnp varistor of Si, or a varistor principally composed of ZnO. The varistor 120 has a negative characteristic in which the resistance value is decreased when the terminal voltage is raised.

Figure 19:
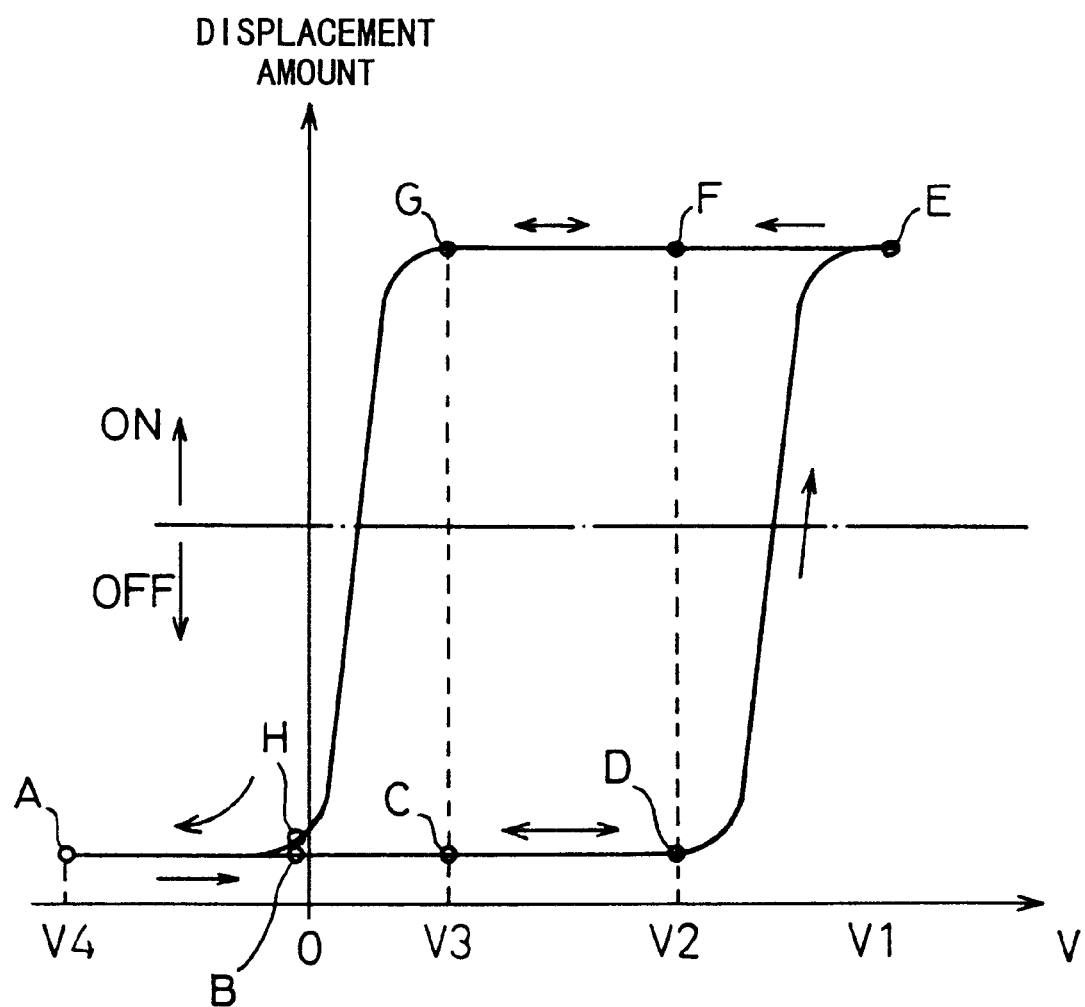
FIG. 19 shows a voltage-bending displacement characteristic of the actuator element of the display according to the fourth modified embodiment.
Figure 20:
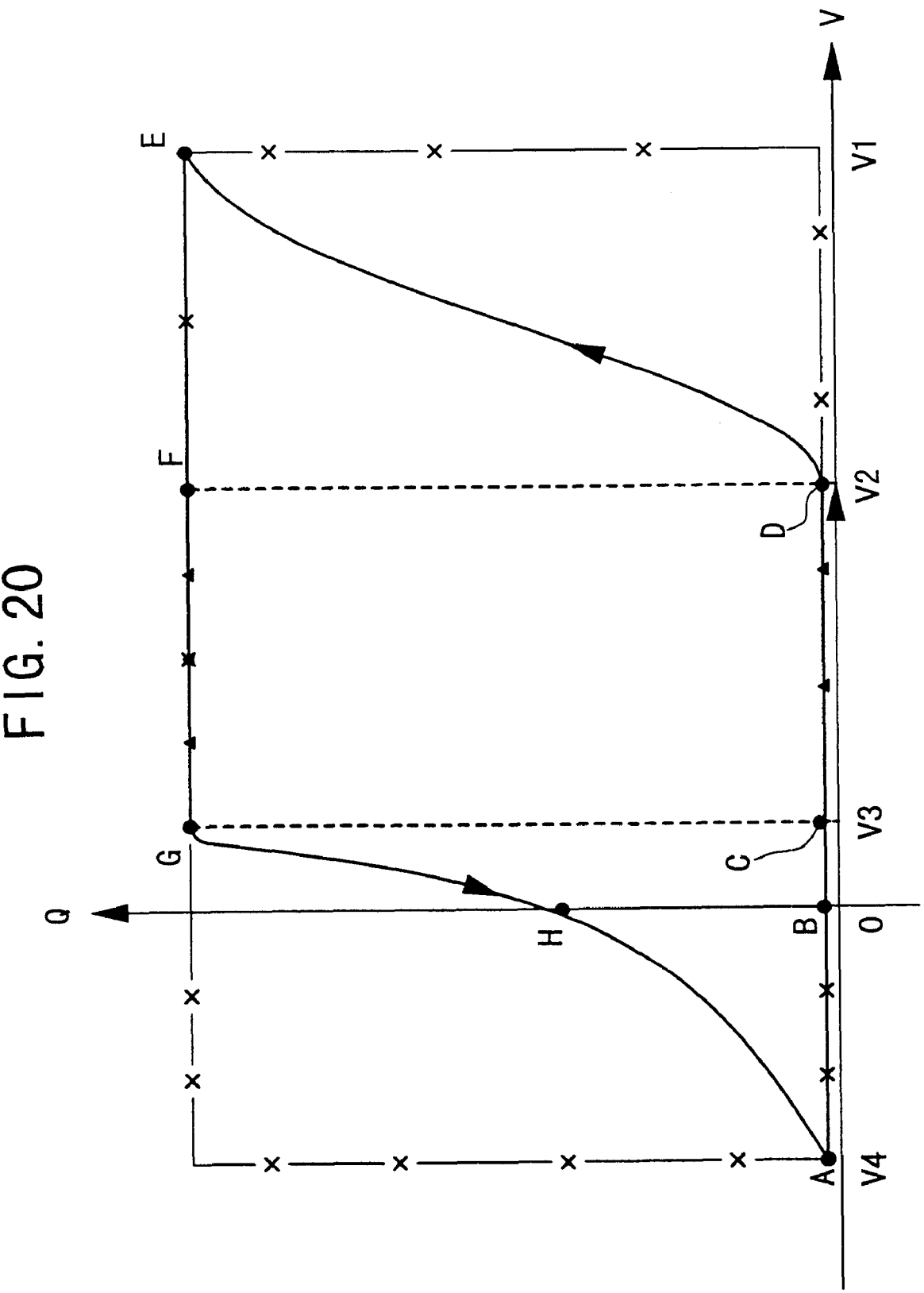
FIG. 20 shows an electric charge-applied voltage characteristic of the actuator element of the display according to the fourth modified embodiment.

FIGS. 19 and 20 show a bending displacement characteristic and an electric charge-applied voltage characteristic of the actuator element of the display according to the fourth modified embodiment respectively. The applied voltage, which is indicated along each of the horizontal axes in FIGS. 19 and 20, is not the voltage directly applied to the pair of electrodes 28a, 28b of the concerning actuator element 14, but it indicates the voltage between the vertical selection line 40 and the signal line 42.

The operation of the display Dd according to the fourth modified embodiment will now be briefly explained. At first, for example, the operation will be explained. concerning the picture element of the first row and first column. When the picture element,is selected, and the voltage (applied voltage) between the vertical selection line 40 and the signal line 42 is at the highest level V1, then the varistor 120 is in the ON state, and the resistance in this state is extremely small (the resistance of the varistor 120 in the ON state is hereinafter referred to as "ON resistance"). Therefore, the time constant, which depends on the ON resistance and the electrostatic capacity of the varistor 120, is also small. Thus, the response to the change in applied voltage is quick. Accordingly, the voltage, which is applied to the actuator element 14, steeply rises up to a prescribed high voltage (for example, 180 V). The amount of electric charge Q steeply increases as well. As a result, as understood from the bending displacement characteristic shown in FIG. 19, the picture element is in the ON state to cause light emission, and the amount of electric charge in this state is at the maximum level.

When the concerning picture element is in the unselection state, and the voltage (applied voltage) between the vertical selection line 40 and the signal line 42 is at the middle level (V2 to V3), then the varistor 120 is in the OFF state, and the resistance in this state is extremely large (the resistance of the varistor 120 in the OFF state is hereinafter referred to as "OFF resistance"). Therefore, the time constant, which depends on the OFF resistance and the electrostatic capacity of the varistor 120, is also large. Thus, the response to the applied voltage is slow. Accordingly, the voltage, which is applied to the actuator element 14, is in the state in which the voltage level (180 V) applied upon the selection is approximately maintained. Therefore, the amount of electric charge Q approximately maintains the maximum level, and the light emission effected by the picture element is maintained.

When the concerning picture element is reset, and the voltage (applied voltage) between the vertical selection line 40 and the signal line 42 is at the lowest level V4, then the varistor 120 is in the ON state again, and the ON resistance in this state is extremely small. Accordingly, the voltage, which is applied to the actuator element 14, steeply lowers to a prescribed low voltage (for example, −60 V). As understood from the bending displacement characteristic shown in FIG. 19, the picture element is in the OFF state, and it is quenched. At this time, the amount of electric charge Q is at the minimum level.

After that, when the concerning picture element is in the unselection state, and the voltage (applied voltage) between the vertical selection line 40 and the signal line 42 is at the middle level (V2 to V3), then the varistor 120 is in the OFF state again, and the resistance in this state is extremely large. Therefore, the time constant, which depends on the OFF resistance and the electrostatic capacity of the varistor 120, is also large. Thus, the response to the applied voltage is slow. Accordingly, the voltage, which is applied to the actuator element 14, is in the state in which the voltage level (−60 V) applied upon the reset is approximately maintained, and hence the light off effected by the picture element is maintained.

As also understood from the voltage-bending displacement characteristic shown in FIG. 19 and the electric charge-applied voltage characteristic shown in FIG. 20, the display Dd according to the fourth modified embodiment exhibits the approximately flat characteristic in which both of the displacement amount and the amount of electric charge Q are scarcely changed over the range from the high voltage level V1 upon the selection to the middle level (V2 to V3) upon the unselection, and it exhibits the approximately flat characteristic in which both of the displacement amount and the amount of the electric charge are scarcely changed over the range from the low voltage level upon the reset to the middle level upon the unselection.

In other words, the display Dd according to the fourth modified embodiment has the extremely excellent hysteresis characteristic when the actuator element 14 is subjected to the operation, providing the memory effect to give the approximately complete shape maintenance.

As described above, in the display Dd according to the fourth modified embodiment, the varistor 120 itself has the memory function for the applied voltage to the actuator element 14. Therefore, a material, which has no hysteresis in the bending displacement characteristic as shown in FIG. 21, can be also used as a constitutive material for the shape-retaining layer 26 of the actuator element 14. Thus, it is possible to widen the range of selection of the material.

Figure 22A:
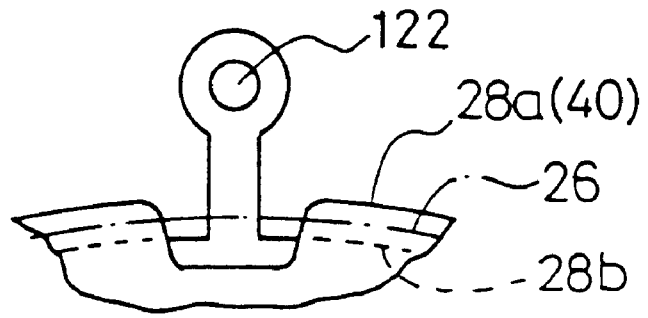
FIG. 22A shows an example of an actuator element and a gate line formed on an actuator substrate.
Figure 22B:
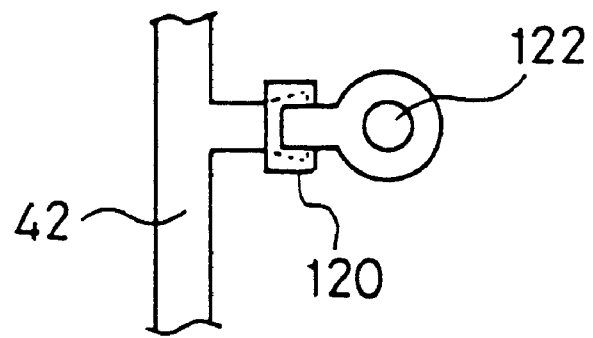
FIG. 22B shows an example of a varistor and a data line formed on a back surface side of an actuator substrate.

In the display Dd according to the fourth modified embodiment, the actuator element 14, the varistor 120, and the vertical selection line 40 are formed on the actuator substrate 18, and the signal line 42 is formed on the back surface side of the actuator substrate 18. Alternatively, as shown in FIGS. 22A and 22B, it is also preferable that the actuator element 14 and the vertical selection line 40 are formed on the actuator substrate 18, and the varistor 120 and the signal line 42 are formed on the back surface side of the actuator substrate 18.

In this arrangement, as shown in FIG. 23, a varistor substrate 304, which comprises electrodes 300, 302 formed on both surfaces, is prepared in addition to the actuator substrate 18 which comprises a large number of actuator elements 14 (not shown) formed on the first principal surface. A large number of through-holes 74 (see FIG. 1), which make communication from the first principal surface to the second principal surface of the actuator substrate 18, are provided corresponding to the respective actuator elements 14. Electrode pads 306 are formed for the through-holes 74 on the side of the second principal surface of the actuator substrate 18. That is, the electrodes pads 306 are provided at the positions corresponding to the actuator elements 14 formed on the first principal surface.

On the other hand, as shown in FIG. 23, the varistor substrate 304 includes the electrodes 300, 302 which are respectively formed at the positions corresponding to the respective actuator elements 14 (exactly the respective electrode pads 306) when the varistor substrate 304 is laminated onto the back surface of the actuator substrate 18. The varistor 120 corresponding to each of the actuator elements 14 functions owing to the electrodes 300, 302 formed on the both surfaces and the substrate material existing between the electrodes 300, 302.

The signal line 42 is formed by mutually connecting the electrodes 302, 302 formed on the back surface (surface on the side opposite to the actuator substrate 18) of the varistor substrate 304. The electrode 308 (for example, the lead electrode for the vertical selection line 40), which requires no varistor function, is electrically connected to the electrode pad 312 for leading the gate line formed on the second principal surface of the actuator substrate 18 by using, for example, the through-hole 310.

The actuator substrate 18 and the varistor substrate 304 are laminated with each other as follows. That is, the second principal surface of the actuator substrate 18 (the surface formed with the large number of electrode pads 306) and the first principal surface of the varistor substrate 304 are laminated with each other. The electrode pads 306 on the actuator substrate 18 and the electrodes 300 on the varistor substrate 304 are laminated with each other by using, for example, solder or conductive resin. As a result of the lamination, one of the electrodes (for example, the column electrode 28b) of the actuator element 14 is electrically connected to the signal line 42 via the varistor 120.

The thickness of the varistor substrate 304 is determined by the required varistor voltage. The electrode area of the varistor 120 is determined by the required electrostatic capacity and the required current capacity.

For example, the following two methods are conceived as the method for reducing the leak current between the electrodes 300, 300 which are disposed closely to one another on the first principal surface of the varistor substrate 304 and between the electrodes 302, 302 which are disposed closely to one another on the second principal surface of the varistor substrate 304, and increasing the degree of freedom for the arrangement of the electrodes 300, 302.

(1) Grooves are formed between the closely disposed electrodes 300, 300 and between the closely disposed electrodes 302, 302. In this arrangement, the distances between the electrodes 300, 300 and between the electrodes 302, 302 are substantially increased, and thus the varistor voltage is increased.

(2) The grain size of the constitutive material for the varistor substrate 304 is made fine, and the thickness of the varistor substrate 304 is made thin. In this arrangement, the varistor voltage is increased between the closely disposed electrodes 300, 300 and between the closely disposed electrodes 302, 302 while maintaining the varistor voltage between the opposing electrodes 300, 302.

As described above, the varistor substrate 304 for constructing the varistor 120 is prepared separately from the actuator substrate 18. The varistor substrate 304 is laminated onto the actuator substrate 18. Therefore, the wiring structure, which is used to connect the varistor 120 between each of the actuator elements 14 and the signal line 42, is extremely simple. The size of the display Dd can be miniaturized. Further, it is extremely advantageous, for example, to improve the yield of the display Dd and reduce the production cost.

In the display Dd according.to the fourth modified embodiment, the upper electrode 28a and the lower electrode 28b are formed on the upper surface and the lower surface of the shape-retaining layer 26 respectively. Alternatively, it is also preferable that the shape-retaining layer 26 is directly formed on the vibrating section 22, and the pair of electrodes 28 are formed on the upper surface of the shape-retaining layer 26.

Figure 24A:
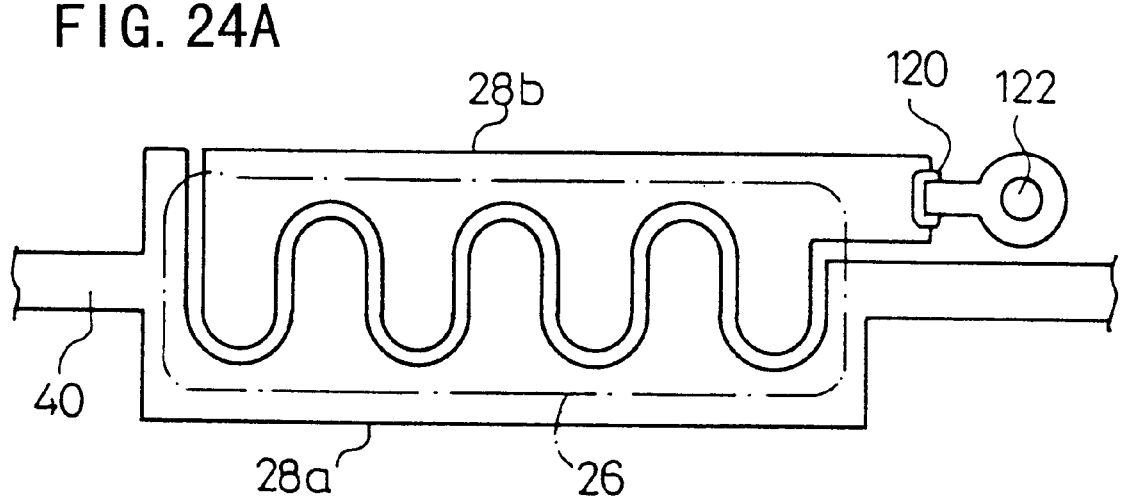
FIG. 24A shows a plan view illustrating an arrangement in which a pair of comb-shaped electrodes are formed on a shape-retaining layer of the actuator element of the display according to the fourth modified embodiment.
Figure 24B:
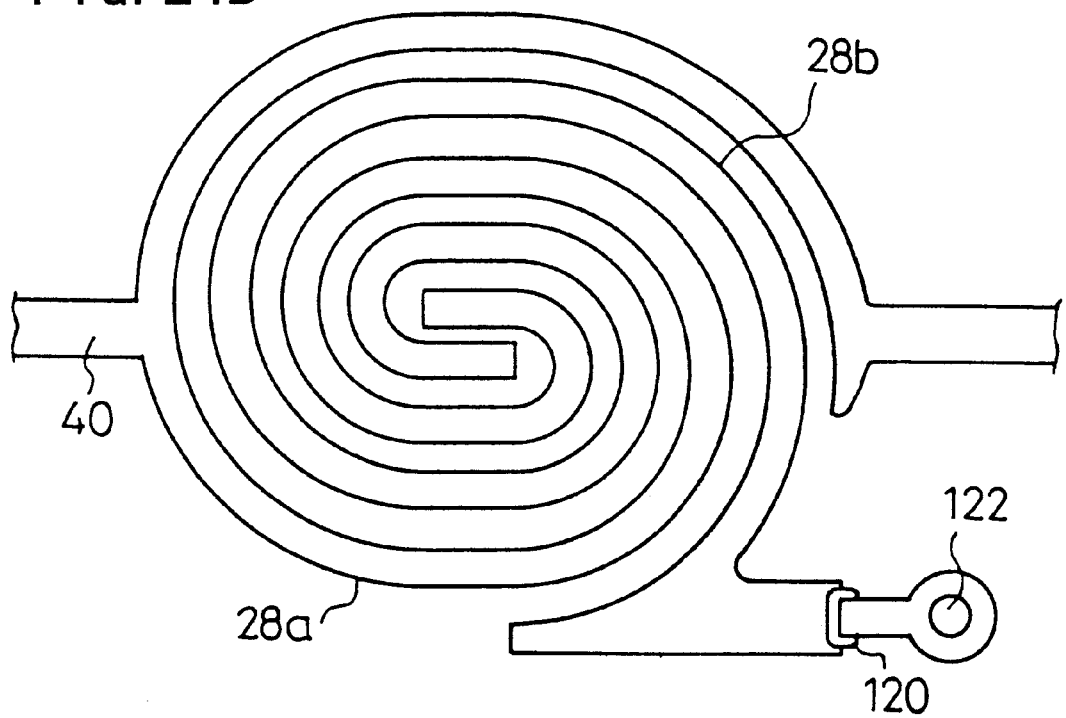
FIG. 24B shows a plan view illustrating an arrangement in which a pair of spiral-shaped electrodes are formed on a shape-retaining layer.

In this arrangement, the pair of electrodes 28a, 28b may have a configuration of comb teeth arranged alternately as shown in FIG. 24A. The pair of electrodes 28a, 28b may have a spiral configuration in which they are arranged in parallel to one another and separated from each other as shown in FIG. 24B. Alternatively, the pair of electrodes 28a, 28b may have a branched configuration in the same manner as in the arrangement shown in FIG. 14. Also in this case, the varistor 120 may be formed either on the principal surface or on the back surface of the actuator substrate 18 (see FIG. 1) in the same manner as in the display Dd according to the fourth modified embodiment. In the arrangement along with FIG. 14, the varistor (not shown) is formed on the back surface of the actuator substrate 18, and one of the electrodes 28a is electrically connected to the varistor via the mediating conductor 78 and the through-hole 74.

Next, a display De according to a fifth modified embodiment will be explained with reference to FIGS. 25 to 28. Components or parts corresponding to those of the display D according to the embodiment of the present invention are designated by the same reference numerals, duplicate explanation of which will be omitted.

Figure 25:
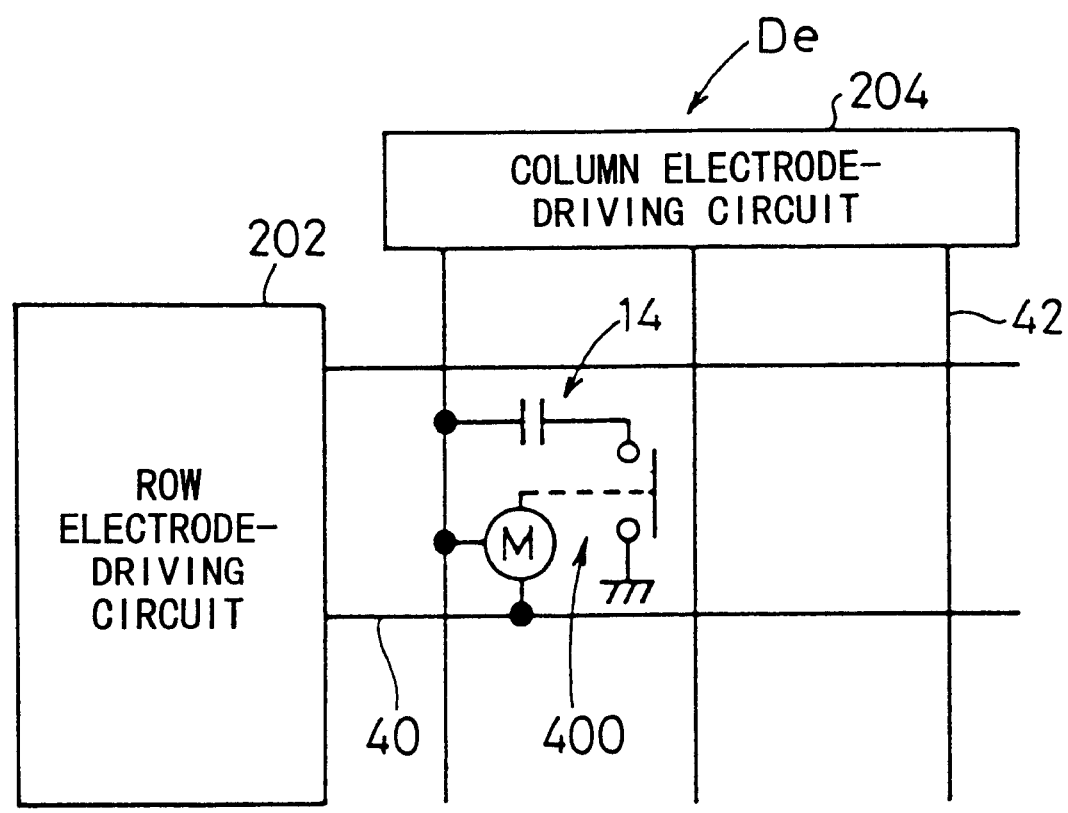
FIG. 25 shows an equivalent circuit concerning respective picture elements arranged in a driving section of a display according to a fifth modified embodiment.

As shown in FIG. 25, the display De according to the fifth modified embodiment is basically constructed in approximately the same manner as the display D according to the embodiment of the present invention. However, the former is different from the latter in that a piezoelectric relay 400 is inserted and connected between the upper electrode 28a of the actuator element 14 and the ground line 76. The display De according to the fifth modified embodiment is structurally different from the display D according to the embodiment of the present invention as well, because of those relevant to the provision of the piezoelectric relay 400.

Figure 26:
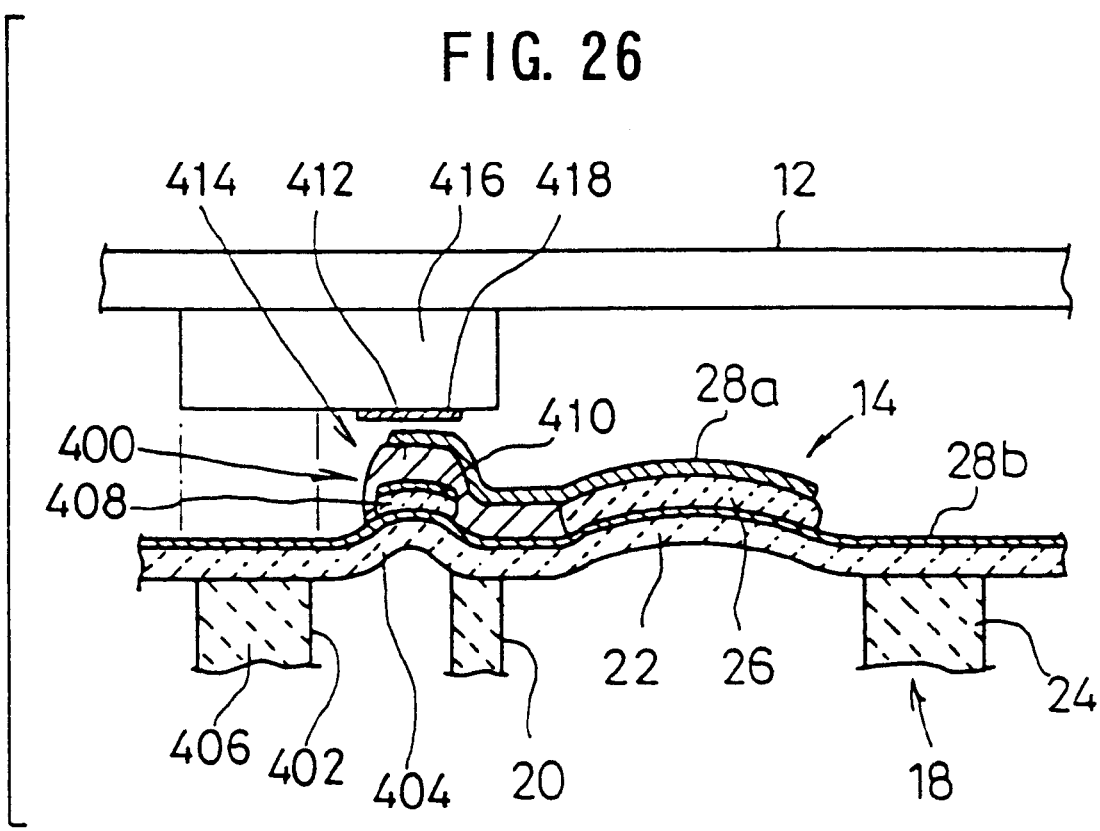
FIG. 26 shows a sectional view illustrating an actuator element and a piezoelectric relay of the display according to the fifth modified embodiment.
Figure 27:
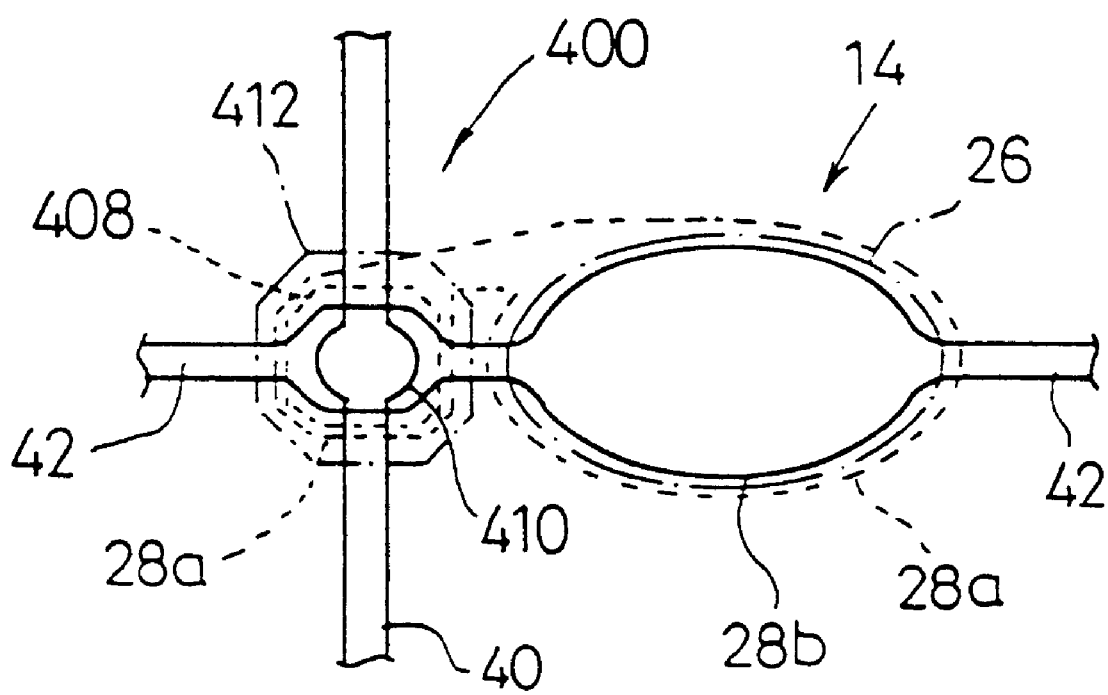
FIG. 27 shows a plan view illustrating the actuator element and the piezoelectric relay of the display according to the fifth modified embodiment.

The display De according to the fifth modified embodiment will be specifically explained. As shown in FIGS. 26 and 27, the display De according to the fifth modified embodiment comprises the piezoelectric relays 400 which are arranged at positions adjacent to the respective actuator elements 14 of the actuator substrate 18 respectively. A hollow space 402 for constructing the piezoelectric relay 400 is provided at the inside of the actuator substrate 18 in addition to the hollow space 20 for constructing the actuator element 14. The hollow space 402 also communicates with the outside via a through-hole (not shown) having a small diameter provided on the back surface side of the actuator substrate 18.

Therefore, also in this arrangement, the portion of the actuator substrate 18, at which the hollow space 402 is formed, is thin-walled. The other portion of the actuator substrate 18 is thick-walled. The thin-walled portion has a structure which tends to undergo vibration in response to external stress, and it functions as a vibrating section 404 for the piezoelectric relay. The portion other than the hollow space 402 is thick-walled, and it functions as a fixed section 406 for the piezoelectric relay for supporting the vibrating section 404.

As shown in the drawing, each of the piezoelectric relays 400 comprises the vibrating section 404 and the fixed section 406 described above; as well as a main relay body 414 including a shape-retaining layer 408 composed of, for example, a piezoelectric/electrostrictive layer or an antiferroelectric layer formed on the vibrating section 404, a lower electrode 28b formed on the lower surface of the shape-retaining layer 408, an intermediate electrode 410 (electrode connected to the vertical selection line 40) formed on the upper surface of the shape-retaining layer 408, an insulative layer 412 formed on the intermediate electrode 410, and an upper electrode 28a formed on the insulative layer 412; a black matrix layer 416 provided at a position corresponding to each of the piezoelectric relays 400 on the surface of the optical waveguide plate 12 on the side of the driving section; and a ground electrode 418 formed on the surface of the black matrix layer 416 opposing to the piezoelectric relay 400. It is preferable to use a metal film composed of, for example, Cr, Al, Ni, or Ag as the black matrix layer 416, because of the following reason. That is, the metal film absorbs less light, and hence it is possible to suppress the attenuation and the scattering of the light transmitted through the optical waveguide plate 12. In order to improve the contrast, a film containing carbon black, black pigment, or black dye is also preferably used. This modified embodiment is illustrative of the case in which the black matrix layer 416 is formed. Alternatively, a transparent electrode is used as the ground electrode 418 in some cases without forming the black matrix layer 416.

Of the several electrodes described above, the lower electrode 28b is common to the lower electrode (electrode connected to the signal line 42) 28b of the actuator element 14. The upper electrode 28a is common to the upper electrode 28a of the actuator element 14.

In the display De according to the fifth modified embodiment, for example, a selection signal (for example a positive high level electric potential) is applied to one vertical selection line 40, and thus the concerning vertical selection line 40 is selected.

Also in the display De according to the fifth modified embodiment, the supply of the data signal to the unselected row can be avoided in the same manner as in the display D according to the embodiment of the present invention. It is unnecessary to operate the picture element (actuator element) 14 concerning the unselected row. It is possible to effectively reduce the electric power consumption. The light emission can be effected for the picture element during the unselection period Tu. Therefore, it is possible to realize the high brightness. Further, it is unnecessary to form any large wiring pattern on the actuator substrate 18. Thus, it is possible to simplify the wiring arrangement.

In the display De according to the fifth modified embodiment, the actuator element 14, the piezoelectric relay 400, and the ground electrode 418 are formed on the actuator substrate 18. Alternatively, as shown in FIG. 28, it is also preferable that the actuator element 14 is formed on the actuator substrate 18, and the piezoelectric relay 400 and the ground electrode 418 are formed on the back surface side of the actuator substrate 18.

Figure 28:
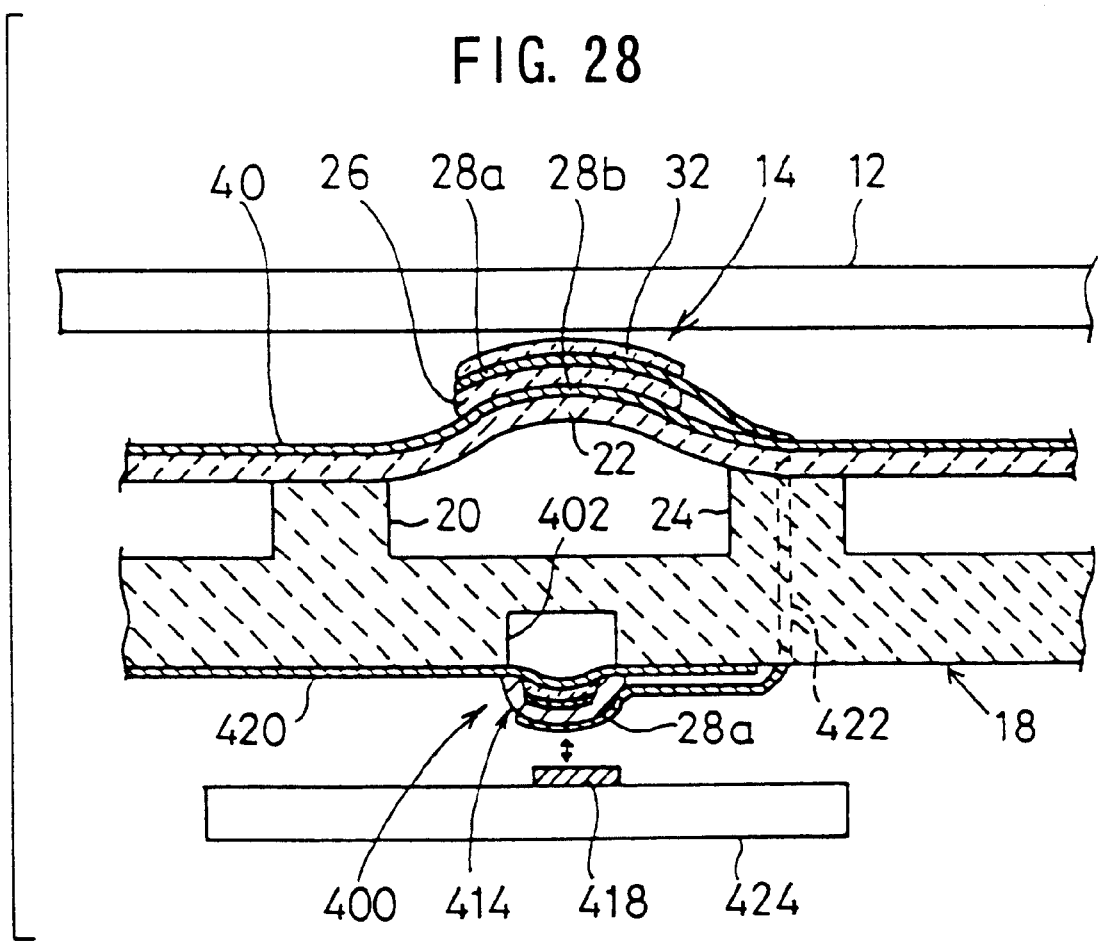
FIG. 28 shows a cross-sectional arrangement illustrating another example of the display according to the fifth modified embodiment.

As shown in FIG. 28, for example, this arrangement can be achieved such that the hollow space 402 for constructing the piezoelectric relay 400 is provided under the hollow space 20 for constructing the actuator element 14 in the actuator substrate 18, and the main relay body 414 is formed under the hollow space 402.

In this arrangement, it is impossible to commonly use the signal line 42. Therefore, the following structure may be used. That is, a vertical selection line 420, which is exclusively used for switching, is newly provided and wired on the back surface side of the actuator substrate 18. Further, the upper electrode 28a, which is formed on the piezoelectric relay 400, is wired from the actuator element 14 via a through-hole 422 provided through the actuator substrate 18. The ground electrode 418, which is selectively contacted with the upper electrode 28a, is formed on a printed circuit board 424 disposed under the actuator substrate 18.

The electrodes 28a, 28b may be formed on the shape-retaining layer 26, and they may be formed as the pair of electrodes having a comb-teeth shaped configuration, a spiral configuration, or a branched configuration, in the same manner as in the display D according to the embodiment of the present invention and the displays Da to Dd according to the first to fourth modified embodiments.

Explanation of Gradation Control Based on Temporal Modulation System

Figure 29:
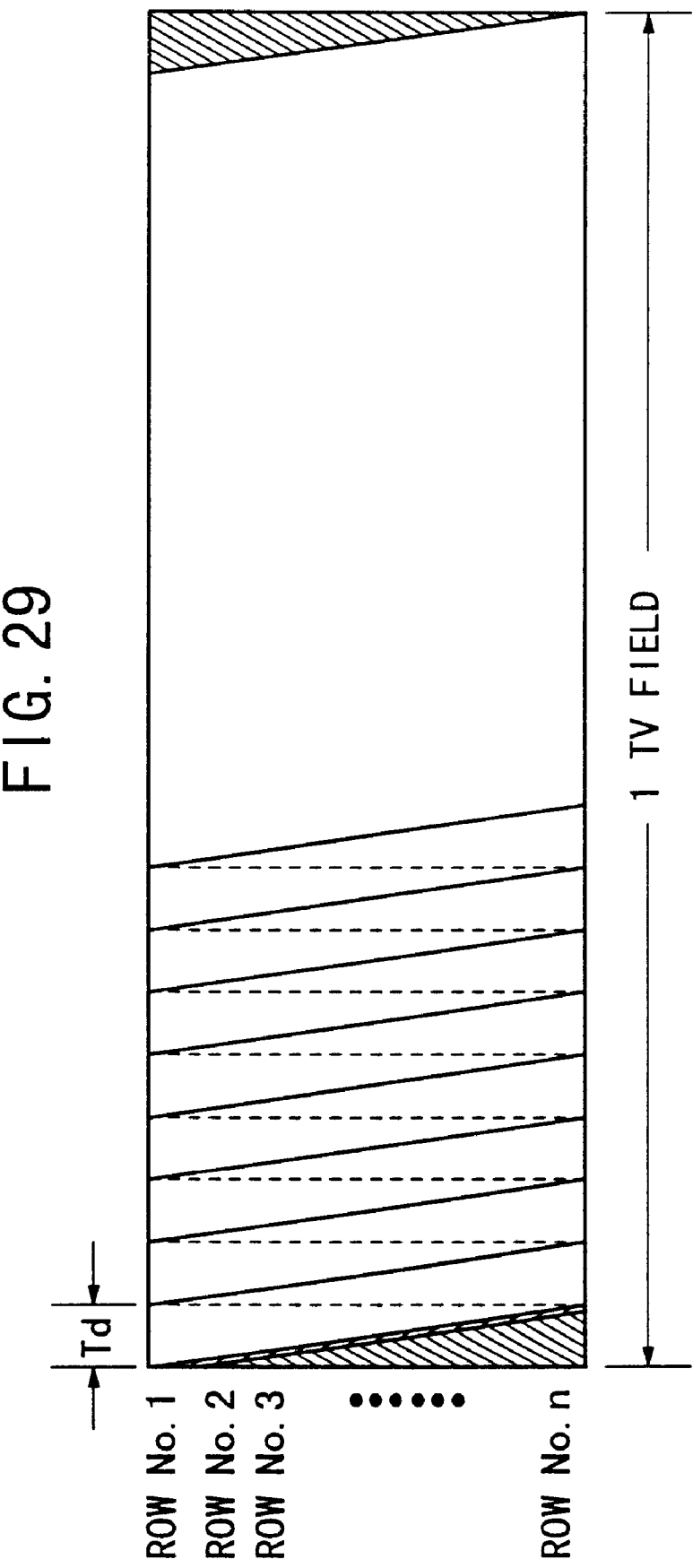
FIG. 29 shows an example in which especially one field is equally divided, for example, into a plurality of subfield in order to illustrate the gradation control based on the temporal modulation system.

The gradation control based on the temporal modulation system will now be explained with reference to FIGS. 29 to 41. At first, as shown in FIG. 29, it is assumed that the display period for one image is defined to be one field, and one divided period, which is obtained by equally dividing the one field into a plurality of ones, is defined to be a subfield. The display cycle Td is set for each of the subfields. For example, the maximum gradation level is 8 when the one field is equally divided into seven.

The row electrode-driving circuit 202 is subjected to the timing control by the signal control circuit so that all row selection is completed within each subfield. Therefore, the time (selection period) for selecting one row by the row electrode-driving circuit 202 is regulated by the time width obtained by dividing the time width of the subfield by the number of rows of the driving section 16, for which the time width or a time width shorter than the time width described above is selected. Preferably, 1/m of the time width (m is an arbitrary real number from 1 to 5, preferably a real number from 1 to 3) is selected.

The driving device 200 according to the embodiment of the present invention is controlled so that the signal control circuit 206 is used to determine, in the one field, the light emission start timing and the light emission maintenance period having a variable length irrelevant to the selection/unselection state of the concerning picture element, depending on the gradation level of the selected picture element.

Specified embodiments of the gradation control according to the embodiment of the present invention will be explained below with reference to FIGS. 30A to 41. In order to avoid any complicated drawing, the embodiments shown in FIGS. 30A to 41 are illustrative of the simplified format in which one field is divided into seven subfields SF1 to SF7, and the number of rows is 4.

First Specified Embodiment

As shown in FIG. 30A, the first specified embodiment resides in a system in which one selection period S and display cycles Td of a number corresponding to the maximum gradation level are allotted in one field. In this embodiment, the display cycle Td is composed of the unselection period U and the reset period R.

Basically, the unselection period U is used to select all of the rows other than the row relevant to the concerning picture element by the aid of the row electrode-driving circuit 202, and it is designed to satisfy "unselection period U≧selection period S×(number of rows-1)". The reset period R is used to select the row relevant to the concerning picture element in the same manner as in the selection period S, for which an approximately equivalent period is set.

Further, as shown in FIG. 30B, the selection pulse Ps is outputted during the selection period S by the aid of the row electrode-driving circuit 202, the unselection signal Su is outputted during the unselection period U In the display cycle Td, and the reset pulse Pr is outputted during the reset period R.

The signal control circuit 206 makes control for the column electrode-driving circuit 204 as follows. That is, the control is made such that the ON signal is outputted during the light emission maintenance period, and the OFF signal is outputted at least at the end timing of the light emission maintenance period during the period other than the light emission maintenance period.

For example, in relation to the picture element of the first row and first column, if the gradation level of the concerning picture element is, for example, 5, the control is performed as follows. That is, the ON signal is outputted in synchronization with the selection period S and the respective reset periods R from the first display cycle Td1 to the fourth display cycle Td4. and the OFF signal is outputted in synchronization with at least the reset period R in the fifth display cycle Td5 which firstly indicates the end of the light emission maintenance period, of the respective reset periods R from the fifth display cycle Td5 to the seventh display cycle Td7. The signal, which is outputted during the respective reset periods R in the residual sixth and seventh display cycles Td6 and Td7, may be either the ON signal or the OFF signal. The first specified embodiment is illustrative of the case in which the OFF signal is outputted.

Similarly, as shown in FIG. 30C, in relation to the picture element of the second row, and first column, if the gradation level of the concerning picture element is, for example, 3, the control is performed as follows. That is, the ON signal is outputted in synchronization with the selection period S and the respective reset periods R in the first and second display cycles Td1 and Td2, and the OFF signal is outputted in synchronization with at least the reset period R in the third display cycle Td3 which firstly indicates the end of the light emission maintenance period, of the respective reset periods R from the third display cycle Td3 to the seventh display cycle Td7. The signal, which is outputted during the respective reset periods R in the residual fourth to seventh display cycles Td4 to Td7, may be either the ON signal or the OFF signal. This embodiment is illustrative of the case in which the OFF signal is outputted.

Consideration will be specifically made in relation to the change in voltage. At first,,as shown in FIG. 30B, in relation to the picture element of the first row and first column, the selection pulse Ps having the peak voltage of -100 V is outputted during the selection period S. At this time, the ON signal having the peak voltage of 80 V is supplied to the signal line 42. Therefore, the actuator element 14 is applied with 80-(-100) V=180 V. According to the bending displacement characteristic shown in FIG. 7, the actuator element 14 makes the displacement up to Point E in the first direction. That is, the concerning picture element is in the light emission state.

Thereafter, the unselection signal Su having the peak voltage of -20 V is outputted during the unselection period U in the first display cycle Td1. During this period, the row electrode-driving circuit 202 is used to select the second row and the followings, and the ON signal or the OFF signal is randomly supplied to the signal line 42 of the first column. In other words, the actuator element 14 of the first row and first column is applied with 80-(-20) V=100 V or 0-(-20) V=20 V.

Therefore, as also understood from the bending displacement characteristic shown in FIG. 7, the concerning actuator element 14 undergoes the bending displacement of Point F or Point G. The actuator element 14 approximately maintains the original displacement state. That is, the light emission state of the concerning picture element is maintained.

The reset pulse Pr having the peak voltage of 60 V is outputted during the reset period R in the first display cycle Td1. At this time, the ON signal is supplied to the signal line of the first column. Therefore, the actuator element 14 is applied with 80-60 V=20 V. Thus, the light emission state of the concerning picture element is maintained.

The operation in the first display cycle Td1 is performed until the unselection period U in the fifth display cycle Td5 in the same manner as described above.

The OFF signal is supplied to the first column during the reset period R and the followings,in the next fifth display cycle Td5. Accordingly, the reset pulse Pr having the peak voltage of 60 V is outputted during the reset period R in the fifth display cycle Td5. At this time, the OFF signal having the peak voltage of 0 V is supplied to the signal line 42. Therefore, the concerning actuator element 14 is applied with 0-60 V=-60 V. According to the bending displacement characteristic shown in FIG. 7, the actuator element 14 is restored (reset) to Point A. Thus, the concerning picture element is in the light off state.

Thereafter, the unselection signal having the peak voltage of -20 V is outputted during the unselection period U in the sixth display cycle Td6. In this period, the row electrode-driving circuit 202 is used to select the second row and the followings. The ON signal or the OFF signal is randomly supplied to the signal line of the first column. The actuator element 14 of the first row and first column is applied with 80-(-20) V=100 V or 0-(-20) V=20 V.

Therefore, as also understood from the bending displacement characteristic shown in FIG. 7, the concerning actuator element 14 is in the displacement state of Point C or Point D. Thus, the light off state of the concerning picture element is maintained.

The reset pulse Pr having the peak voltage of 60 V is outputted during the reset period R in the sixth display cycle Td6. At this time, the OFF signal is supplied to the signal line 42 of the first column. Therefore, the actuator element 14 is applied with 0-60 V=-60 V. Thus, the light off state of the concerning picture element is maintained. The operation in the sixth display cycle Td6 is also performed in the seventh display cycle Td7 in the same manner as described above.

As described above, in relation to the picture element of the first row and first column having the gradation level of 5, the light emission state ranges from the head of the one field to the start point of time of the reset period R in the fifth display cycle Td5, and the light off state ranges from the start point of time of the reset period R in the fifth display cycle Td5 to the terminal end of the one field.

Similarly, as shown in FIG. 30C, in relation to the picture element of the second row and first column having the gradation level of 3, the light emission state ranges from the head of the one field to the start point of time of the reset period R in the third display cycle Td3, and the light off state ranges from the start point of time of the reset period R in the third display cycle Td3 to the terminal end of the one field.

According to the first specified embodiment, as shown in FIG. 30A, the following operation is effected assuming that the selection period S is allotted to the head of the one field. That is, one display cycle Td is selected, or a plurality of display cycles Td are continuously selected from the head of the one field, depending on the gradation level of the concerning picture element. The ON signal is outputted in synchronization with the head selection period S and the reset period in the selected display cycle Td. The OFF signal is outputted in synchronization with the respective reset periods R in the residual display cycles Td.

In this embodiment, only one cycle of light emission and light off is provided for the concerning picture element in the one field. Thus, it is possible to effectively reduce the electric power consumption as compared with the driving system (adopted, for example, in the plasma display) in which one field is divided into a plurality of subfields, and the forcible reset operation is performed for each of the subfields.

An illustrative experiment will now be described. In this illustrative experiment, the display D according to the embodiment of the present invention was used to measure the voltage waveform applied to the actuator element 14 obtained when the driving system according to the first specified embodiment was used or when Comparative Example (general driving system used in the plasma display) was used, while the change in light intensity (Ld) scattered from the concerning picture element was measured by using a photodiode. A measurement result obtained by using the first specified embodiment is shown in FIG. 31, and a measurement result obtained by using Comparative Example is shown in FIG. 32.

Figure 31:
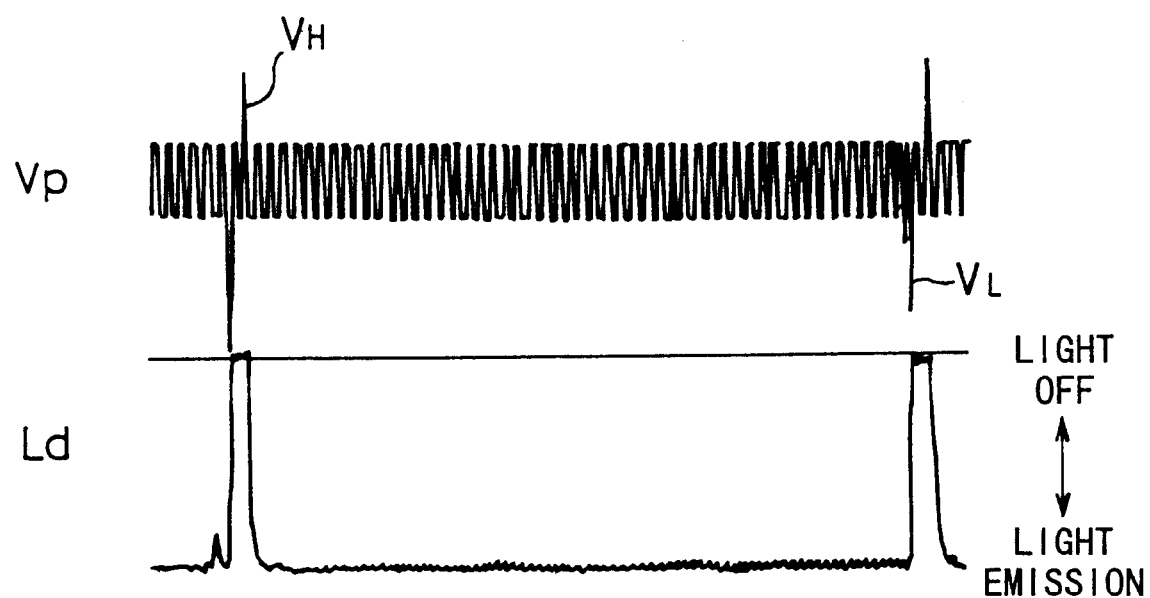
FIG. 31 shows an applied voltage waveform and a light intensity distribution illustrating an experimental result obtained in accordance with the driving system according to the first specified embodiment.

As for the first specified embodiment, the following fact is appreciated as shown in FIG. 31. That is, the high level pulse-shaped voltage $V_H$ is applied to the actuator element 14 on the basis of the output of the selection pulse Ps during the output period of the ON signal. The voltage waveform of 20 V and the voltage waveform of 100 V are applied randomly in the following display cycles. The low level pulse-shaped voltage $V_L$ is applied to the actuator element 14 on the basis of the output of the reset pulse Pr during the output period of the OFF signal.

According to this fact, as also understood from the electric charge-applied voltage characteristic shown in FIG. 8, the electric power, which corresponds to the area surrounded by "-x-", is consumed only once in the one field in the case of the first specified embodiment. This fact is also true for the displays Da to De according to the first to fifth modified embodiments. Especially, in the case of the display Dd according to the fourth modified embodiment based on the use of the varistor 120, the electric power, which corresponds to the area surrounded by "-x-" in the electric charge-applied voltage characteristic shown in FIG. 20, is consumed only once in the one field.

Figure 32:
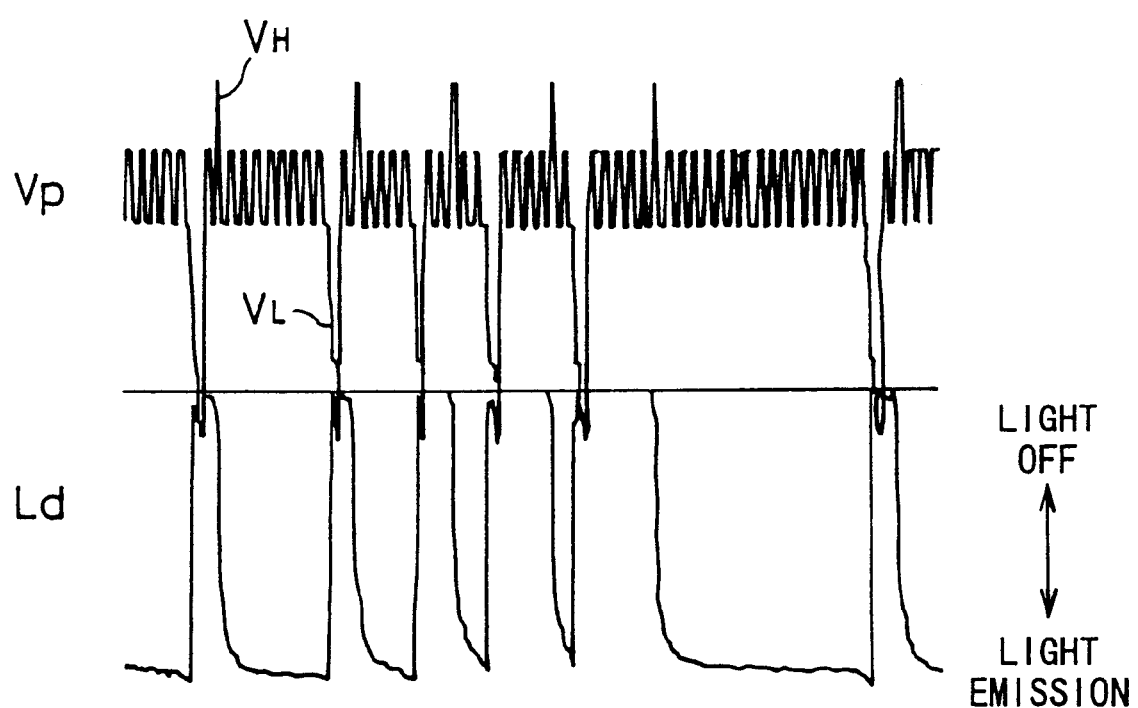
FIG. 32 shows an applied voltage waveform and a light intensity distribution illustrating an experimental result obtained in accordance with a driving system concerning a comparative example.

On the other hand, as for Comparative Example, as shown in FIG. 32, the applied voltage changes from the high level $V_H$ (180 V) to the low level $V_L$ (−60 V) in one display cycle Td. Therefore, as also understood from the electric charge-applied voltage characteristic shown in FIG. 8, the electric power, which corresponds to the area surrounded by "-x-", is consumed in one display cycle Td. In other words, the electric power, which corresponds to the area surrounded by "-x-", is consumed in the amount corresponding to the number of times of the display cycles Td in the one field. It is understood that the electric power consumption is increased as compared with the first specified embodiment.

As described above, when the first specified embodiment is adopted, it is possible to effectively reduce the electric power consumption of the panel type display.

Further, in the first specified embodiment, the light emission state is maintained over the display cycles selected depending on the gradation level of the concerning picture element. Therefore, it is also possible to realize the improvement in brightness. Furthermore, good linearity is obtained between the gradation and the brightness, making it possible to perform highly accurate gradational expression. Moreover, the efficiency of the light emission time is also improved. Especially, the display according to the fourth modified embodiment has the good hysteresis characteristic concerning the voltage-displacement characteristic. Therefore, it is possible to sufficiently maintain the brightness of light emission, and it is possible to realize the high brightness of the displayed image.

Second Specified Embodiment

Next, a gradation control system according to the second specified embodiment will be explained with reference to FIGS. 33A to 33C. As shown in FIG. 33A, the second specified embodiment resides in approximately the same gradation control system as that used in the first specified embodiment described above (see FIG. 30A). However, the former is different from the latter in that the display cycles Td1 to Td7 of a number corresponding to the maximum gradation level and one reset period R are allotted in the one field, and each of the display cycles Td1 to Td7 is composed of the selection period S and the unselection period U.

The signal control circuit 206 makes control for the column electrode-driving circuit 204 as follows. That is, the control is made such that the OFF signal is outputted during the periods other than the light emission maintenance period, and the ON signal is outputted at least at the light emission start timing during the light emission maintenance period.

For example, as shown in FIG. 33B, in relation to the picture element of the first row and first column, if the gradation level of the concerning picture element is, for example, 5, the control is performed as follows. That is, the OFF signal is outputted in synchronization with the respective selection periods S in the first and second display cycles. The ON signal is outputted in synchronization with at least the selection period S in the third display cycle Td3 which firstly indicates the light emission start timing, of the respective selection periods S from the third display cycle Td3 to the seventh display cycle Td7. The OFF signal is outputted in synchronization with the terminal end reset period R in the one field. The signal, which is outputted during the respective selection periods S in the fourth to seventh display cycles Td4 to Td7 in the light emission maintenance period, may be either the ON signal or the OFF signal. The second specified embodiment is illustrative of the case in which the ON signal is outputted.

Similarly, as shown in FIG. 33C, in relation to the picture element of second row and first column, if the gradation level of the concerning picture element is, for example, 3, the control is performed as follows. That is, the OFF signal is outputted in synchronization with the respective selection periods S from the first display cycle Td1 to the fourth display cycle Td4. The ON signal is outputted in synchronization with at least the selection period S in the fifth display cycle Td5 which firstly indicates the light emission start timing, of the respective selection periods S from the fifth display cycle Td5 to the seventh display cycle Td7. The OFF signal is outputted in synchronization with the terminal end reset period R in the one field. The signal, which is outputted during the respective selection periods S in the sixth and seventh display cycles Td6 and Td7 in the light emission maintenance period, may be either the ON signal or the OFF signal. The second specified embodiment is illustrative of the case in which the ON signal is outputted.

Consideration will be specifically made in relation to the change in voltage. At first, as shown in FIG. 33B, in relation to the first display cycle Td1 of the picture element of the first row and first column, the selection pulse Ps of (peak voltage −100 V) is outputted during the selection period S. At this time, the OFF signal having the peak voltage of 0 V is supplied to the signal line 42.

Therefore, the actuator element 14 is applied with 0−(−100) V=100 V. The bending displacement of the actuator element 14 has been reset and restored in the previous field. Therefore, the displacement state of Point D is given according to the bending displacement characteristic shown in FIG. 7. Thus, the light off state of the concerning picture element is maintained.

The unselection signal Su having the peak voltage of −20 V is outputted during the unselection period U in the first display cycle Td1. In this period, the row electrode-driving circuit 202 is used to select the second row and the followings. The ON signal or the OFF signal is randomly supplied to the signal line 42 of the first column. The actuator element 14 of the first row and first column is applied with 80−(−20) V=100 V or 0−(−20) V=20 V.

Therefore, as also understood from the bending displacement characteristic shown in FIG. 7, the concerning actuator element 14 is in the displacement state of Point C or Point D. Thus, the light off state of the concerning picture element is maintained.

The operation in the first display cycle Td1 is also performed in the second display cycle Td2 in the same manner as described above. The ON signal is supplied to the first column in the selection period S in the next third display cycle Td3 and the followings. Accordingly, the selection pulse Ps having the peak voltage of −100 V is outputted during the selection period S in the third display cycle Td3. At this time, the ON signal having the peak voltage of 80 V is supplied to the signal line 42. Therefore, the concerning actuator element 14 is applied with 80−(−100) V=180 V. According to the bending displacement characteristic shown in FIG. 7, the actuator element 14 makes bending displacement up to Point E. Thus, the concerning picture element is in the light emission state.

Thereafter, the unselection signal Su having the peak voltage of −20 V is outputted during the unselection period U in the third display cycle Td3. The ON signal or the OFF signal is randomly supplied to the signal line 42 of the first column during this period. The applied voltage Vp to the concerning actuator element 14 is 100 V or 20 V. As also understood from the bending displacement characteristic shown in FIG. 7, the bending displacement of Point F or Point G is given. In this state, the original displacement state of the actuator element 14 is approximately maintained. The light emission state of the concerning picture element is maintained.

The operation in the third display cycle Td3 is performed in the same manner as described above from the fourth display cycle Td4 to the seventh display cycle Td7.

The OFF signal is supplied to the first column in the terminal end reset period R. Accordingly, the concerning actuator element 14 is applied with 0−60 V=−60 V. According to the bending displacement characteristic shown in FIG. 7, the actuator element 14 is restored (reset) to Point A, and the concerning picture element is in the light off state.

As described above, the picture element of the first row first column having the gradation level of 5 is operated as follows as shown in FIG. 33B. That is, the light off state is given from the head of the one field to the second display cycle Td2. The light emission state is given from the third display cycle Td3 to the seventh display cycle Td7. The light off state is given in the terminal end reset period R.

Similarly, as shown in FIG. 33C, in relation to the picture element of the second row first column having the gradation level of 3, the light off state is given from the head of the one field to the fourth display cycle Td4, the light emission state is given from the fifth display cycle Td5 to the seventh display cycle Td7, and the light off state is given in the terminal end reset period R.

According to the second specified embodiment, as shown in FIG. 33A, the following operation is effected assuming that the reset period R is allotted to the rear end of the one field. That is, one display cycle Td is selected, or a plurality of display cycles Td are continuously selected from the rear end of the one field, depending on the gradation level of the concerning picture element. The ON signal is outputted in synchronization with the respective selection periods S in the selected display cycles Td. The OFF signal is outputted in synchronization with the rear end reset period R.

Also in this embodiment, only one cycle of light emission and light off is provided for the concerning picture element in the one field. Thus, it is possible to effectively reduce the electric power consumption. The linearity between the gradation and the brightness is excellent, and it is possible to make highly accurate gradational expression. Further, the efficiency of the light emission time is also enhanced. Especially, owing to the selection period which exists. in each of the selected display cycles, the brightness can be sufficiently maintained over the light emission maintenance period for the concerning picture element.

Third Specified Embodiment

Figure 34:
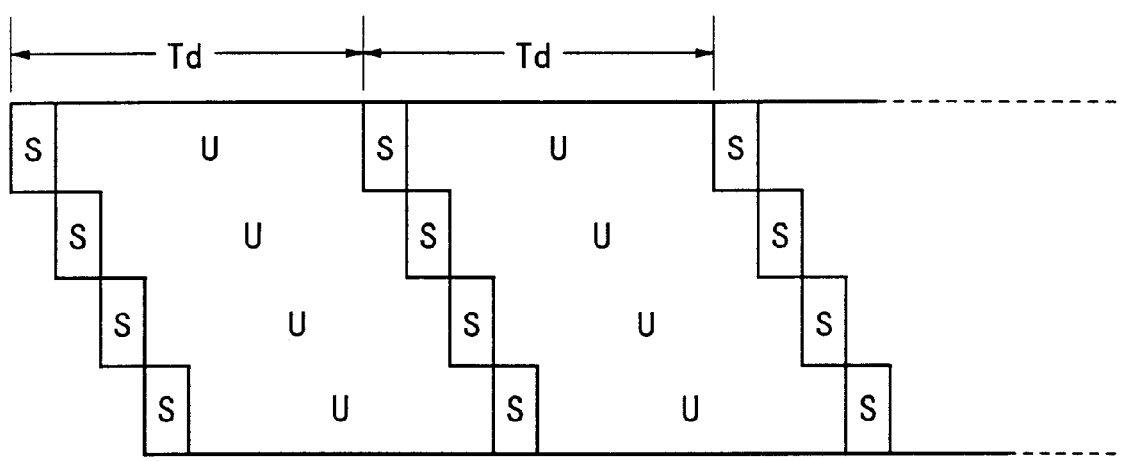
FIG. 34 illustrates, for example, allotment of display cycles used in a driving system according to a third specified embodiment.

Next, a gradation control system according to the third specified embodiment will be explained with reference to FIG. 34. As shown in FIG. 34, the third specified embodiment resides in approximately the same gradation control system as that used in the second specified embodiment described above (see FIG. 33A). However, in this specified embodiment, the maximum gradation level to be handled is lowered to prolong the temporal length of the unselection period U in each of the display cycles Td. In this specified embodiment, the temporal length of the selection period S may be not more than the temporal length of the selection period S in the second specified embodiment.

According to the third specified embodiment, the ratio of the light emission maintenance period for the picture element is increased. Therefore, it is possible to realize the higher brightness.

Fourth Specified Embodiment

Next, a gradation control system according to the fourth specified embodiment will be explained with reference to FIGS. 35A to 35C. As shown in FIG. 35A, the fourth specified embodiment resides in approximately the same gradation control system as that used in the first specified embodiment described above (see FIG. 30A). However, the former is different from the latter in that the odd/even-adjusting cycle Tc including the unit unselection period U(1) having the predetermined length between the two selection periods S and the display cycles Td1 to Td3 of a number corresponding to the maximum gradation level are allotted in the one field, and the redundant unselection period U(2) having the length twice the predetermined length and the reset period R are set in each of the display cycles Td1 to Td3.

The signal control circuit 206 makes control for the column electrode-driving circuit 204 as follows. That is, the control is made such that the ON signal is outputted in any of the selection periods S included in the odd/even-adjusting cycle, and the OFF signal is outputted at the end timing of the light emission maintenance period.

For example, as shown in FIG. 35B, in relation to the picture element of the first row and first column, when the gradation level of the picture element is, for example, an odd number of 5, the control is performed as follows. That is, the ON signal is outputted in,synchronization with the head selection period S in the odd/even-adjusting cycle Tc which indicates the start of the light emission maintenance period. The OFF signal is outputted in synchronization with the reset period R in the second display cycle Td2 which indicates the end of the light emission maintenance period. The signal, which is outputted during the other selection period and the reset periods, maybe either the ON signal or the OFF signal. The fourth specified embodiment is illustrative of the case in which the ON signal is outputted during the rear end selection period S in the odd/even-adjusting cycle Tc included in the light emission maintenance period and the reset period R in the first display cycle Td1, and the OFF signal is outputted during the reset period R in the third display cycle Td3 included in the period other than the light emission maintenance period.

Accordingly, the picture element of the first row and first column is in the light emission state from the head of the one field to the point of time of start of the reset period R in the second display cycle Td2, and it is in the light off state from the point of time of end of the reset period R in the second display cycle Td2 to the terminal end of the one field.

For example, as shown in FIG. 35C, in relation to the picture element of the second row and first column, when the gradation level of the picture element is, for example, an even number of 6, the control is performed as follows. That is, the ON signal is outputted in synchronization with the rear end selection period S in the odd/even-adjusting cycle Tc which indicates the start of the light emission maintenance period. The OFF signal is outputted in synchronization with the reset period R in the third display cycle Td3 which indicates the end of the light emission maintenance period. The signal, which is outputted during the other selection period S and the reset periods R, may be either the ON signal or the OFF signal. The fourth specified embodiment is illustrative of the case in which the ON signal is outputted during the respective reset periods R in the first and second display cycles Td1 and Td2 included in the light emission maintenance period, and the OFF signal is outputted during the head selection period S of the odd/even-adjusting cycle Tc included in the period other than the light emission maintenance period.

Accordingly, the picture element of the second row and first column is in the light off state from the head of the one field to the terminal end of the unit unselection period U(1) of the odd/even-adjusting cycle Tc, it is in the light emission state from the selection period S at the rear end of the odd/even-adjusting cycle Tc to the point of time of start of the reset period R in the third display cycle Td3, and it is in the light off state during the reset period R in the third display cycle Td3.

According to the fourth specified embodiment, the following operation is effected, for example, assuming that the eight gradations are expressed with the one field. In general, if the field is constructed by only unit display cycles, it is necessary to perform the selective scanning eight times for one row. However, when the allotment is made with the display cycle designed with the redundant unselection period U(2) having the length twice the predetermined length, it is enough to perform the selective scanning five times for one row. Thus, it is possible to reduce the cycle (row scanning cycle) for selecting one row. This reduces the number of times of electric power consumption corresponding to the area surrounded by "-▲-" depicted in the electric charge-applied voltage characteristic shown in FIG. 8. This results in the reduction of the electric power consumption. Further, this also results in the high brightness of the selected picture element, because the light emission state is maintained in the redundant unselection period U(2).

In view of the reduction of the number of times of electric power consumption corresponding to the area surrounded by "-▲-" depicted in the electric charge-applied voltage characteristic, a sufficient effect can be exhibited by making application to the display which does not have good hysteresis characteristic, such as the display Dd according to the fourth modified embodiment. Of course, even when application is made to the display Dd according to the fourth modified embodiment, it is extremely advantageous to reduce the frequency for the row selection.

Fifth Specified Embodiment

Figure 36A:
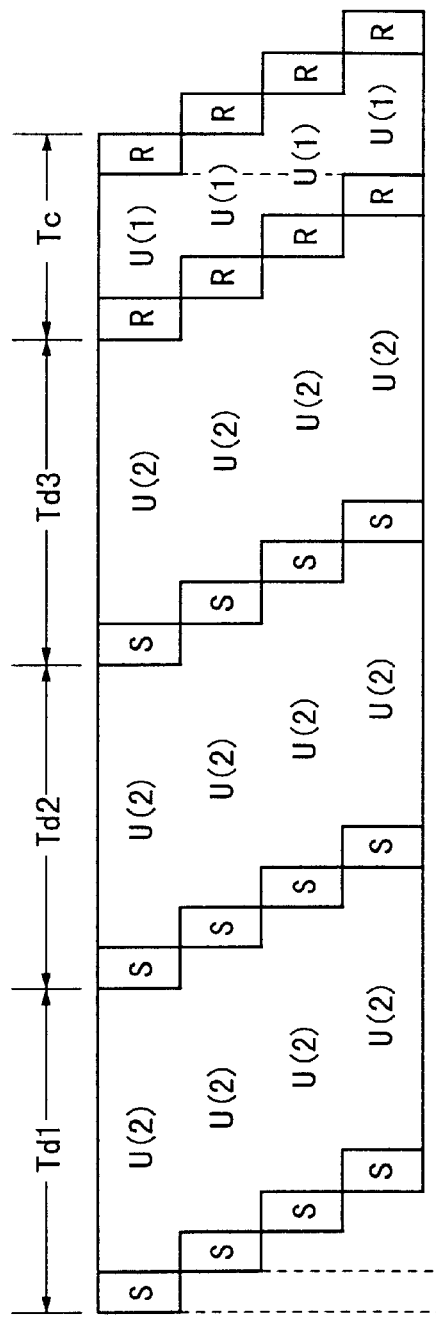
FIG. 36A illustrates, for example, allotment of display cycles used in a driving system according to a fifth specified embodiment.

Next, a gradation control system according to the fifth specified embodiment will be explained with reference to FIGS. 36A to 36C. As shown in FIG. 36A, the fifth specified embodiment resides in approximately the same gradation control system as that used in the fourth specified embodiment described above (see FIG. 35A). However, the former is different from the latter in that the display cycles Td1 to Td3 of a number corresponding to the maximum gradation level and the odd/even-adjusting cycle Tc including the unit unselection period U(1) having the predetermined length between the two reset periods R are allotted in the one field, and the redundant unselection period U(2) having the length twice the predetermined length is set in each of the display cycles Td1 to Td3.

The signal control circuit 206 makes control for the column electrode-driving circuit 204 as follows. That is, the control is made such that the ON signal is outputted at the start timing of the light emission maintenance period, and the OFF signal is outputted in any of the reset periods R included in the odd/even-adjusting cycle.

Figure 36B:
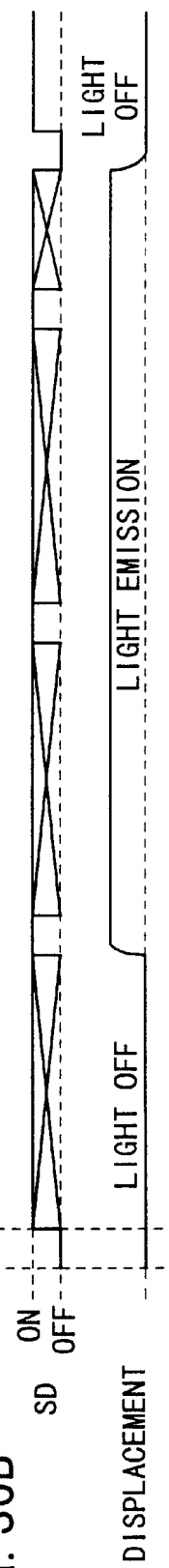
FIG. 36B shows signal waveforms illustrating the process for determining the light emission maintenance period concerning a picture element of first row and first column.

For example, as shown in FIG. 36B, in relation to the picture element of the first row and first column, when the gradation level of the picture element is, for example, an odd number of 5, the control is performed as follows. That is, the ON signal is outputted in synchronization with the selection period S in the second display cycle Td which indicates the start of the light emission maintenance period. The OFF signal is outputted in synchronization with the reset period R at the rear end of the odd/even-adjusting cycle Tc which indicates the end of the light emission maintenance period.

The signal, which is outputted during the other selection periods S and the reset period R, may be either the ON signal or the OFF signal. The fifth specified embodiment is illustrative of the case in which the ON signal is outputted during the selection period S in the third display cycle Td3 included in the light emission maintenance period and the reset period R at the head of the odd/even-adjusting cycle Tc, and the OFF signal is outputted during the selection period S in the first display cycle Td1 included in the period other than the light emission maintenance period.

Accordingly, the picture element of the first row and first column is in the light off state from the head of the one field to the first display cycle Td1, it is in the light emission state from the second display cycle Td2 to the point of time of start of the rear end reset period R in the odd/even-adjusting cycle Tc, and it is in the light off state in the terminal end reset period R.

Figure 36C:
FIG. 36C shows signal waveforms illustrating the process for determining the light emission maintenance period concerning a picture element of second row and first column.

As shown in FIG. 36C, for example, in relation to the picture element of the second row and first column, when the gradation level of the picture element is, for example, an even number of 6, the control is performed as follows. That is, the ON signal is outputted in synchronization with the selection period S in the first display cycle Td1 which indicates the start of the light emission maintenance period. The OFF signal is outputted in synchronization with the head reset period R in the odd/even-adjusting cycle Tc which indicates the end of the light emission maintenance period. The signal, which is outputted during the other selection periods S and the reset period R, may be either the ON signal or the OFF signal. The fifth specified embodiment is illustrative of the case in which the ON signal is outputted during the respective selection periods S in the second and third display cycles Td2 and Td3 included in the light emission maintenance period, and the OFF signal is outputted during the rear end reset period R of the odd/even-adjusting cycle Tc included in the period other than the light emission maintenance period.

Accordingly, the picture element of the second row and first column is in the light emission state from the head of the one field to the third display cycle Td3, and it is in the light off state from the odd/even-adjusting cycle Tc to the terminal end of the one field.

Also in the fifth specified embodiment, it is possible to reduce the row scanning cycle. Further, it is possible to reduce the electric power consumption and realize the high brightness.

The first to third specified embodiments described above are illustrative of the case in which the equally spaced display cycles Td, which are of the number corresponding to the maximum gradation level, are allotted in the one field. Alternatively, as in the sixth and seventh specified embodiments described below, the following arrangement is also preferred. That is, at least one unit display cycle including the unit unselection period having the predetermined length and at least one redundant display cycle are allotted in the one field. The redundant display cycle is provided with the redundant unselection period having the length which is n-times the predetermined length (n is an integer of not less than 2). In this description, n is conveniently defined as "degree of redundancy".

The following expressions are satisfied:

$Z = $(quotient of $X/n$)$-1$ $Y = X - Z \times n$

[total number of subfields $(Y+Z) = (X/n-1) + n$]

provided that the maximum gradation level is X, the number of unit display cycles is Y, and the number of redundant display cycles is Z. Further, "a" individuals of selection periods S are allotted to the respective display cycles from the head of the one field, and "b" individuals of reset periods R are allotted to the respective display cycles from the rear end of the one field. On this assumption, there is given:

$a + b = Y + Z + 1$.

In the case of $b = n$, all of the gradations included in the maximum gradation level can be expressed. However, on the assumption of $b = n-1$, one or several gradation levels may be curtailed. This reduces the row scanning cycles, and hence it is possible to realize the low electric power consumption.

Specified embodiments based on this gradation control system will be explained below with reference to FIGS. 37 to 39.

Sixth Specified Embodiment

Figure 37:
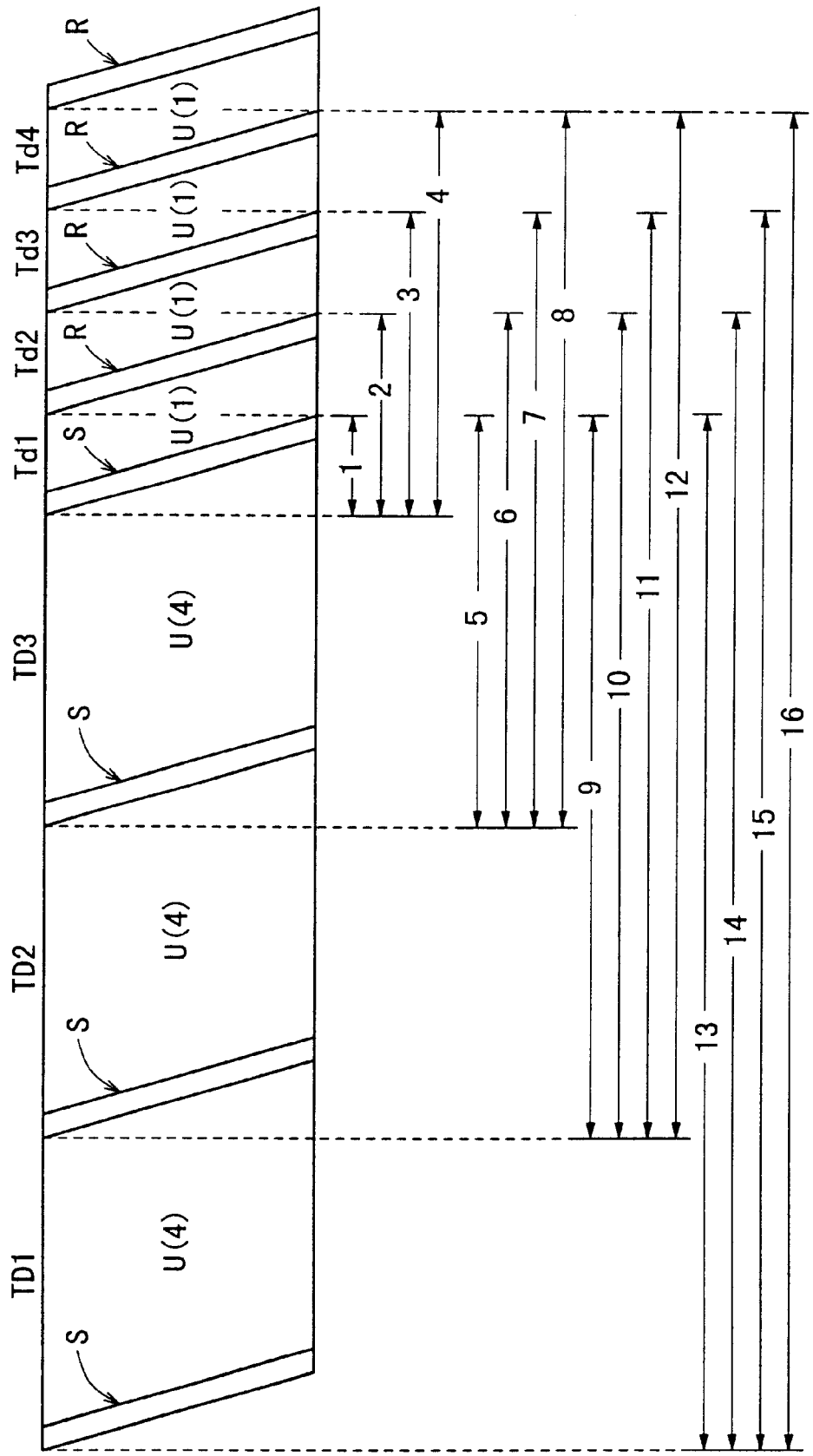
FIG. 37 illustrates, for example, allotment of display cycles used in a driving system according to a sixth specified embodiment.

In the sixth specified embodiment, the degree of redundancy n is 4, and the maximum gradation level X is 16 as shown in FIG. 37. In this case, the number Z of the redundant display cycles TD is (quotient of 16/4)−1=3, and the number Y of the unit display cycles Td is 16−3×4=4.

In the sixth specified embodiment, three redundant display cycles TD1 to TD3 are continuously allotted from the head of the one field, and then four unit display cycles Td1 to Td4 are continuously allotted. Further, four selection periods S are allotted to the respective display cycles from the head of the one field. Four reset periods R are allotted to the respective display cycles from the rear end of the one field.

In the sixth specified embodiment, when the gradation levels 1 to 4 are expressed, then the ON signal is outputted in synchronization with the fourth selection period S allotted to the former stage of the first unit display cycle Td1, and the ON signal and the OFF signal are outputted in synchronization with the reset periods in the unit display cycles Td1 to Td4 of the number corresponding to the gradation level of the concerning picture element.

When the gradation levels 5 to 8 are expressed, then the ON signal is outputted in synchronization with the third selection period S allotted to the former stage of the third redundant display cycle TD3 and the fourth selection period is S described above, and the ON signal and the OFF signal are outputted in synchronization with the reset periods in the unit display cycles Td1 to Td4 of the number corresponding to the gradation level of the concerning picture element.

When the gradation levels 9 to 12 are expressed, then the ON signal is outputted in synchronization with the second selection period S allotted to the former stage of the second redundant display cycle TD2 and the third and fourth selection periods S described above, and the ON signal and the OFF signal are outputted in synchronization with the reset periods R in the unit display cycles Td1 to Td4 of the number corresponding to the gradation level of the concerning picture element.

When the gradation levels 13 to 16 are expressed, then the ON signal is outputted in synchronization with the head selection period S to the fourth selection period S, and the ON signal and the OFF signal are outputted in synchronization with the reset periods R in the unit display cycles Td1 to Td4 of the number corresponding to the gradation level of the concerning picture element.

According to the sixth specified embodiment, for example, when it is assumed that the sixteen gradations are expressed in the one field, it is enough to perform the selective scanning eight times for one row. Thus, it is possible to greatly reduce the row scanning cycles. As a result, it is possible to realize the reduction of electric power consumption and the high brightness.

Seventh Specified Embodiment

Figure 38:
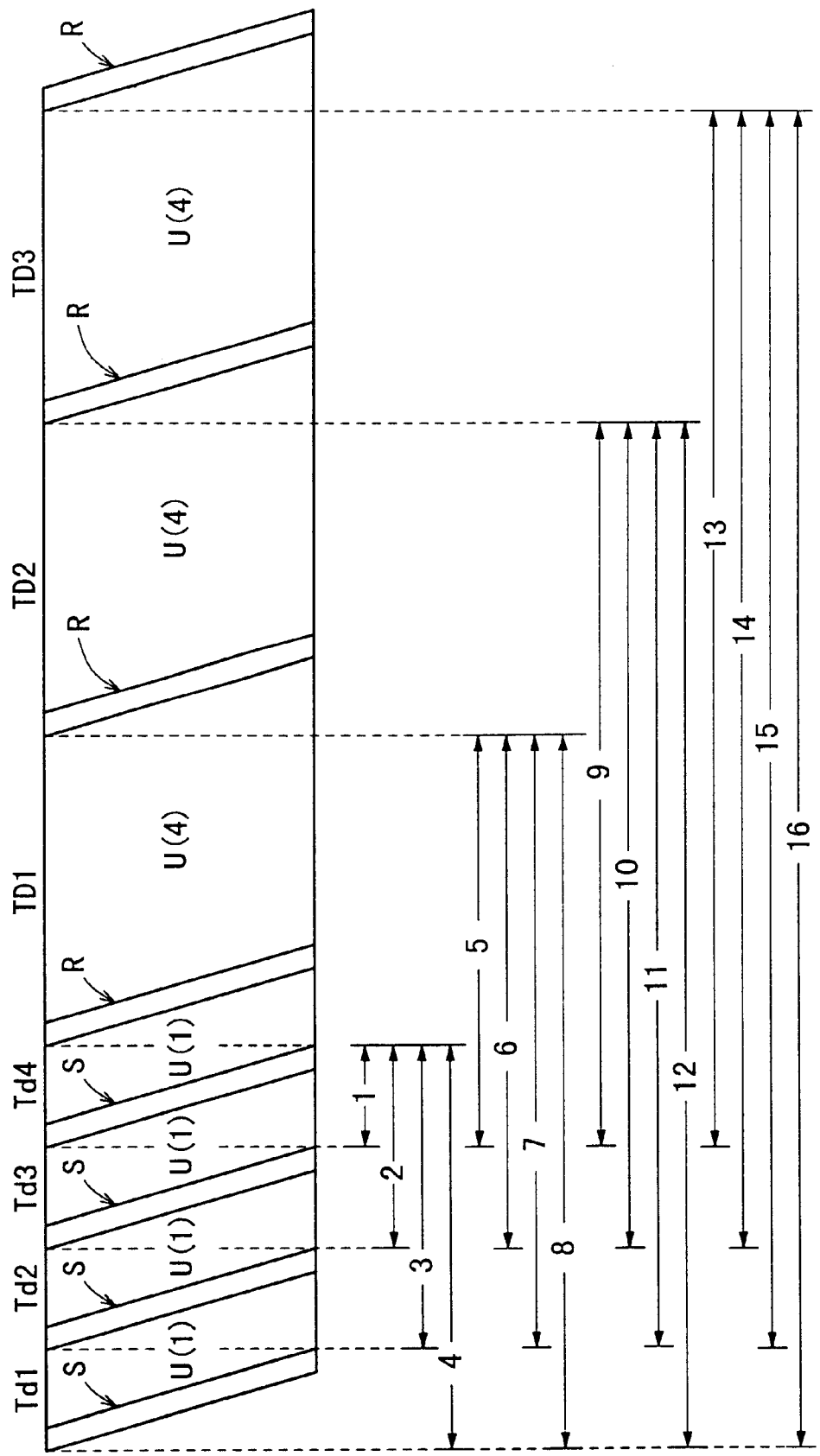
FIG. 38 illustrates, for example, allotment of display cycles used in a driving system according to a seventh specified embodiment.

The seventh embodiment is constructed in approximately the same manner as the sixth embodiment as shown in FIG. 38. However, the former is different from the latter in that four unit display cycles Td1 to Td4 are continuously allotted from the head of the one field, and then three redundant display cycles TD1 to TD3 are continuously allotted.

In the seventh specified embodiment, when the gradation levels 1 to 4 are expressed, the OFF signal is outputted in synchronization with the respective reset periods, and the start timing of the ON signal is controlled so that the number of the unit display cycles Td1 to Td4 is increased or decreased depending on the gradation level. When the gradation levels 5 to 8 are expressed, the OFF signal is outputted in synchronization with the respective reset periods R allotted to the rear end of the first redundant display cycle TD1 and the followings, and the start timing of the ON signal is controlled so that the number of the unit display cycles Td1 to Td4 included together with the first redundant display cycle TD1 is increased or decreased depending on the gradation level.

When the gradation levels 9 to 12 are expressed, the OFF signal is outputted in synchronization with the respective reset periods R allotted to the rear end of the second redundant display cycle TD2 and the followings, and the start timing of the ON signal is controlled so that the number of the unit display cycles Td1 to Td4 included together with the first and second redundant display cycles TD1 and TD2 is increased or decreased depending on the gradation level.

When the gradation levels 13 to 16 are expressed, the control is made such that the OFF signal is outputted in synchronization with the reset period R allotted to the rear end of the one field, and the start timing of the ON signal is controlled so that the number of the unit display cycles Td1 to Td4 included together with the first to third redundant display cycles TD1 to TD3 is increased or decreased depending on the gradation level.

The sixth and seventh specified embodiments described above are illustrative of the case in which the degree of redundancy n is 4. Alternatively, the present invention is also applicable to the cases in which the degree of redundancy n is 2, 3, 5 . . . .

In this case, it is preferable that the unit display cycle and the redundant display cycle are allotted in a combination in which the total number of subfields is minimum, of the total numbers of subfields corresponding to the maximum gradation level obtained by arbitrarily combining the unit display cycle Td and the redundant display cycle TD.

That is, as shown in FIG. 39, the total number of subfields, which is obtained by arbitrarily combining the unit display cycle Td and the redundant display cycle TD, varies depending on the maximum gradation level. For example, consideration will be made for the case of the degree of redundancy n=4 (combination of U(1) and U(4)). In this case, the total number of subfields is 7 when the maximum gradation level is 16, and the total number of subfields is 67 when the maximum gradation level is 256. In the case of the degree of redundancy n=8 (combination of U(1) and U(8)), the total number of subfields is 9 when the maximum gradation level is 16, and the total number of subfields is 39 when the maximum gradation level is 256.

Therefore, in this embodiment, when the maximum gradation level is 16, the combination of the degree of redundancy n=4 (combination of U(1) and U(4)), in which the total number of subfields is minimum, is adopted. When the maximum gradation level is 32, the combination of the degree of redundancy n=4 or 8 (combination of U(1) and U(4) or combination of U(1) and U(U8)) is adopted. Similarly, when the maximum gradation level is 64, the combination of the degree of redundancy n=8 is adopted. When the maximum gradation level is 128, the combination of the degree of redundancy n=8 or 16 (combination of U(1) and U(8) or combination of U(1) and U(16)) is adopted. When the maximum gradation level is 256, the combination of the degree of redundancy n=16 is adopted.

By doing so, the total number of subfields is decreased at each of the maximum gradation levels, and it is possible to effectively achieve the reduction of electric power consumption. Further, it is also possible to mitigate the load on the scanning circuit.

The first to seventh specified embodiments are illustrative of the gradation control in which only one cycle of light emission and light off is effected for one picture element in one field. Alternatively, as described below in the eighth and ninth specified embodiments, it is also preferable to perform the gradation control such that two cycles of light emission and light off are effected for one picture element in one field.

Eighth Specified Embodiment

Figure 40:
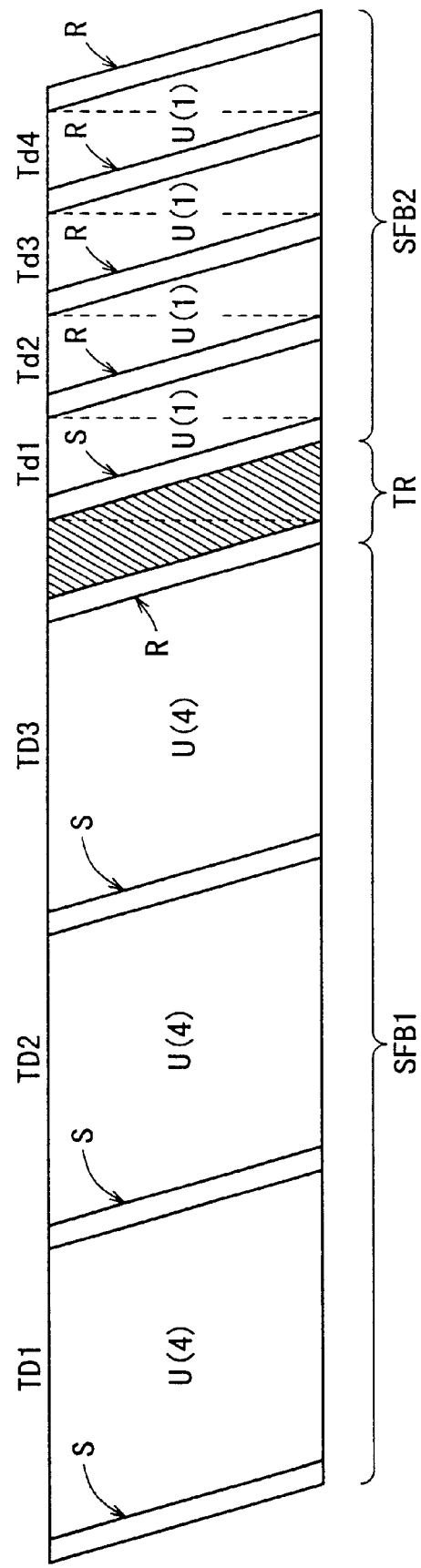
FIG. 40 illustrates, for example, allotment of display cycles used in a driving system according to an eighth specified embodiment.

As shown in FIG. 40, the eighth specified embodiment is designed as follows. That is, the first subfield block SFB1 composed of three redundant display cycles TD1 to TD3 and the second subfield block SFB2 composed of four unit display cycles Td1 to Td4 are allotted in the one field. Further, the forcible reset period TR is allotted between the first and second subfield blocks SFB1 and SFB2. The gradation control system used in the eighth specified embodiment is approximately the same as that used in the second specified embodiment, explanation of which is omitted.

In this embodiment, the redundant display cycle TD is used in the first subfield block SFB1. Therefore, it is possible to reduce the number of row scanning cycles, and it is possible to realize the reduction of electric power consumption. Especially, the provision of the forcible reset period TR makes it possible to give the signal sufficient to quench the picture element during the period described above.

Ninth Specified Embodiment

Figure 41:
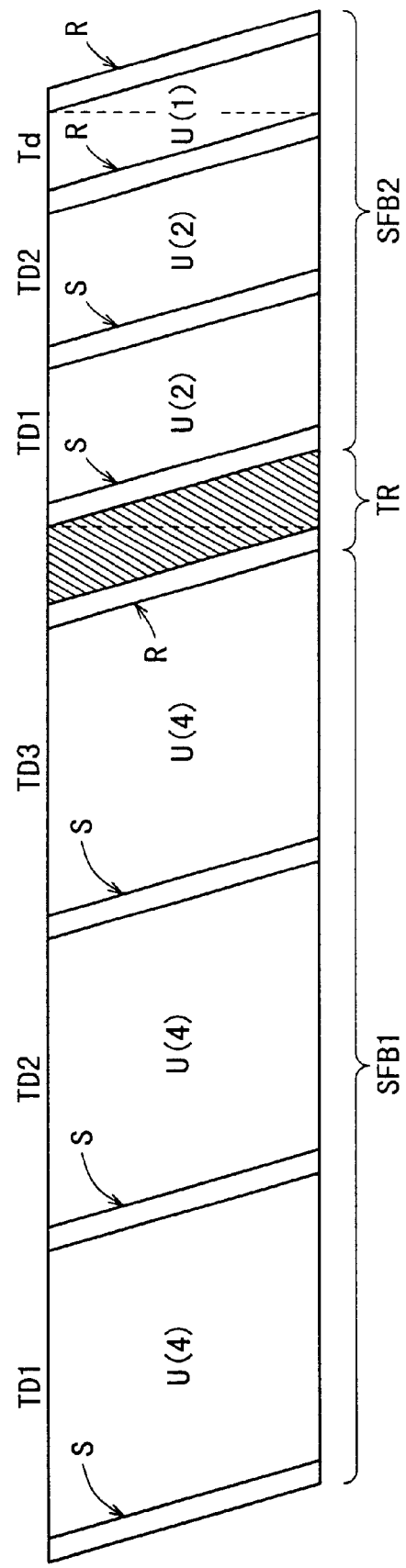
FIG. 41 illustrates, for example, allotment of display cycles used in a driving system according to a ninth specified embodiment.

As shown in FIG. 41, the ninth specified embodiment is constructed in approximately the same manner as the eighth specified embodiment. However, the former is different from the latter in that two redundant display cycles TD1 and TD2 and one unit display cycle Td are allotted for the second subfield block SFB2. The gradation control system used in the ninth specified embodiment is approximately the same as that used in the second specified embodiment for the first subfield block SFB1, and it is approximately the same as that used in the fifth modified embodiment for the second subfield block SFB2, explanation of which is omitted.

In this embodiment, the number of row scanning cycles can be also reduced in the second subfield block SFB2. Therefore, it is possible to realize the further reduction of electric power consumption.

The gradation control for the driving devices according to the embodiment of the present invention has been explained above on the basis of the first to ninth specified embodiments. The driving devices are preferably used for the arrangement of the display in which the varistor 120 is connected between the column electrode 28b and the signal line 42 as shown in FIG. 17, based on the display D according to the embodiment of the present invention shown in FIG. 1 and the display Da according to the first modified embodiment shown in FIG. 10.

In this case, as shown in FIG. 42, it is preferable to use −100 V as the peak value of the selection pulse Ps outputted from the row electrode-driving circuit 202, −20 V as the peak value of the unselection signal Su, and 60 V as the peak value of the reset pulse Pr. Further, it is preferable to use 80 V as the ON signal outputted from the column electrode-driving circuit 204 and 0 V as the OFF signal.

Figure 43:
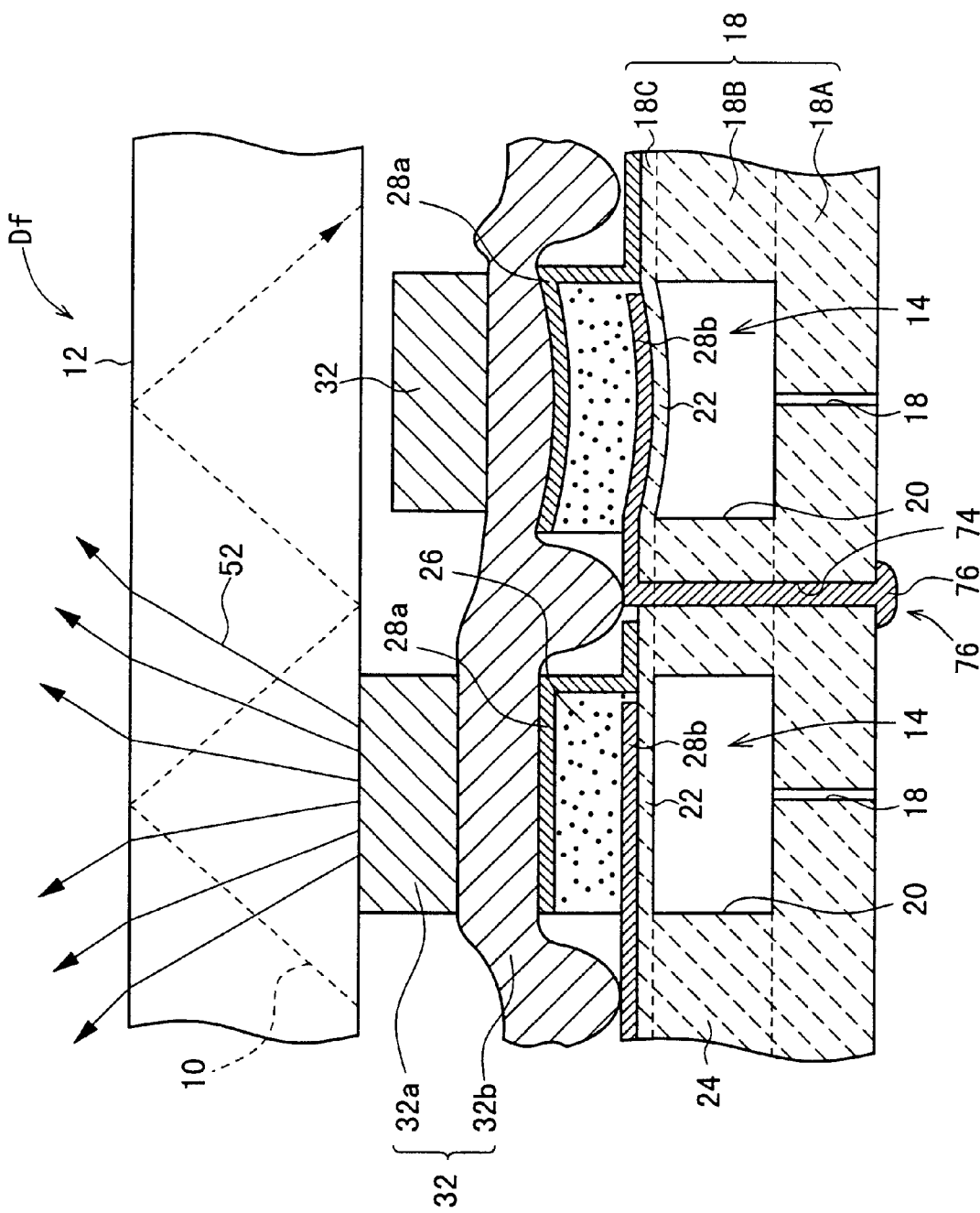
FIG. 43 shows a cross-sectional arrangement illustrating a display according to a sixth modified embodiment.

On the other hand, the driving device according to any one of the first to ninth specified embodiments may be also used for a display Df according to the sixth modified embodiment as shown in FIG. 43.

The display Df is constructed as follows. That is, the end surface of the plate member 32a of the displacement-transmitting section 32 contacts with the back surface of the optical waveguide plate 12 at the distance of not more than the wavelength of the light 10 (light emission) in the natural state of the actuator element 14 or by supplying the ON signal to the actuator element 14. When the OFF signal is applied to the actuator element 14, the actuator element 14 makes the bending displacement to be convex toward the hollow space 20, i.e., makes the bending displacement in the second direction so that the end surface of the plate member 32a is separated from the optical waveguide plate 12 (light off).

The driving devices according to the first to ninth specified embodiments described above are preferably used for the arrangement in which the varistor 120 is connected between the column electrode 28b and the signal line 42 as shown in FIG. 17, based on the display Df according to the sixth modified embodiment shown in FIG. 43.

In this case, as shown in FIG. 44, it is preferable to use 90 V as the peak value of the selection pulse Ps outputted from the row electrode-driving circuit 202, −10 V as the peak value of the unselection signal Su, and −110 V as the peak value of the reset pulse Pr. Further, it is preferable to use 0 V as the ON signal outputted from the column electrode-driving circuit 204 and 100 V as the OFF signal.

More preferably, as shown in FIG. 45, it is appropriate to use 170 V as the peak value of the selection pulse Ps outputted from the row electrode-driving circuit 202, 0 V as the peak value of the unselection signal Su, and −160 V as the peak value of the reset pulse Pr. Further, it is appropriate to use 0 V as the ON signal outputted from the column electrode-driving circuit 204 and 80 V as the OFF signal.

Additionally, in the first to ninth specified embodiments concerning the driving device according to the embodiment of the present invention, the electric power consumption can be further reduced by using an electric power recovery circuit in combination.

The gradation control effected in the driving device as described above is also applicable to the gradation control used for the liquid crystal display and the plasma display.

For example, in the case of the plasma display, each of the picture elements (discharge cells) is represented by a capacitive element (capacitor) by using an equivalent circuit, thus providing the memory effect in the same manner as the respective picture elements, of the display according to the embodiment of the present invention. Therefore, the gradation control for the driving device according to the embodiment of the present invention can be applied thereto.

In this case, the following effects can be obtained.

(1) It is possible to realize the high brightness, because the long light emission maintenance period is available.

(2) It is possible to avoid occurrence of so-called pseudo-contour, because the gradational expression is not performed by using the combination of divided subfields.

(3) It is possible to lower the electric power consumption, because only one time (first to seventh specified embodiments) or two times (eighth and ninth specified embodiments) of light-on discharge is provided in one field.

The gradation control according to the embodiment of the present invention is also applicable to TFT-LCD (liquid crystal display based on the active matrix system), because TFT-LCD lies in the combination of the switching element and the capacitive picture element. In this case, it is possible to realize the high brightness and the low electric power consumption.

Figure 46:
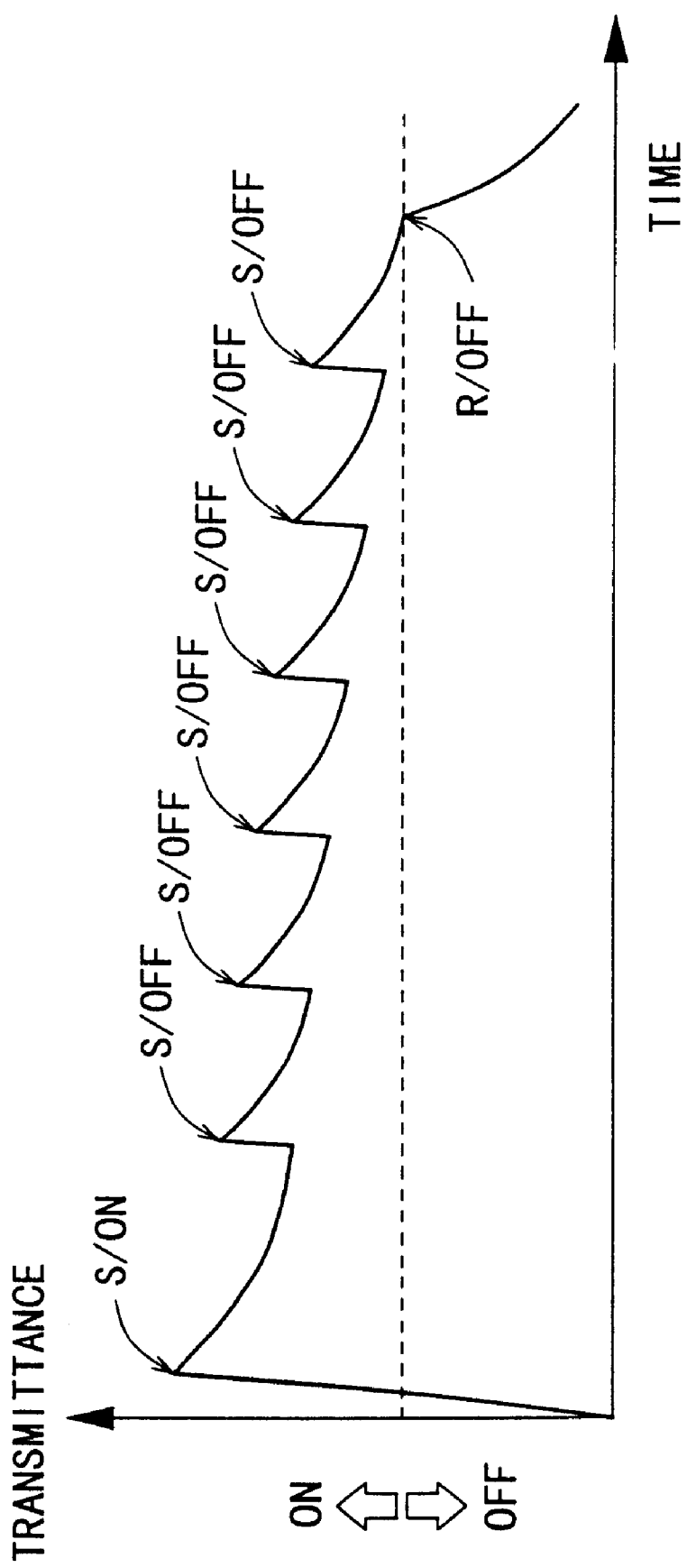
FIG. 46 shows a frame response waveform obtained when the driving system according to the second specified embodiment is applied to LCD based on the simple matrix system to express the gradation level=7.

The gradation control according to the embodiment of the present invention (especially, those concerning the second, third, fifth, eighth, and ninth specified embodiments) is also applicable to LCD based on the simple matrix system by utilizing the frame response of the picture element. FIG. 46 shows a frame response waveform in which the second specified embodiment (see FIGS. 33A to 33C) concerning the embodiment of the present invention is applied to LCD based on the simple matrix system to express the gradation level=7.

In FIG. 46, S/ON indicates a state in which the ON signal is outputted during the selection period for the selected picture element, S/OFF indicates a state in which the OFF signal is outputted during the selection period for the concerning picture element, and R/OFF indicates a state in which the OFF signal is outputted during the reset period for the concerning picture element. Therefore, in the example shown in FIG. 46, the light emission maintenance period ranges from the point of time of S/ON to the point of time of R/OFF.

In the display D according to the embodiment of the present invention, for example, as shown in FIG. 1, the light off is effected in the natural state of the actuator element 14, and the light emission is effected by allowing the actuator element 14 to make the bending displacement to be convex toward the optical waveguide plate 12 when the high level voltage is applied between the row electrode 28a and the column electrode 28b of the actuator element 14. Alternatively, it is also preferable that the static electricity is generated between the back surface of the optical waveguide plate 12 and the contact surface (end surface) of the displacement-transmitting section 32, in addition to the strain generated by applying the voltage to the shape-retaining layer 26 when the actuator element 14 is subjected to the ON operation/OFF operation by allowing the displacement-transmitting section 32 to make contact/separation with respect to the back surface of the optical waveguide plate 12, so that the attractive force and the repulsive force brought about by the static electricity may be utilized for the ON operation/OFF operation of the actuator element 14.

As a result, the following arrangement is available. That is, the dielectric polarization is caused during the operation of the actuator element 14 to improve the ON characteristic of the actuator element 14 (for example, the contact performance and the response performance in the contact direction of the displacement-transmitting section 32) by utilizing the attractive force brought about by the static electricity. Further, it is also possible to improve the OFF characteristic (for example, the separation performance and the response performance in the separation direction of the displacement-transmitting section 32) in addition to the ON characteristic of the actuator element 14 by utilizing not only the attractive force but also the repulsive force brought about by the static electricity.

For example, when it is intended to improve only the ON characteristic of the actuator element 14, a coating material is merely arranged on the contact surface (end surface) of the displacement-transmitting section 32 and the optical waveguide plate 12 itself or the back surface of the optical waveguide plate 12 to allow them to cause the dielectric polarization.

Further, for example, when it is intended to improve both of the ON characteristic and the OFF characteristic of the actuator element 14, a transparent electrode or a metal thin film is arranged on the back surface of the optical waveguide plate 12 to switch the electric polarity thereof so that both of the attractive force and the repulsive force are generated by the static electricity with respect to the contact surface of the displacement-transmitting section 32 subjected to the dielectric polarization.

Figure 47A:
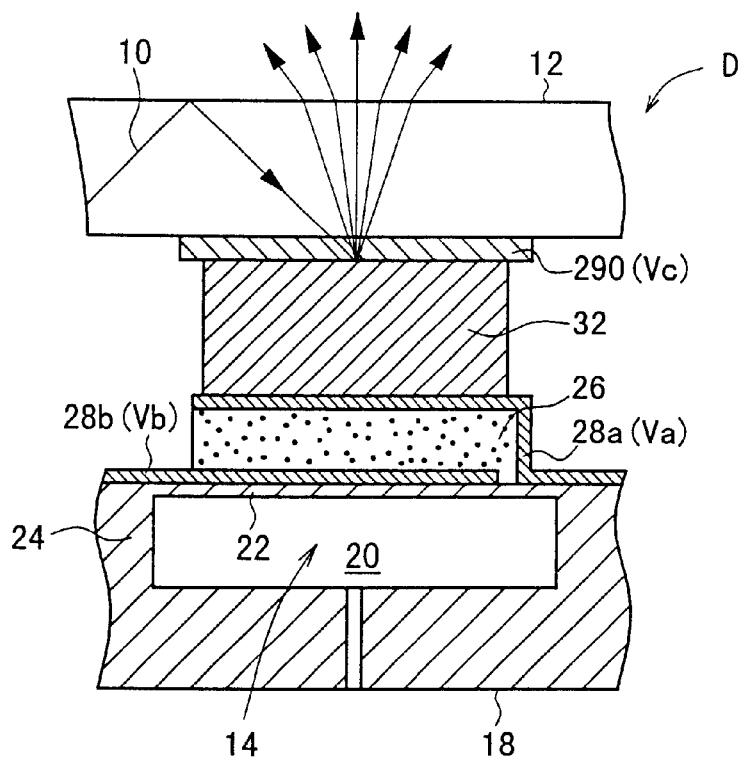
FIG. 47A shows a sectional view illustrating a light emission state concerning an example of a display based on the use of static electricity.
Figure 47B:
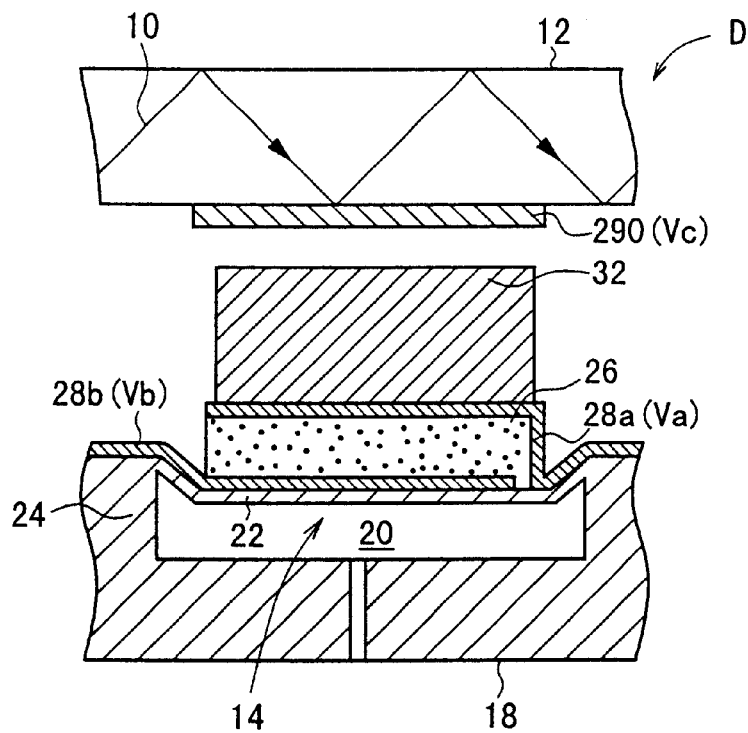
FIG. 47B shows a sectional view illustrating a light off state concerning the display described above.

The arrangement described above will be specifically explained with reference to FIGS. 47A to 48B. The display D is constructed such that the actuator element 14 is allowed to cause light emission in the natural state, the row electrode 28a is formed on the upper surface of the shape-retaining layer 26, and the column electrode 28b is formed on the lower surface of the shape-retaining layer 26 as shown in FIGS. 47A and 47B. In this display D, transparent electrodes 290 are formed at positions of the back surface of the optical waveguide plate 12 corresponding to the actuator elements 14 respectively.

When the actuator element 14 is subjected to the ON operation to cause the light emission, for example, as shown in FIG. 47A, then the voltage (Vc>Va) is applied between the row electrode 28a and the transparent electrode 290 corresponding to the concerning actuator element 14, and the voltage between the row electrode 28a and the column electrode 28b is made approximately zero (Va≈Vb).

Accordingly, the displacement-transmitting section 32 is pressed toward the optical waveguide plate 12 in accordance with the electrostatic attractive force exerted between the transparent electrode 290 and the row electrode 28a. The pressing force makes it possible to improve the brightness and improve the response speed.

On the other hand, when the actuator element 14 is subjected to the OFF operation to cause the light off, as shown in FIG. 47B, then the voltage between the row electrode 28a and the transparent electrode 290 corresponding to the concerning actuator element 14 is made approximately zero (Vc≈Va), and the voltage (Va<Vb) is applied between the row electrode 28a and the column electrode 28b.

Accordingly, the actuator element 14 makes bending displacement to be convex toward the hollow space 20, and the displacement-transmitting section 32 is separated from the optical waveguide plate 12.

The transparent electrode 290 may be formed on any of the back surface of the optical waveguide plate 12 and the end surface of the displacement-transmitting section 32. However, the transparent electrode 290 is preferably formed on the end surface of the displacement-transmitting section 32 because of the following reason. That is, the distance between the transparent electrode 290 and the row electrode 28a on the actuator element 14 is decreased, and it is possible to generate larger electrostatic force.

The transparent electrode 290, which is formed on the back surface of the optical waveguide plate 12, is effective to improve the separation performance of the displacement-transmitting section 32. In general, the local surface electric charge is generated on the displacement-transmitting section 32 and the optical waveguide plate 12 in accordance with the contact and separation of the displacement-transmitting section 32. The local surface electric charge assists the displacement-transmitting section 32 to make contact with the optical waveguide plate 12. However, in such a situation, an inconvenience tends to occur such that the displacement-transmitting section 32 adheres to the optical waveguide plate.

Accordingly, when the transparent electrode 290 is formed on the back surface of the optical waveguide plate 12, then the generation of the local surface electric charge Is mitigated, the inconvenience (adhesion) is reduced, and the separation performance of the displacement-transmitting section 32 is improved.

Figure 48A:
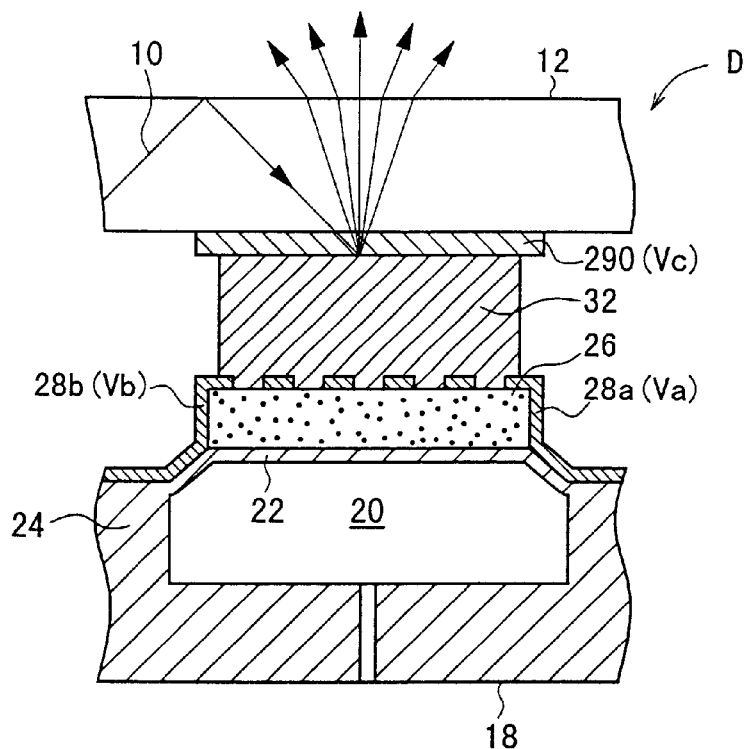
FIG. 48A shows a sectional view illustrating a light emission state concerning another example of a display based on the use of static electricity.
Figure 48B:
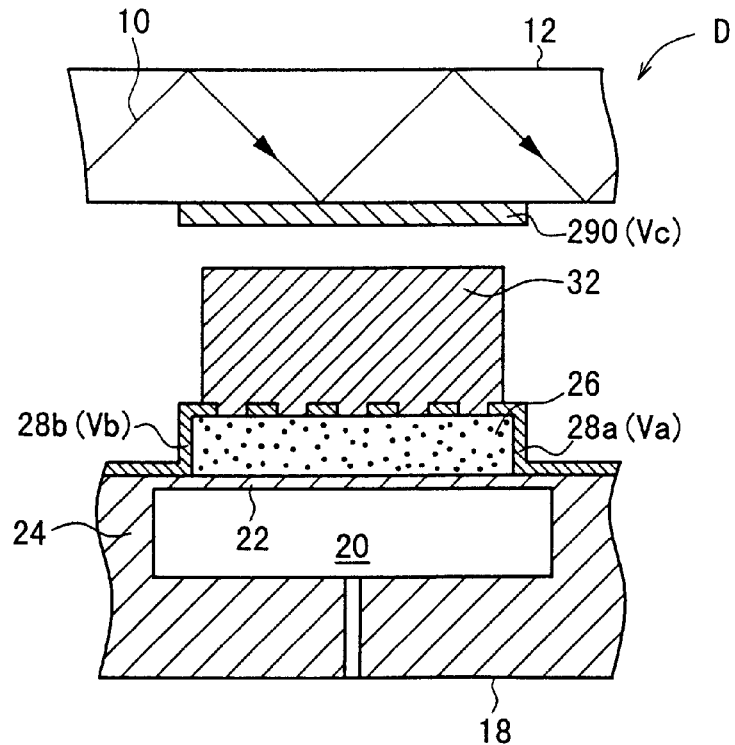
FIG. 48B shows a sectional view illustrating a light off state concerning the display described above.

The arrangement, in which the transparent electrode 290 is formed to utilize the static electricity, is also applicable to the display D as shown in FIGS. 48A and 48B, i.e., the display D including the pair of electrodes (the row electrode 28a and the column electrode 28b) formed on the upper surface of the shape-retaining layer 26.

That is, the transparent electrode 290 is formed on the back surface of the optical waveguide plate 12. When the voltage (Vc>Va, Vc>Vb) is applied between the transparent electrode 290 and the pair of electrodes 28a, 28b provided on the upper surface of the actuator element 14, the static electricity is generated between the both.

In this arrangement, it is assumed that the actuator element 14 is subjected to light off in the natural state. When the concerning actuator element 14 is subjected to the ON operation to cause light emission, then the voltage (Va<Vb<Vc) between the pair of electrodes 28a, 28b allows the actuator element 14 to make the bending displacement toward the optical waveguide plate 12, and the attractive force of the static electricity causes the displacement-transmitting section 32 to quickly approach the optical waveguide plate 12. Thus, the light emission state is given. On the contrary, in the state in which no voltage is applied between the transparent electrode 290 and the pair of electrodes 28a, 28b (Va≈Vb≈Vc), then the actuator element 14 is subjected to the OFF operation, and it is separated from the optical waveguide plate 12 in accordance with the rigidity of the actuator element 14. Thus, the light off state is given.

The driving systems according to the first to ninth specified embodiments are also applicable to the display D based on the use of the static electricity as described above.

It is a matter of course that.the display-driving device and the display-driving method according to the present invention are not limited to the embodiments described above, which may be embodied in other various forms without deviating from the gist or essential characteristics of the present invention.

As explained above, according to the display-driving device and the display-driving method concerning the present invention, it is possible to effectively reduce the electric power consumption, and it is possible to achieve the high brightness. Further, it is possible to effectively reduce the electric power consumption, and it is possible to achieve the high brightness in the gradation control based on the subfield driving. It is possible to reduce the total number of subfield, and it is possible to effectively reduce the electric power consumption in the gradation control based on the subfield driving.

What is claimed is:

1. A display-driving device for a display comprising a driving section including a large number of picture elements arranged in a matrix form for displaying a picture image corresponding to a supplied image signal, said display-driving device comprising:

a first driving circuit for selecting said picture elements at least in one row unit, a second driving circuit for outputting display information composed of an ON signal and an OFF signal to a selected row, and a signal control circuit for controlling said first and second driving circuits, wherein:

a display period for one image is defined as one field, and in order to perform gradation control based on a temporal modulation system, said signal control circuit determines, in said one field, a light emission start timing and a light emission maintenance period having a variable length, independent of a selection/unselection state of a predetermined picture element, depending on a gradation level of said predetermined picture element.

2. The display-driving device according to claim 1, wherein:

one selection period and display cycles of a number corresponding to a maximum gradation level are allotted in said one field;

each of said display cycles is composed of an unselection period and a reset period; and said signal control circuit is operated such that said predetermined picture element is in a light emission state when said ON signal indicating light emission is inputted during said selection period, or said predetermined picture element is in a light off state when said OFF signal indicating light off is inputted during said reset period in said display cycle.

3. The display-driving device according to claim 2, wherein:

signal levels are determined for said unselection period and said reset period so that said light emission state of said predetermined picture element is maintained during said light emission maintenance period; and signal levels are determined for said selection period and said unselection period so that said light off state of said predetermined picture element is maintained during any period other than said light emission maintenance period.

4. The display-driving device according to claim 1, wherein:

display cycles of a number corresponding to a maximum gradation level and one reset period are allotted in said one field;

each of said display cycles is composed of a selection period and an unselection period; and said signal control circuit is operated such that said predetermined picture element is in a light emission state when said ON signal indicating light emission is inputted during said selection period, or said predetermined picture element is in a light off state during said reset period.

5. The display-driving device according to claim 4, wherein signal levels are determined for said selection period and said unselection period so that said light emission state of said predetermined picture element is maintained during said light emission maintenance period.

6. The display-driving device according to claim 1, wherein:

an odd/even-adjusting cycle including a unit unselection period having a predetermined length between two selection periods, and display cycles of a number corresponding to a maximum gradation level are allotted in said one field; and each of said display cycles is provided with a redundant unselection period having a length which is twice said predetermined length and a reset period.

7. The display-driving device according to claim 6, wherein:

when said gradation level of said predetermined picture element is odd, said light emission start timing is set to be substantially in synchronization with said head selection period of said odd/even-adjusting cycle; while when said gradation level of said predetermined picture element is even, said light emission start timing is set to be substantially in synchronization with said rear end selection period of said odd/even-adjusting cycle.

8. The display-driving device according to claim 1, wherein:

display cycles of a number corresponding to a maximum gradation level, and an odd/even-adjusting cycle including a unit unselection period having a predetermined length between two reset periods are allotted in said one field; and each of said display cycles is provided with a selection period and a redundant unselection period having a length which is twice said predetermined length.

9. The display-driving device according to claim 8, wherein:

when said gradation level of said predetermined picture element is odd, an end timing for said light emission maintenance period is set to be substantially in synchronization with said terminal end reset period of said odd/even-adjusting cycle; while when said gradation level of said predetermined picture element is even, said end timing for said light emission maintenance period is set to be substantially in synchronization with said head reset period of said odd/even-adjusting cycle.

10. The display-driving device according to claim 1, wherein:

at least one unit display cycle including a unit unselection period having a predetermined length, and at least one redundant display cycle are allotted in said one field; and said redundant display cycle is provided with a redundant unselection period having a length which is n-times said predetermined length provided that n is an integer of not less than 2.

11. The display-driving device according to claim 10, wherein the following expressions are satisfied:

$$Z = (\text{quotient of } X/n) - 1$$
$$Y = X - Z \times n$$
$$\text{total number of subfields } (Y+Z) = (X/n - 1) + n$$

provided that a maximum gradation level is X, a number of unit display cycles is Y, and a number of redundant display cycles is Z.

12. The display-driving device according to claim 11, wherein "a" individuals of selection periods are allotted to said respective display cycles from a head of said one field, and "b" individuals of reset periods are allotted to said respective display cycles from a rear end of said one field, and wherein following expression is satisfied:

$$a+b=Y+Z+1.$$

13. The display-driving device according to claim 10, wherein said unit display cycle and said redundant display cycle are allotted by using a combination which corresponds to a minimum total number of subfields of total numbers of subfields corresponding to a maximum gradation level obtained by arbitrarily combining said unit display cycle and said redundant display cycle.

14. The display-driving device according to claim 10, wherein:
said one field includes therein a first subfield block composed of at least one redundant display cycle and a second subfield block composed of at least one unit display cycle; and
a forcible reset period is provided between said first and second subfield blocks.

15. The display-driving device according to claim 14, wherein said second subfield block is composed of at least one redundant display cycle and at least one unit display cycle.

16. The display-driving device according to claim 1, wherein said display comprises an optical waveguide plate for introducing light thereinto, and said driving section provided opposingly to one plate surface of said optical waveguide plate and including a number of actuator elements arranged corresponding to said large number of picture elements, for displaying, on said optical waveguide plate, said picture image corresponding to said image signal by controlling leakage light at a predetermined portion of said optical waveguide plate by controlling displacement action of each of said actuator elements in a direction to make contact or separation with respect to said optical waveguide plate in accordance with an attribute of said image signal to be inputted.

17. The display-driving device according to claim 16, wherein:
said actuator element comprises a shape-retaining layer, an operating section having at least a pair of electrodes formed on said shape-retaining layer, a vibrating section for supporting said operating section, and a fixed section for supporting said vibrating section in a vibrating manner; and
said display comprises a displacement-transmitting section for transmitting said displacement action of said actuator element to said optical waveguide plate, said displacement action being generated by voltage application to said pair of electrodes.

18. The display-driving device according to claim 16, wherein:
said driving section is formed with switching elements corresponding to said actuator elements respectively; and
said displacement action of said actuator element is controlled by means of ON/OFF control effected by said switching element.

19. The display-driving device according to claim 18, wherein said switching element is composed of a varistor.

20. The display-driving device according to claim 17, wherein said shape-retaining layer is a piezoelectric/electrostrictive layer.

21. The display-driving device according to claim 17, wherein said shape-retaining layer is an anti-ferroelectric layer.

22. A display-driving method for a display comprising a driving section including a large number of picture elements arranged in a matrix form for displaying a picture image corresponding to a supplied image signal; said display-driving method comprising the step of:
selecting said picture elements at least in one row unit;
outputting display information composed of an ON signal and an OFF signal to a selected row; and
performing gradation control based on a temporal modulation system, wherein:
a display period for one image is defined as one field, a light emission start timing and a light emission maintenance period having a variable length, independent of a selection/unselection state of a predetermined picture element, are determined in said one field depending on a gradation level of said predetermined picture element.

23. The display-driving method according to claim 22, wherein:
one selection period and display cycles of a number corresponding to a maximum gradation level are allotted in said one field;
each of said display cycles is composed of an unselection period and a reset period; and
said predetermined picture element is in a light emission state when said ON signal indicating light emission is inputted during said selection period; or
said predetermined picture element is in a light off state when said OFF signal indicating light off is inputted during said reset period in said display cycle.

24. The display-driving method according to claim 23, wherein:
signal levels are determined for said unselection period and said reset period so that said light emission state of said predetermined picture element is maintained during said light emission maintenance period; and
signal levels are determined for said selection period and said unselection period so that said light off state of said predetermined picture element is maintained during any period other than said light emission maintenance period.

25. The display-driving method according to claim 22, wherein:
display cycles of a number corresponding to a maximum gradation level and one reset period are allotted in said one field;
each of said display cycles is composed of a selection period and an unselection period; and
said predetermined picture element is in a light emission state when said ON signal indicating light emission is inputted during said selection period; or
said predetermined picture element is in a light off state during said reset period.

26. The display-driving method according to claim 25, wherein signal levels are determined for said selection period and said unselection period so that said light emission state of said predetermined picture element is maintained during said light emission maintenance period.

27. The display-driving method according to claim 22, wherein:
an odd/even-adjusting cycle including a unit unselection period having a predetermined length between two selection periods, and display cycles of a number corresponding to a maximum gradation level are allotted in said one field; and each of said display cycles is provided with a redundant unselection period having a length which is twice said predetermined length and a reset period.

28. The display-driving method according to claim 27, wherein:

when said gradation level of said predetermined picture element is odd, said light emission start timing is set to be substantially in synchronization with said head selection period of said odd/even-adjusting cycle; while when said gradation level of said predetermined picture element is even, said light emission start timing is set to be substantially in synchronization with said rear end selection period of said odd/even-adjusting cycle.

29. The display-driving method according to claim 22, wherein:

display cycles of a number corresponding to a maximum gradation level, and an odd/even-adjusting cycle including a unit unselection period having a predetermined length between two reset periods are allotted in said one field; and each of said display cycles is provided with a selection period and a redundant unselection period having a length which is twice said predetermined length.

30. The display-driving method according to claim 29, wherein:

when said gradation level of said predetermined picture element is odd, an end timing for said light emission maintenance period is set to be substantially in synchronization with said terminal end reset period of said odd/even-adjusting cycle; while when said gradation level of said predetermined picture element is even, said end timing for said light emission maintenance period is set to be substantially in synchronization with said head reset period of said odd/even-adjusting cycle.

31. The display-driving method according to claim 22, wherein:

at least one unit display cycle including a unit unselection period having a predetermined length, and at least one redundant display cycle are allotted in said one field; and said redundant display cycle is provided with a redundant unselection period having a length which is n-times said predetermined length provided that n is an integer of not less than 2.

32. The display-driving method according to claim 31, wherein the following expressions are satisfied:

$Z=$(quotient of $X/n$)$-1$ $Y=X-Z\times n$ total number of subfields $(Y+Z)=(X/n-1)+n$ provided that a maximum gradation level is X, a number of unit display cycles is Y, and a number of redundant display cycles is Z.

33. The display-driving method according to claim 32, wherein:

"a" individuals of selection periods are allotted to said respective display cycles from a head of said one field, and "b" individuals of reset periods are allotted to said respective display cycles from a rear end of said one field, and wherein following expression is satisfied:

$a+b=Y+Z+1$.

34. The display-driving method according to claim 31, wherein said unit display cycle and said redundant display cycle are allotted by using a combination which corresponds to a minimum total number of subfields of total numbers of subfields corresponding to a maximum gradation level obtained by arbitrarily combining said unit display cycle and said redundant display cycle.

35. The display-driving method according to claim 31, wherein:

said one field includes therein a first subfield block composed of at least one redundant display cycle and a second subfield block composed of at least one unit display cycle; and a forcible reset period is provided between said first and second subfield blocks.

36. The display-driving method according to claim 35, wherein said second subfield block is composed of at least one redundant display cycle and at least one unit display cycle.

37. The display-driving method according to claim 22, wherein said gradation control is performed for said picture element by means of ON/OFF control effected by a switching element.

38. The display-driving method according to claim 37, wherein a varistor is used as said switching element.

39. A display-driving device for a display comprising a driving section including a large number of picture elements arranged in a matrix form for displaying a picture image corresponding to a supplied image signal, said display-driving device comprising:

a first driving circuit for selecting said picture elements at least in one row unit, a second driving circuit for outputting display information composed of an ON signal and an OFF signal to a selected row, and a signal control circuit for controlling said first and second driving circuits, wherein:

a display period for one image is defined as one field, and in order to perform gradation control based on at least a temporal modulation system, said signal control circuit determines, in said one field, a light emission start timing and a light emission maintenance period having a variable length, independent of a selection/unselection state of a predetermined picture element, depending on a gradation level of said predetermined picture element;

at least one unit display cycle including a unit unselection period having a predetermined length and at least one redundant display cycle are allotted in said one field, said redundant display cycle being provided with a redundant unselection period having a length which is n-times said predetermined length provided that n is an integer of not less than 2; and the following expressions are satisfied:

$Z=$(quotient of $X/n$)$-1$ $Y=X-Z\times n$ total number of subfields $(Y+Z)=(X/n-1)+n$ provided that a maximum gradation level is X, a number of unit display cycles is Y, and a number of redundant display cycles is Z.

40. The display-driving device according to claim 39, wherein "a" individuals of selection periods are allotted to said respective display cycles from a head of said one field, and "b" individuals of reset periods are allotted to said respective display cycles from a rear end of said one field, and wherein the following expression is satisfied:

$$a+b=Y+Z+1.$$

41. A display-driving method for a display comprising a driving section including a large number of picture elements arranged in a matrix form for displaying a picture image corresponding to a supplied image signal; said display-driving method comprising the step of:

selecting said picture elements at least in one row unit;

outputting display information composed of an ON signal and an OFF signal to a selected row; and performing gradation control based on at least a temporal modulation system, wherein:

a display period for one image is defined as one field, a light emission start timing and a light emission maintenance period having a variable length, independent of a selection/unselection state of a predetermined picture element, are determined in said one field depending on a gradation level of said predetermined picture element;

at least one unit display cycle including a unit unselection period having a predetermined length and at least one redundant display cycle are allotted in said one field, said redundant display cycle being provided with a redundant unselection period having a length which is n-times said predetermined length provided that n is an integer of not less than 2; and the following expressions are satisfied:

$$Z=(\text{quotient of } X/n)-1$$

$$Y=X-Z\times n$$

total number of subfields $(Y+Z)=(X/n-1)+n$ provided that a maximum gradation level is X, a number of unit display cycles is Y, and a number of redundant display cycles is Z.

42. The display-driving method according to claim 41, wherein:

"a" individuals of selection periods are allotted to said respective display cycles from a head of said one field, and "b" individuals of reset periods are allotted to said respective display cycles from a rear end of said one field, and wherein the following expression is satisfied:

$$a+b=Y+Z+1.$$

* * * * *